US009031790B2

(12) United States Patent
Thornton et al.

(10) Patent No.: US 9,031,790 B2
(45) Date of Patent: May 12, 2015

(54) SYSTEM AND METHOD FOR CORRECTION OF BOREHOLE EFFECTS IN A NEUTRON POROSITY MEASUREMENT

(75) Inventors: James Thornton, East Windsor, NJ (US); Bradley A. Roscoe, Cambridge, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 632 days.

(21) Appl. No.: 12/729,384

(22) Filed: Mar. 23, 2010

(65) Prior Publication Data

US 2011/0238313 A1 Sep. 29, 2011

(51) Int. Cl.
*G01V 5/10* (2006.01)
*G01V 1/30* (2006.01)
*G01V 1/48* (2006.01)

(52) U.S. Cl.
CPC ...................... *G01V 5/107* (2013.01)

(58) Field of Classification Search
USPC .............. 702/8, 6, 11; 250/264, 269.4, 269.5, 250/265
See application file for complete search history.

(56) References Cited

U.S. PATENT DOCUMENTS

| 4,423,323 | A | * | 12/1983 | Ellis et al. ...................... 250/264 |
| 4,808,838 | A | * | 2/1989 | Gold .............................. 250/266 |
| 4,894,534 | A | * | 1/1990 | Paske et al. .................... 250/254 |
| 4,937,446 | A | | 6/1990 | Mckeon et al. |
| 5,051,581 | A | | 9/1991 | Hertzog et al. |
| 5,349,184 | A | * | 9/1994 | Wraight ......................... 250/266 |
| 5,521,378 | A | | 5/1996 | Roscoe et al. |
| 5,767,510 | A | * | 6/1998 | Evans ........................ 250/269.1 |
| 5,912,460 | A | * | 6/1999 | Stoller et al. ................ 250/269.3 |
| 6,032,102 | A | * | 2/2000 | Wijeyesekera et al. ........... 702/8 |
| 6,207,953 | B1 | | 3/2001 | Wilson |
| 6,307,199 | B1 | | 10/2001 | Edwards et al. |
| 6,566,649 | B1 | | 5/2003 | Mickael |
| 6,648,083 | B2 | * | 11/2003 | Evans et al. ..................... 175/41 |
| 7,148,471 | B2 | | 12/2006 | Roscoe et al. |

(Continued)

FOREIGN PATENT DOCUMENTS

RU 2010958 C1 4/1994
RU 2025748 C1 12/1994

OTHER PUBLICATIONS

F. Allioli et al. "A New Approach to Computing Formation Density and Pe Free of Mudcake Effects", SPWLA 38th Annual Logging Symposium Transactions, Jun. 15-18, 1997, pp. 1-14.*

(Continued)

*Primary Examiner* — Michael Nghiem
*Assistant Examiner* — Alexander Satanovsky
(74) *Attorney, Agent, or Firm* — Cathy Hewitt

(57) ABSTRACT

Systems, methods, and devices for determining a porosity of a subterranean formation corrected for borehole effects are provided. One such device may be a downhole tool capable of being lowered into a borehole of a subterranean formation that may include a neutron source, two or more neutron detectors, and data processing circuitry. The neutron source may emit neutrons into the subterranean formation. The two or more neutron detectors may be respectively disposed at two or more azimuthal orientations within the downhole tool, and may detect neutrons scattered by the subterranean formation or borehole fluid in the borehole, or both. Based on the neutrons detected by the neutron detectors, the data processing circuitry may determine a porosity of the subterranean formation corrected for borehole effects.

9 Claims, 35 Drawing Sheets

(56) References Cited

U.S. PATENT DOCUMENTS

| | | |
|---|---|---|
| 7,548,817 B2 | 6/2009 | Hassan et al. |
| 7,667,192 B2 | 2/2010 | Fricke et al. |
| 7,809,508 B2 | 10/2010 | Desport |
| 7,309,983 B2 | 8/2013 | Anand et al. |
| 2004/0128073 A1* | 7/2004 | Radtke et al. .................... 702/8 |
| 2010/0262371 A1 | 10/2010 | Oraby |

OTHER PUBLICATIONS

International Search Report and Written Opinion of PCT Application Serial No. PCT/US2011/027414 dated Oct. 19, 2011.

Russian Decision on Grant for Russian Application No. 2012144812 dated Jan. 17, 2014.

* cited by examiner

US 9,031,790 B2

SYSTEM AND METHOD FOR CORRECTION OF BOREHOLE EFFECTS IN A NEUTRON POROSITY MEASUREMENT

BACKGROUND

The present disclosure relates generally to neutron well-logging and, more particularly, to correcting borehole effects in a neutron porosity measurement based on measurements from a borehole-facing neutron detector.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Neutron well-logging devices have been used in the oilfield for many years to measure porosity and other formation properties. These devices may include a neutron source and one or more thermal and/or epithermal neutron detectors. By emitting neutrons into a surrounding formation with the neutron source, and detecting neutrons that scatter off the surrounding formation using the one or more neutron detectors, a property of the formation may be determined. In particular, a neutron count rate detected by a neutron detector suitably spaced from the neutron source generally may be dominated by the effect of elastic scattering of the neutrons on hydrogen nuclei in the borehole and surrounding formation. The more hydrogen present surrounding the neutron well-logging device, the fewer neutrons that may reach the neutron detector. Since formation porosity is generally water or hydrocarbon-filled, the neutron response of a neutron detector is also a measurement of porosity.

Neutron porosity devices are usually run eccentered in the borehole with the device preferably touching the borehole wall. Such a configuration may improve the sensitivity of the neutron porosity device to the formation relative to the borehole. In particular, the borehole fluid (e.g., water or oil) typically may contain much more hydrogen than the formation. Thus, the placement of the neutron porosity device in this configuration may increase the percentage of neutrons traversing from the neutron source to the neutron detector via the formation rather than via the borehole. Essentially, the borehole fluid may be a good neutron shield and, thus, neutrons may be less likely to reach the neutron detector via the borehole. Unfortunately, the effectiveness of the borehole as a neutron shield may depend on its size and shape, as well as the composition of the borehole fluid within. Size and shape matter because virtually all neutrons, even those that primarily reach the one or more neutron detectors via the formation, will also have to travel through at least some borehole fluid on their way to the neutron detector, and the amount of borehole fluid traversed may depend on the borehole geometry. In particular, the bigger the borehole, the more borehole fluid may be traversed by a given neutron before reaching a neutron detector of the neutron porosity device. The borehole fluid composition may affect neutron transport because the borehole fluid impacts the concentration of hydrogen and other elements. Hydrogen and certain other elements, such as chlorine, can have a significant effect on the observed count rate(s) of the one or more neutron detectors, especially when the one or more neutron detectors are thermal neutron detectors.

All of these effects may perturb the observed neutron detector count rates from a simple dependence on formation porosity. Typically, these effects may be handled by first computing an apparent porosity from the measured count rates, or count rate ratios from multiple detectors, assuming a standard set of downhole conditions (e.g., calcite formation, 8 in. borehole, fresh water borehole fluid, 20° C., 1 atm, and so forth). Next, a true porosity of the formation may be derived from the apparent porosity by applying a series of corrections, generally using additional external information to correct for the differences between the actual downhole conditions and the standard downhole conditions. The required corrections for a given instrument model are often published in charts (e.g., Schlumberger's Log Interpretation Charts) and also implemented in software. Typical borehole corrections may include those for borehole diameter, borehole fluid salinity, and borehole fluid density for a particular borehole fluid type (e.g., water-based barite mud).

While the aforementioned technique works well in principle, it suffers in practice because some of the external parameters that the corrections depend upon may not be well known. These external parameters may not be well known for a variety of reasons. For example, the parameters may never be measured; the parameters might have been measured by someone, but the results may be unavailable to the party carrying out the corrections; only an average value for the parameters may have been measured, but the value of the parameters may vary by depth within the borehole; the value of the parameters may have changed between the time that it was measured and the time that the neutron porosity measurement was taken; and so forth. In addition, the variety of possible downhole conditions may be far larger than the number of conditions for which corrections have been derived.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to systems, methods, and devices for determining a porosity of a subterranean formation corrected for borehole effects. One such device may be a downhole tool capable of being lowered into a borehole of a subterranean formation, which may include a neutron source, two or more neutron detectors, and data processing circuitry. The neutron source may emit neutrons into the subterranean formation. The two or more neutron detectors may be respectively disposed at two or more azimuthal orientations within the downhole tool, and may detect neutrons scattered by the subterranean formation or borehole fluid in the borehole, or both. Based on the neutrons detected by the neutron detectors, the data processing circuitry may determine a porosity of the subterranean formation corrected for borehole effects.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
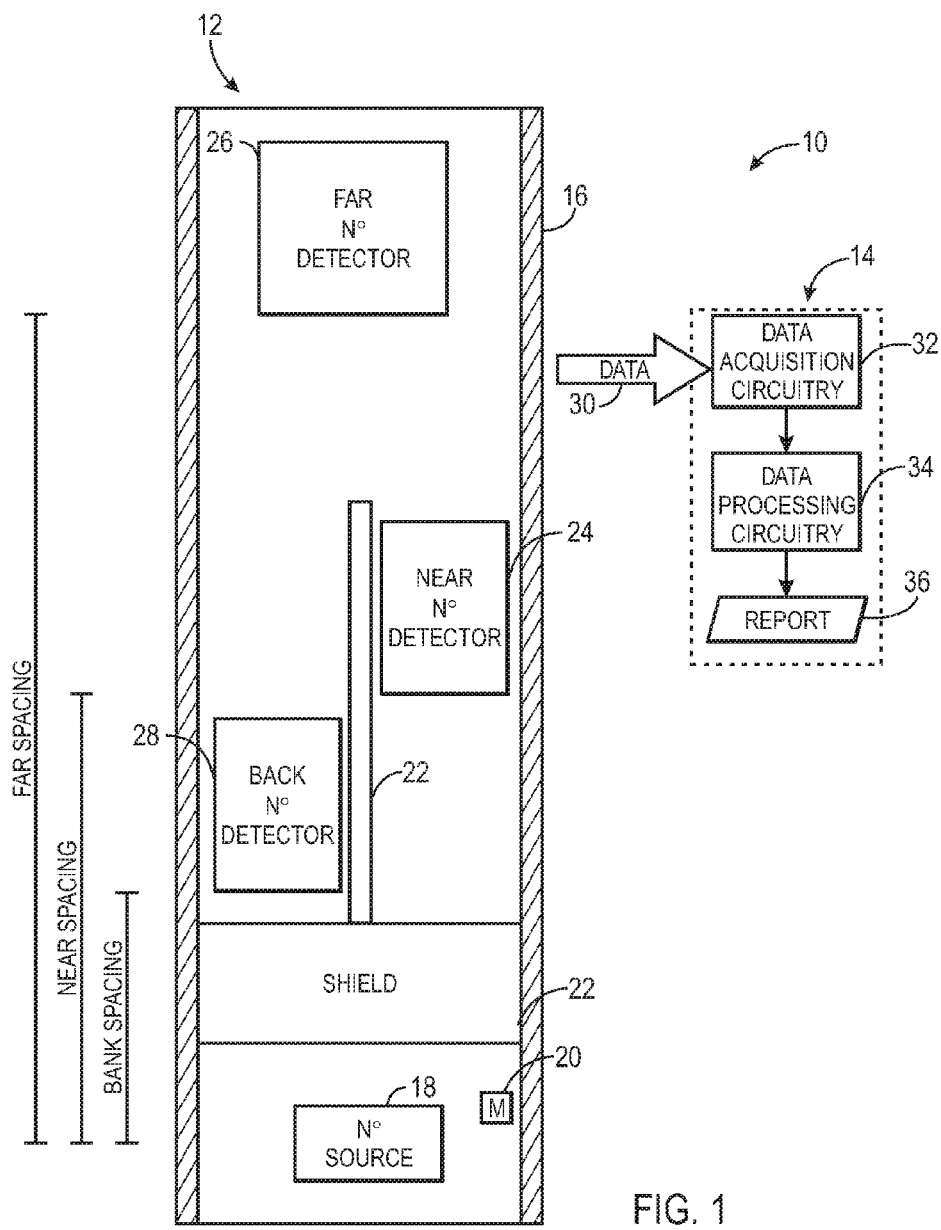
FIG. 1 is a schematic block diagram of a neutron well-logging system, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Present embodiments relate to correcting for borehole effects in a neutron well-logging tool measurement. In particular, based on measurements from a borehole-facing neutron detector embodiments of the present disclosure may automatically correct for deviations in borehole size, shape, fluid density and/or composition from standard borehole conditions (e.g., calcite formation, 8 in. borehole, fresh water borehole fluid, 20° C., 1 atm, and so forth). The automatic correction may or may not be supplemented by other externally determined parameters. Thus, even if one or more externally determined parameters that a borehole correction would otherwise depend upon are not well known, an effective borehole correction may be determined.

Specifically, to overcome the obstacles relating to traditional borehole correction determination, and to improve the accuracy of a measurement obtained by a neutron well-logging tool, the disclosed neutron well-logging tool may incorporate multiple neutron detectors that, via placement and shielding, have different relative sensitivities to the borehole environment versus the formation environment. Such a neutron well-logging device may include at least one neutron detector in a configuration nearer to a formation-facing side of the device (e.g., a side or face of the device that typically faces the formation, rather than the borehole, when deployed downhole) and at least one neutron detector in a configuration nearer to a borehole-facing side of the device (e.g., a side or face of the device that typically faces the borehole, rather than the formation, when deployed downhole). When these neutron detectors generally face the formation, the detectors may be referred to as "front-facing" neutron detectors, and when these neutron detectors generally face the borehole, the neutron detectors may be referred to as "back-facing" neutron detectors. In all embodiments disclosed herein, at least two neutron detectors of the device may have distinct azimuthal orientations within the device, as reflected by the front-facing and back-facing neutron detectors mentioned above.

To improve the sensitivity of each neutron detector to the side of the borehole to which it is closest, neutron shielding may be placed between each neutron detector and the opposite side of the neutron well logging downhole tool. Because the borehole-facing neutron detector(s) may be substantially more sensitive to the borehole than the formation-facing neutron detector(s), this distinction may be used to isolate the formation sensitivity from the borehole sensitivity. More specifically, the differences between front-facing and back-facing neutron detector responses may provide a direct measurement of borehole parameters, without necessarily involving knowledge of any external parameters, with which a borehole correction may be performed. Among other things, the borehole parameters may include "borehole geometry," or the general shape of the borehole, which may or may not be cylindrical.

A variety of configurations of downhole neutron well logging tools may be used for obtaining a borehole-corrected formation property, such as porosity. For example, in some embodiments, certain neutron detectors of the downhole neutron well logging tool may be epithermal neutron detectors. Based on epithermal neutron detector count rates from front-facing and back-facing neutron detectors, a corrected porosity may be determined. Data processing circuitry may determine a first apparent porosity based on a front-facing epithermal neutron count rate and a second apparent porosity based on a back-facing epithermal neutron count rate. A correction function may be applied to the two determined apparent porosities to obtain a porosity reading for which borehole effects may be corrected. In certain embodiments, the correction function may involve a polynomial in the apparent porosities, where the coefficients of the polynomial may be chosen to minimize a deviation between the corrected porosity and a true porosity. The epithermal neutron detector count rates and hence apparent porosities used in this minimization may be obtained experimentally or based on computer modeling data. Additionally or alternatively, the data processing circuitry may determine the corrected porosity directly from the epithermal neutron count rates from each detector using a transform derived from modeled and/or experimental data relating the epithermal neutron count rates to various borehole and formation conditions. Additionally or alternatively, the data processing circuitry may determine the corrected porosity by an inversion of a forward model giving the expected count rates (or apparent porosities) as a function of the true porosity and other formation and borehole conditions.

In some embodiments, certain neutron detectors of the downhole neutron well logging tool may be thermal neutron detectors. Based on ratios of thermal neutron detector count rates from front-facing near and far neutron detectors and at least one back-facing neutron detector a corrected porosity may be determined. Optionally, a better correction may be obtained for thermal detectors by also including time-dependent data (e.g., thermal decay time(s)) ascertained from one or more of the detectors. Such time dependent data may be the apparent single-component decay times as measured per detector or they may be corrected decay times that take into account various effects such as segregating borehole decay times from formation decay times and correcting for neutron diffusion.

Data processing circuitry may determine a first apparent porosity based on a ratio of the front-facing near thermal neutron count rate to the front-facing far thermal neutron count rate, and a second apparent porosity based on a ratio of the back-facing thermal neutron count rate to the front-facing far thermal neutron count rate. A correction function may be applied to the two determined apparent porosities and optionally the thermal decay times from one or more of the neutron detectors to obtain a porosity reading for which borehole effects may be corrected. In certain embodiments, the correction function may involve a polynomial in the apparent porosities and optionally thermal decay times, where the coefficients of the polynomial may be chosen to minimize a deviation between the corrected porosity and a true porosity. The thermal neutron detector count rates and hence apparent porosities and optionally thermal decay times used in this minimization may be obtained experimentally or based on computer modeling data. Additionally or alternatively, the data processing circuitry may determine the porosity directly from the thermal neutron count rates using a transform derived from modeled and/or experimental data relating the thermal neutron count rates, optionally including their time dependence, to various borehole and formation conditions. Additionally or alternatively, the data processing circuitry may determine the corrected porosity by an inversion of a forward model giving the expected count rates (or apparent porosities) and optionally their time dependence (or thermal decays times) as a function of the true porosity and other formation and borehole conditions.

With the foregoing in mind, FIG. 1 illustrates a neutron well logging system 10 for determining such a porosity of a subterranean formation corrected for borehole effects, based on measurements from at least one borehole-facing neutron detector and at least one other neutron detectors at least one of which faces the formation. Additional neutron detectors may be utilized including ones that have no azimuthal sensitivity. The neutron well logging system 10 may include a downhole tool 12 and a data processing system 14. By way of example, the downhole tool 12 may be included in a slickline or wireline tool for logging an existing well, or may be installed in a borehole assembly (BHA) for logging while drilling (LWD). In other embodiments, the downhole tool 12 may employ any other suitable mode of conveyance. Also, although the downhole tool 12 and the data processing system 14 are illustrated as separate from one another, the data processing system 14 may be incorporated into the downhole tool 12 in certain embodiments.

The downhole tool 12 may be encased within a housing 16 that houses, among other things, a neutron source 18. The neutron source 18 may include any suitable source of neutrons. By way of example, the neutron source 18 may be an electronic neutron source, such as a Minitron™ by Schlumberger Technology Corporation, which may produce pulses of neutrons or a continuous stream of neutrons via dd, dt or tt reactions. Additionally or alternatively, the neutron source 18 may include a radioisotopic source such as AmBe or $^{225}$Cf.

In some embodiments, the downhole tool 12 may include a neutron monitor 20 to measure the output of the neutron source 18. In general, the neutron monitor 20 may be any suitable neutron detector in any suitable configuration within the downhole tool 12 that measures substantially only neutrons emitted by the neutron source 18 that have not been scattered by the surrounding formation. Neutron shielding 22 may separate the neutron source 18 from other components of the downhole tool 12.

The downhole tool 12 may include a front-facing "near" neutron detector 24 and optionally a "far" neutron detector 26 located farther from the neutron source 18 than a similar front-facing "near" neutron detector 24. Due to their location within the downhole tool near a formation-facing side of the downhole tool 12, the front-facing neutron detectors 24 and 26 may be more sensitive to the formation environment than the borehole environment. Additionally, the downhole tool 12 may include at least one back-facing neutron detector 28 in a configuration more sensitive to the borehole environment than the formation environment. As discussed below, in certain configurations, one or more of the neutron detectors 24, 26 and 28 may be epithermal neutron detectors, while in other configurations, one or more of the neutron detectors 24, 26 and 28 may be thermal neutron detectors. In certain embodiments, when epithermal neutron detectors are employed, only one of the front-facing detectors 24 or 26 may be present. The neutron detectors 24, 26 and 28 may include, among other things, a neutron-absorbing material such as $^3$He.

The front-facing near neutron detector 24 may have a "near spacing" measured from the neutron source 18 to the face of the active region of the near neutron detector 24 nearest to the neutron source 18, and the front-facing far neutron detector 26 may have a "far spacing" measured from the neutron source 18 to the face of the active region of the far neutron detector 26 nearest to the neutron source 18. Similarly, the back-facing neutron detector 28 may have a "back spacing" measured from the neutron source 18 to the face of the active region of the back-facing neutron detector 28 nearest to the neutron source 18. In general, the far spacing may be selected such that apparent porosities computed based on the far neutron detector 26 count rate normalized to the neutron monitor 20, or based on a ratio of the far neutron detector 26 to the near neutron detector 24, have a relatively high accuracy under a standard set of conditions (e.g., calcite formation, 8 inch borehole, fresh water borehole and formation fluids, 20 C, 1 atm, etc.), upon which an apparent porosity relationship may be based. For example, such a far spacing may be approximately 2 feet. The near neutron detector 24 may have a near spacing of approximately 1 foot. The back-facing neutron detector 28 may have a back spacing even closer to the neutron source 18 than either of the other neutron detectors 24 and 26.

In certain alternative embodiments, the near spacing may be much closer than many traditional configurations. Indeed, in such embodiments, the near spacing may be chosen such that, at low porosities, many of the neutrons that reach the near neutron detector 24 either directly from the neutron source or after interacting with the subterranean formation, borehole and/or within the downhole tool itself have energies too high to detect. At relatively higher porosities, due to the additional scattering off of hydrogen nuclei, the number of lower-energy, detectable neutrons may increase, as the distance the neutrons travel before being slowed to these energies decreases. At higher porosities still, the additional scattering off hydrogen may eventually reduce the number of neutrons of any energy that reach the detector, but not before resulting in a porosity response that is relatively flat or even increasing over part of the porosity range. For a given embodiment of the downhole tool 12, the exact optimal spacing will depend on specific details of the design of the downhole tool 12, including the size and efficiency versus energy of the neutron detector 24, and where, what kind, and how much neutron shielding is used. In some embodiments, the near neutron detector 24 may be spaced such that its porosity response may be relatively flat and/or may increase as porosity increases.

In some embodiments, neutron shielding 22 may be placed between the individual neutron detectors 24, 26, and 28, as well as between the neutron detectors 24 and 26, and the borehole-facing side of the downhole tool 12 and/or between the neutron detector 28 and the formation-facing side of the downhole tool 12. These neutron shields 22 may reduce the number of neutrons that may reach the front-facing neutron detectors 24 and 26 via the borehole, and the number of neutrons that may reach the back-facing neutron detector 28 via the formation. In addition, since the neutron detectors 24, 26 and 28 may include a neutron-absorbing material such as $^3$He, the back-facing neutron detector 28 may shield or partially shield the front-facing near neutron detector 24 from extraneous neutrons, and vice-versa.

When the downhole tool is used in a subterranean formation, as generally described in greater detail below, the neutron detectors 24, 26, and 28 may detect a quantity of neutrons that varies depending on the output of the neutron source 18 and the porosity of the formation, among other things. Thus, the responses of the neutron monitor 20 and the neutron detectors 24, 26, and 28 may be transferred as data 30 to the data processing system 14. Based on these responses and a suitable correction, described in greater detail below, the data processing system 14 may determine a porosity of the subterranean formation corrected for borehole effects without necessarily using additional external parameters.

The data processing system 14 may include a general-purpose computer, such as a personal computer, configured to run a variety of software, including software implementing all or part of the present techniques. Alternatively, the data processing system 14 may include, among other things, a mainframe computer, a distributed computing system, or an application-specific computer or workstation configured to implement all or part of present techniques based on specialized software and/or hardware provided as part of the system. Further, the data processing system 14 may include either a single processor or a plurality of processors to facilitate implementation of the presently disclosed functionality. For example, processing may take place at least in part by an embedded processor in the downhole tool 12.

In general, the data processing system 14 may include data acquisition circuitry 32 and data processing circuitry 34. The data processing circuitry 34 may be a microcontroller or microprocessor, such as a central processing unit (CPU), which may execute various routines and processing functions. For example, the data processing circuitry 34 may execute various operating system instructions as well as software routines configured to effect certain processes. These instructions and/or routines may be stored in or provided by an article of manufacture, which may include a computer readable-medium, such as a memory device (e.g., a random access memory (RAM) of a personal computer) or one or more mass storage devices (e.g., an internal or external hard drive, a solid-state storage device, CD-ROM, DVD, or other storage device). In addition, the data processing circuitry 34 may process data provided as inputs for various routines or software programs, including the data 30.

Such data associated with the present techniques may be stored in, or provided by, a memory or mass storage device of the data processing system 14. Alternatively, such data may be provided to the data processing circuitry 34 of the data processing system 14 via one or more input devices. In one embodiment, data acquisition circuitry 32 may represent one such input device; however, the input devices may also include manual input devices, such as a keyboard, a mouse, or the like. In addition, the input devices may include a network device, such as a wired or wireless Ethernet card, a wireless network adapter, or any of various ports or devices configured to facilitate communication with other devices via any suitable communications network, such as a local area network or the Internet. Through such a network device, the data processing system 14 may exchange data and communicate with other networked electronic systems, whether proximate to or remote from the system. The network may include various components that facilitate communication, including switches, routers, servers or other computers, network adapters, communications cables, and so forth.

The downhole tool 12 may transmit the data 30 to the data acquisition circuitry 32 of the data processing system 14 via, for example, internal connections with the tool, a telemetry system communication downlink and/or a communication cable. After receiving the data 30, the data acquisition circuitry 32 may transmit the data 30 to the data processing circuitry 34. In accordance with one or more stored routines, the data processing circuitry 34 may process the data 30 to ascertain one or more properties of a subterranean formation surrounding the downhole tool 12, such as porosity, corrected for borehole effects. The data processing circuitry 34 may thereafter output a report 36 indicating the one or more ascertained properties of the formation. The report 36 may be stored in memory or may be provided to an operator via one or more output devices, such as an electronic display and/or a printer.

Figure 2:
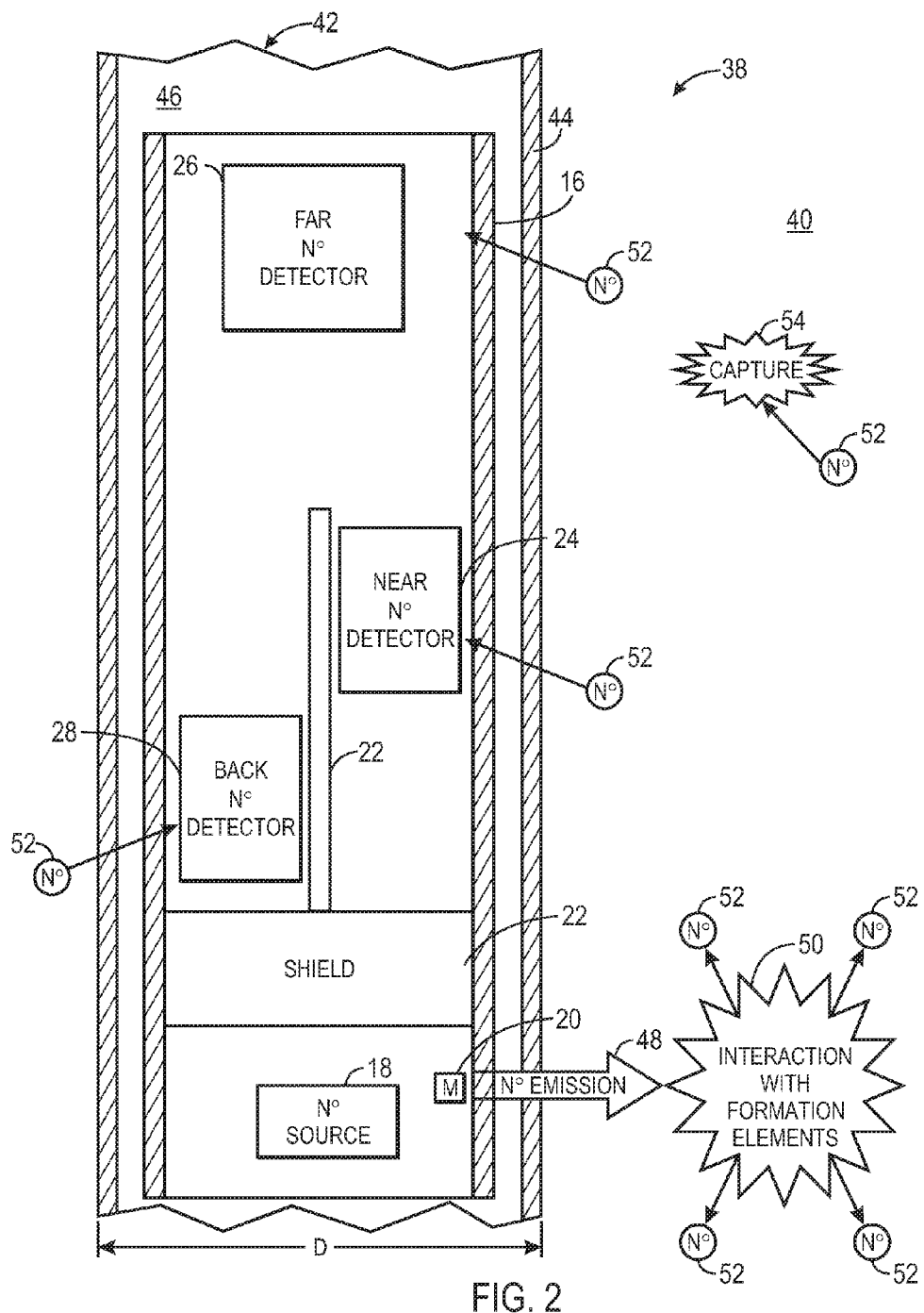
FIG. 2 is a schematic block diagram of a neutron well-logging operation involving the system of FIG. 1, in accordance with an embodiment.

FIG. 2 represents a well logging operation 38 using the downhole tool 12 to ascertain a porosity of a subterranean formation 40. As illustrated in FIG. 2, the downhole tool 12 may be lowered into a borehole 42 in the subterranean formation 40, which may or may not be cased in a casing 44. The borehole 42 may have a diameter D and may be filled with borehole fluid 46, which may have a composition that includes primarily fresh water, other drilling fluids and/or hydrocarbons; various types and concentrations of weighting materials; various types and concentrations of salts; other drilling fluid additives; and drill cuttings. After placement into the subterranean formation 40, a neutron emission 48 from the neutron source 18 may have various interactions 50 with elements of the subterranean formation 40 and/or the borehole 42, and various numbers of scattered neutrons 52 may reach different neutron detectors 24, 26, or 28 depending on these interactions 50. By way of example, when the neutron source 18 includes an electronic neutron generator, the neutron emission 48 may include a continuous or pulsed neutron burst containing 14 MeV neutrons.

The interactions 50 of the neutron emission 48 with elements of the subterranean formation 40 and/or the borehole fluid 46 may include, for example, inelastic scattering, elastic scattering, and neutron capture. Depending on the composition of the subterranean formation 40 and the borehole fluid 46, the interactions 50 may vary. For example, hydrogen atoms may cause elastic scattering. Similarly, chlorine atoms found in salt in the subterranean formation 40 or the borehole fluid 46 may cause neutron capture events 54 for certain of the thermal neutrons 50 after reducing in energy below approximately 0.1 eV. The numbers and energies of the neutrons 52 that reach the neutron detectors 24, 26, and/or 28 at different distances from the neutron source 18 may thus vary based in part on properties of the subterranean formation 40 and/or borehole 42, including, among other things, a porosity of the subterranean formation 40. Additionally, neutron count rates from the front-facing neutron detectors 24 and/or 26 may be more sensitive to interactions 50 that take place in the formation 40, while neutron count rates from the back-facing neutron detector 28 may be more sensitive to interactions 50 that take place in the borehole 42. The variation between front-facing and back-facing neutron count rates may be used to isolate the effect of the borehole 42 from the effect of the formation 40 on the observed neutron detector count rates and hence to isolate the borehole dependence from the porosity dependence.

Figure 3:
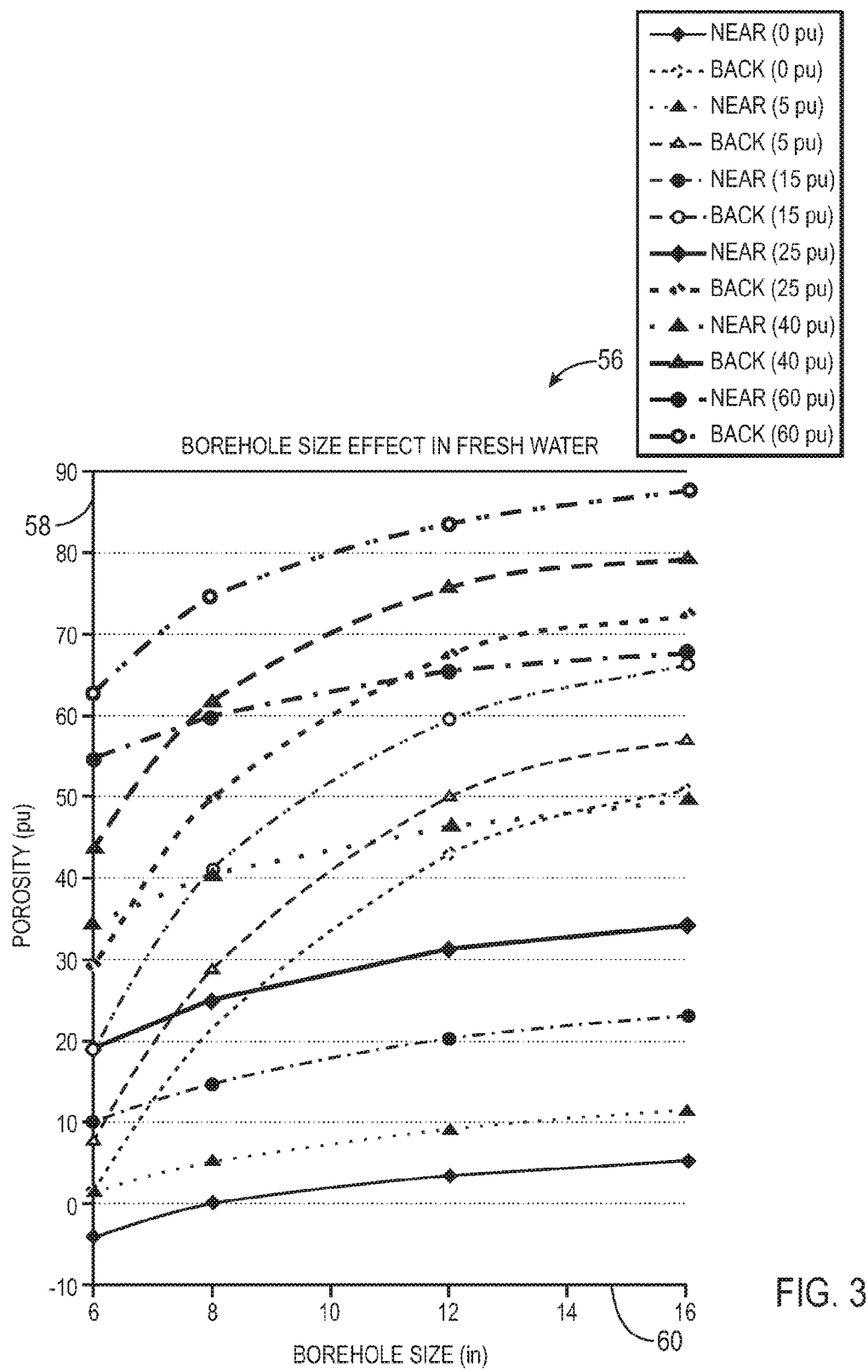
FIG. 3 is a plot modeling apparent porosities obtained from formation-facing and borehole-facing epithermal neutron detectors of the system of FIG. 1 at various borehole diameters filled with fresh water, in accordance with an embodiment.

In certain embodiments, the operation 38 may take place using an embodiment of the downhole tool 12 in which the near neutron detector 24 and the back-facing neutron detector 28 are epithermal neutron detectors. As the operation 38 takes place, the number of neutrons that reaches the near neutron detector 24 and the back-facing neutron detector 28 may vary significantly depending on the borehole diameter D and the composition of the borehole fluid 46. For example, FIG. 3 represents a plot modeling apparent porosities obtained using front-facing and back-facing epithermal neutron count rates for various diameters D of the borehole 42 when the borehole fluid 46 is fresh water. To obtain the plot of FIG. 3, as well as FIGS. 5-15, the front-facing near neutron detector 24 and back-facing neutron detector 28 count rates were computed using the Monte Carlo N-Particle transport code (MCNP), a leading nuclear Monte Carlo modeling code. The front-facing and back-facing count rates were then converted to apparent porosity via a curve fit to the modeling data for certain standard conditions (calcite formation, 8 in. borehole, fresh water borehole fluid, 20° C., 1 atm, and so forth).

Plot 56 of FIG. 3 includes an ordinate 58 representing porosity in porosity units (p.u.) and an abscissa 60 representing the diameter D of the borehole 42 in units of inches. Curves with solid symbols on the plot 56 represent apparent porosities calculated from epithermal neutron count rates obtained from the front-facing near neutron detector 24 when the formation 40 has certain true porosity values (e.g., 0, 5, 15, 25, 40, and 60 p.u.), while curves with hollow symbols on the plot 56 represent apparent porosities computed from epithermal neutron count rates obtained from the back-facing neutron detector 28 at the same true porosity values. Of note, data points representing the front-facing apparent porosities of the solid-symbol curves of the plot 56 all equate to the true porosity at 8 inches. This is as should be expected, since the apparent porosities are determined based on standard conditions, in which the borehole fluid 46 is taken to be fresh water and the borehole 42 is taken to have a diameter D of 8 inches. Thereafter, the solid-symbol curves of the plot 56 increase with borehole 42 size as the (much more hydrogenous) borehole 42 becomes a larger portion of the signal.

As noted above, the hollow-symbol curves of the plot 56 represent apparent porosities computed from epithermal neutron count rates obtained from the back-facing neutron detector 28. The back-facing neutron detector 28 neutron count rates were modeled with the downhole tool eccentered to the opposite side of the borehole 42, such that the back-facing neutron detector 28 may face the formation 40. This configuration may make it possible to derive an apparent porosity from the back-facing neutron detector 28 in the same way as it is determined for the front-facing near neutron detector 24. With the downhole tool 12 eccentered normally (e.g., with the back-facing neutron detector 28 facing the borehole 42), the apparent porosity from the back-facing neutron detector 28 may read high, even in a 6 in. borehole, because of the large standoff from the back wall of the borehole 42. In particular, the apparent porosity from the back-facing neutron detector 28 may increase with borehole diameter D much more rapidly than that of the near neutron detector 24. This distinction may be employed to correct for borehole effects in the front-facing apparent porosity.

A porosity corrected for borehole effects may be obtained using the operation 38 described in FIG. 2. While such an operation may be carried out in a variety of ways, a flowchart 70 of FIG. 4 describes one embodiment of a method for obtaining the corrected porosity using the downhole tool 12, when the near neutron detector 24 and the back-facing neutron detector 28 are epithermal neutron detectors. In a first step 72, the downhole tool 12 may be deployed into the subterranean formation 40 using any suitable mode of conveyance. In step 74, the neutron source 18 may emit neutrons (illustrated as the neutron emission 48 in FIG. 2) into the surrounding subterranean formation 40. The neutron emission 48 may take place in bursts of neutrons or as a continuous stream of neutrons. Depending on the interactions 50 of the neutron emission 48 with elements surrounding the downhole tool 12, varying numbers of neutrons of various energies may reach the neutron detectors 24 and 28. In particular, the number of neutrons detected by the back-facing neutron detector 28 may be significantly more affected by the size of the borehole 42 and the composition of the borehole fluid 46 than the number of neutrons detected by the front-facing near neutron detector 24.

These neutrons may be detected by the front-facing near neutron detector 24 and the back-facing neutron detector 28 in step 76. In step 78, the data processing system 14 may determine, based on these neutron count rates, a near apparent porosity $\phi_{near}$ and a back apparent porosity $\phi_{back}$ using any suitable techniques for computing porosity. These apparent porosities may be computed from single epithermal neutron detector count rates, but may also be computed from ratios of neutron detector count rates or neutron detector count rates normalized to a neutron count rate obtained by the neutron monitor 20. In step 80, the data processing system 14 may compute a corrected porosity $\phi_{corr}$ based on a relationship between the near apparent porosity $\phi_{near}$ and the back apparent porosity $\phi_{back}$ and a corresponding true porosity. Such a relationship may include, for example, a polynomial in the apparent porosities:

$$\varphi_{corr} = \sum_{ij}^{i+j \leq n} a_{ij} \varphi_{near}^i \varphi_{back}^j, \quad (1)$$

where n is the degree of the polynomial and the coefficients $a_{ij}$ have been chosen to minimize a difference between the corrected porosity $\phi_{corr}$ and a true porosity. In this minimization, the detector count rates and hence apparent porosities may be obtained experimentally or by way of computer modeling data. Although Equation (1) represents a polynomial function, it should be understood that any suitable functional form may be employed to compute the corrected porosity $\phi_{corr}$ in the manner described above. Additionally or alternatively to steps 74, 76, and 78, the data processing system 14 may determine the porosity directly from the epithermal neutron count rates using a transform derived from modeled and/or experimental data relating the epithermal neutron count rates to various borehole and formation conditions. Additionally or alternatively, the data processing system 14 may determine the corrected porosity by an inversion of a forward model giving the expected count rates (or apparent porosities) as a function of the true porosity and other formation 40 and borehole 42 conditions.

To evaluate the above-described technique for obtaining the corrected porosity $\phi_{corr}$, over 500 MCNP modeling runs were performed spanning various combinations of porosity, size of the borehole 42, shape of the borehole 42, and borehole fluid 46 composition. Regarding the borehole fluid 46 composition modeling, various weighting material types, weighting material amounts, brine types, and salinities were included. The results of certain modeling runs are illustrated in FIGS. 5-15, and are fit using Equation (1), with n=3 (i.e., including up to cubic terms). Note that all the corrected porosity results shown in FIGS. 5-15 derive from a single fit (e.g., from one set of fit coefficient $a_{ij}$ values).

Figure 5:
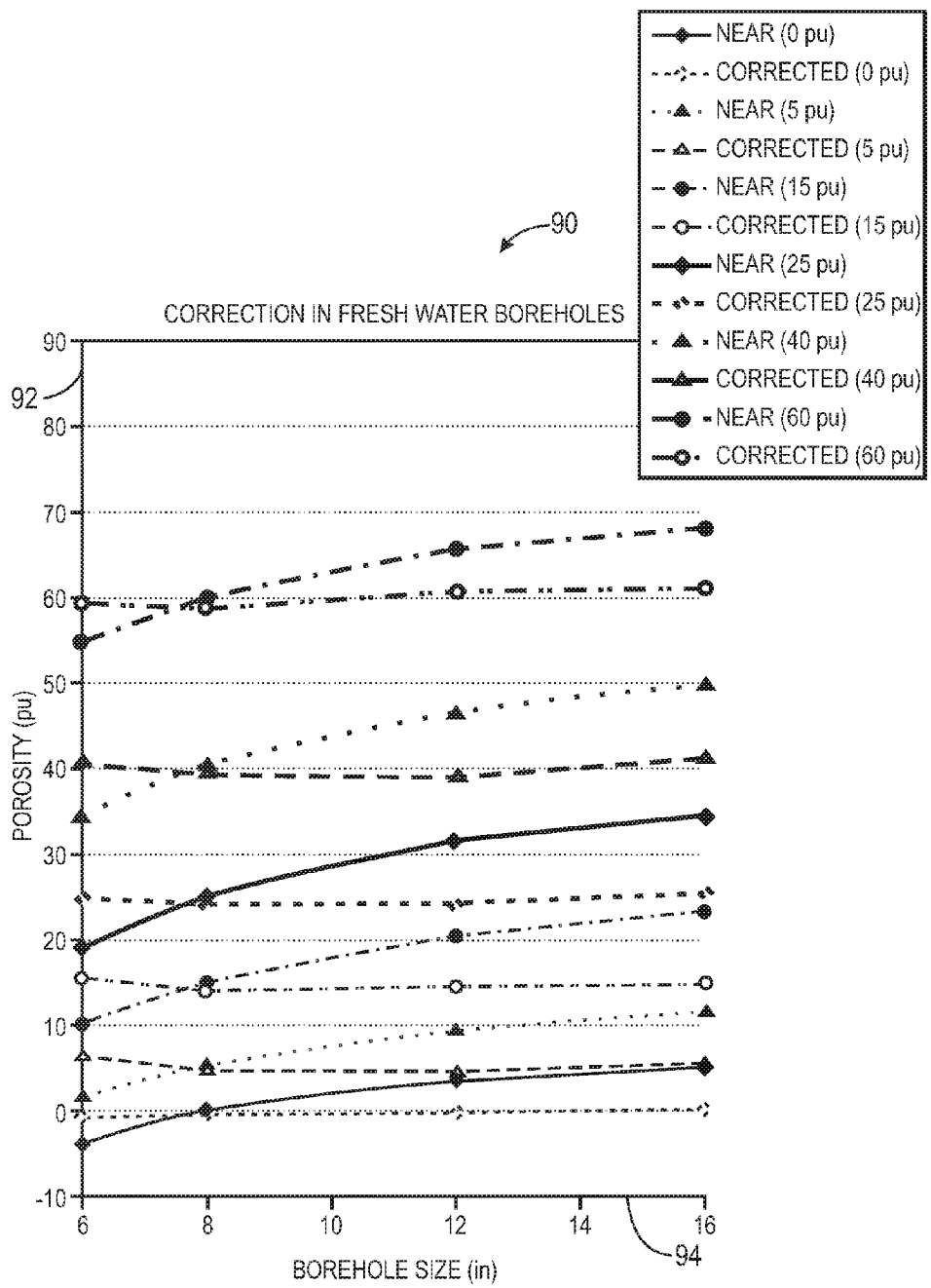
FIG. 5 is a plot modeling apparent porosities obtained from a formation-facing epithermal neutron detector of the system of FIG. 1 and corresponding corrected porosities at various borehole diameters filled with fresh water, in accordance with an embodiment.

The corrected values of porosity for various borehole sizes in fresh water borehole fluid 46 appear in a plot 90 of FIG. 5. An ordinate 92 of the plot 90 represents porosity in porosity units (p.u.) and an abscissa 94 represents the diameter D of the borehole 42 in units of inches. Solid-symbol curves of the plot 90 represent apparent porosities calculated from epithermal neutron count rates obtained from the front-facing near neutron detector 24 when the formation 40 has certain true porosity values (e.g., 0, 5, 15, 25, 40, and 60 p.u.). Hollow-symbol curves of the plot 90 represent corrected porosities calculated based on Equation (1) and the data represented in FIG. 3 at the same true porosity values. As can be seen from curves of the plot 90, the borehole size effect observed in the apparent near porosity curves (solid symbols) is largely eliminated by the correction, and the corrected porosity curves (hollow symbols) all read close to the corresponding true porosity values of the formation 40.

Figure 6:
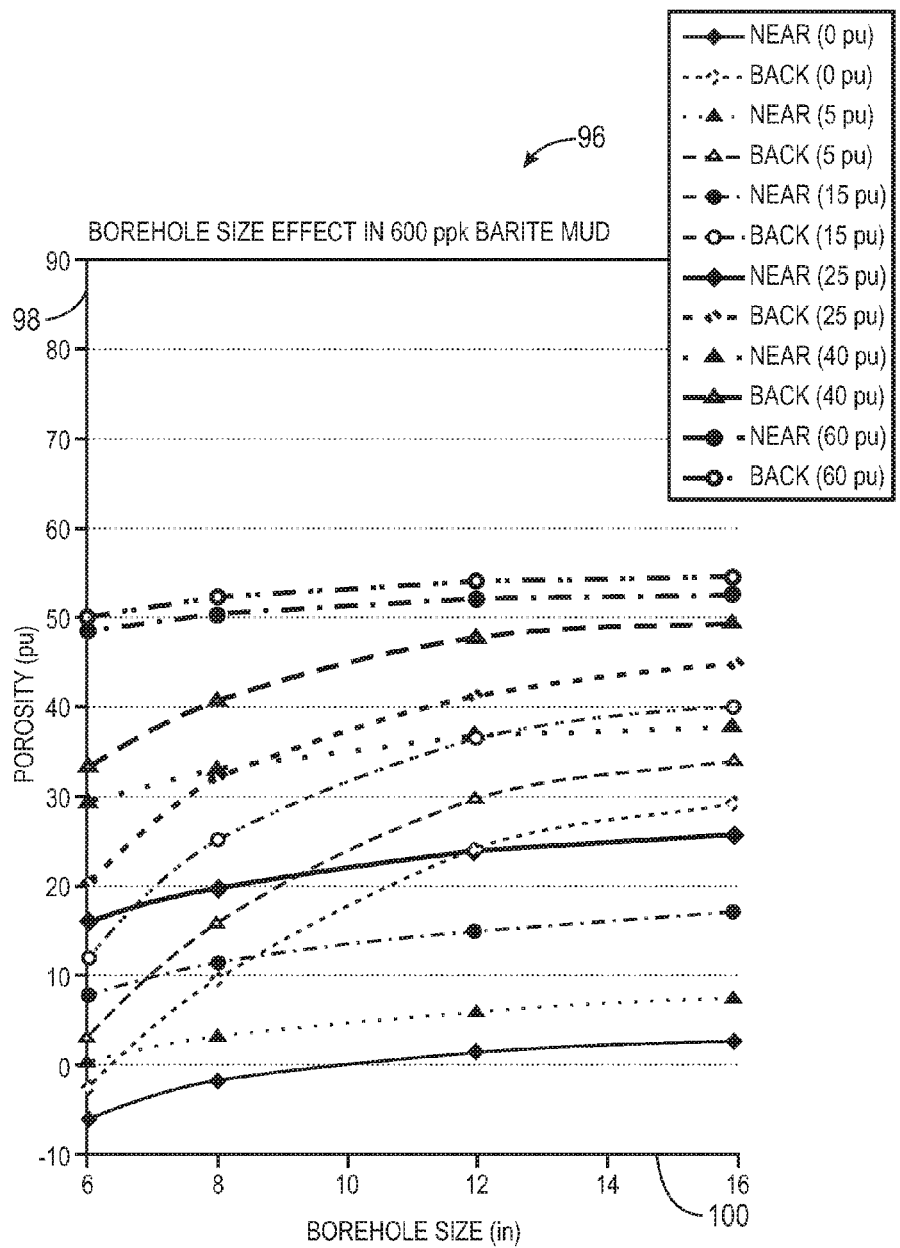
FIG. 6 is a plot modeling apparent porosities obtained from formation-facing and borehole-facing epithermal neutron detectors of the system of FIG. 1 at various borehole diameters filled with 600 ppk barite mud, in accordance with an embodiment.
Figure 7:
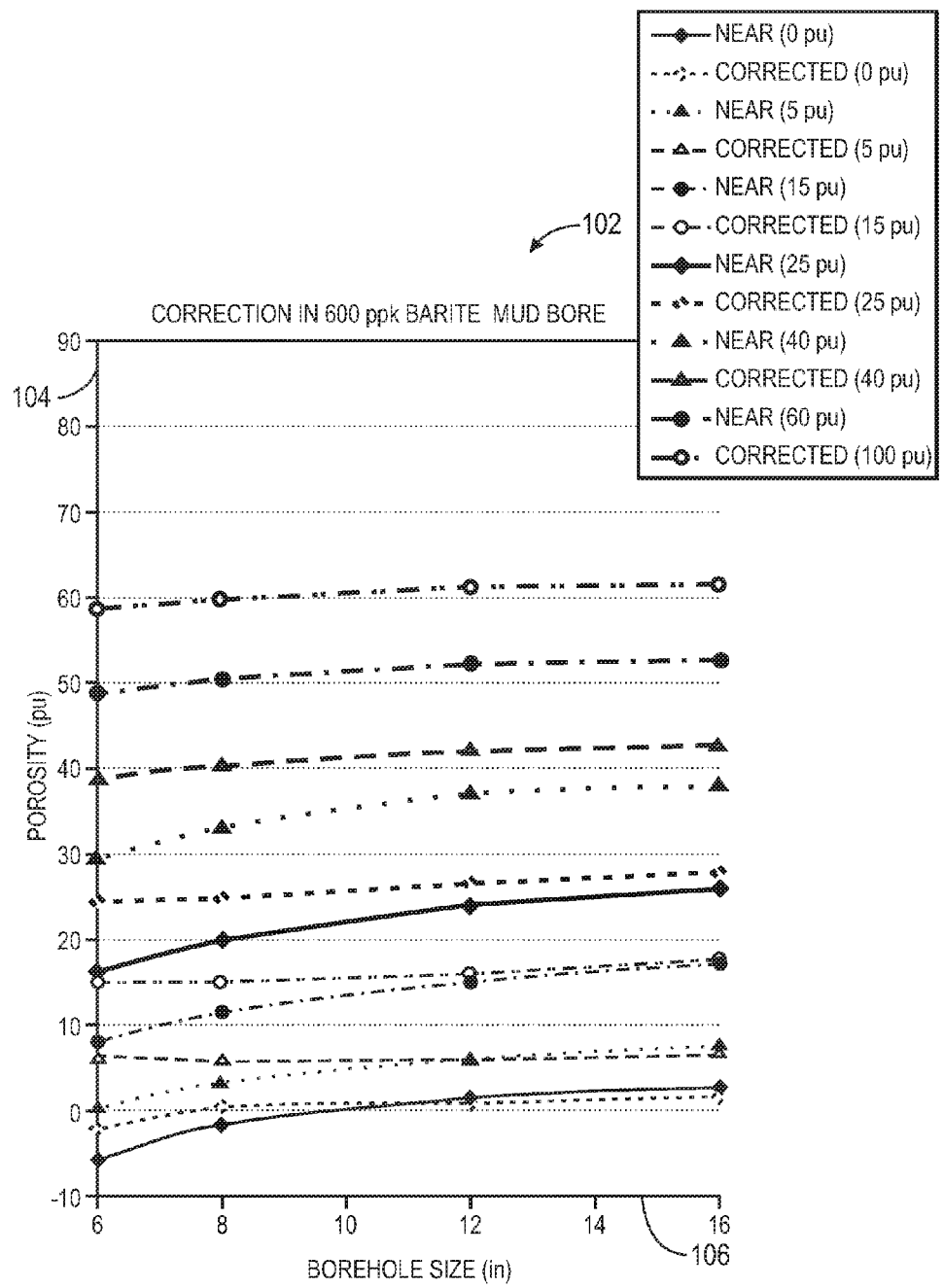
FIG. 7 is a plot modeling apparent porosities obtained from a formation-facing epithermal neutron detector of the system of FIG. 1 and corresponding corrected porosities at various borehole diameters filled with 600 ppk barite mud, in accordance with an embodiment.

FIGS. 6 and 7 are plots modeling porosities determined based on epithermal neutron count rates when the borehole 42 is filled with a borehole fluid 46 of fresh water plus 600 parts per thousand (ppk) barite as a weighting material (i.e., 600 kg of barite and 400 kg of fresh water per 1000 kg of borehole fluid 46). Turning to FIG. 6, a plot 96 includes an ordinate 98 representing porosity in porosity units (p.u.) and an abscissa 100 representing the diameter D of the borehole 42 in units of inches. Solid-symbol curves of the plot 96 represent apparent porosities calculated from epithermal neutron count rates obtained from the front-facing near neutron detector 24 when the formation 40 has certain true porosity values (e.g., 0, 5, 15, 25, 40, and 60 p.u.), while hollow-symbol curves of the plot 96 represent apparent porosities computed from epithermal neutron count rates obtained from the back-facing neutron detector 28 at the same true porosity values.

From the plot 96 of FIG. 6, note the smaller borehole size effect in the barite mud compared to fresh water alone (as shown in FIG. 3). The reduced borehole size effect may be largely due to the lower hydrogen concentration in barite mud as compared to fresh water without barite. Also, note that the curves of the plot 96 of FIG. 6 behave substantially differently from those of the plot 56 of FIG. 3 at high true porosities, where the hydrogen concentration effect largely saturates. Essentially, given its lower hydrogen concentration, a 600 ppk barite mud does not behave very differently from the formation 42 when the true porosity of the formation 42 is 60 p.u.

FIG. 7 presents a plot 102 modeling corrected values of porosity as a function of borehole size when the borehole fluid 46 is 600 ppk barite mud. An ordinate 104 of the plot 102 represents porosity in porosity units (p.u.) and an abscissa 106 represents the diameter D of the borehole 42 in units of inches. Solid-symbol curves of the plot 102 represent apparent porosities calculated from epithermal neutron count rates obtained from the front-facing near neutron detector 24 when the formation 40 has certain true porosity values (e.g., 0, 5, 15, 25, 40, and 60 p.u.). Hollow-symbol curves of the plot 102 represent corrected porosities calculated based on Equation (1) and the data represented in FIG. 6 at the same true porosity values.

Note that despite the substantially different borehole fluid 46 composition (e.g., 600 ppk barite mud rather than fresh water) and resultant different apparent porosity curve behavior, the correction of Equation (1) largely brings the corrected porosity results back to the true porosity of the formation 40. In other words, comparing FIGS. 5 and 7, it is apparent that the same correction fit accounts for both the diameter D of the borehole 42 and the composition of the borehole fluid 46.

Figure 8:
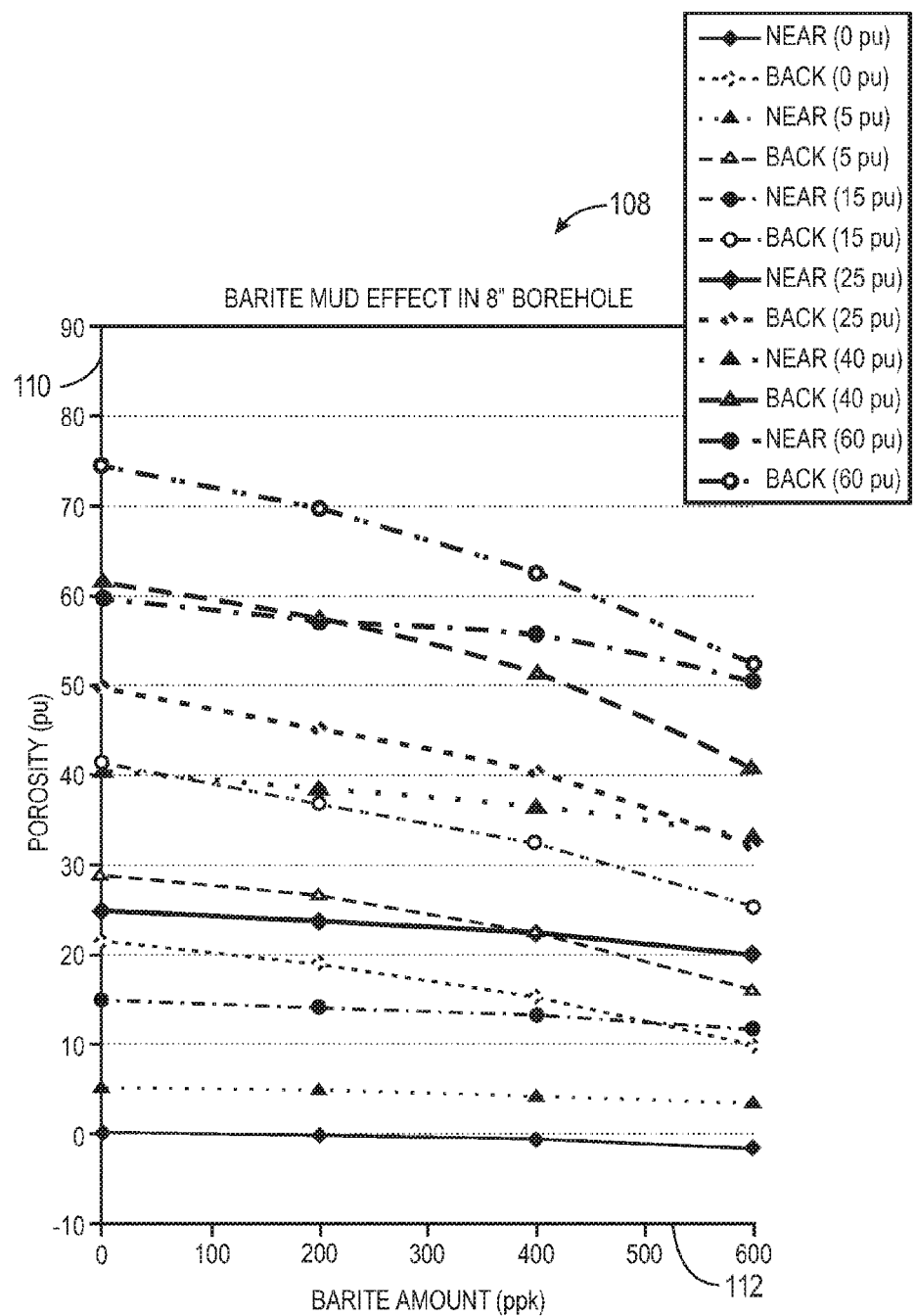
FIG. 8 is a plot modeling apparent porosities obtained from formation-facing and borehole-facing epithermal neutron detectors of the system of FIG. 1 at various concentrations of barite mud in an 8 in. borehole, in accordance with an embodiment.
Figure 9:
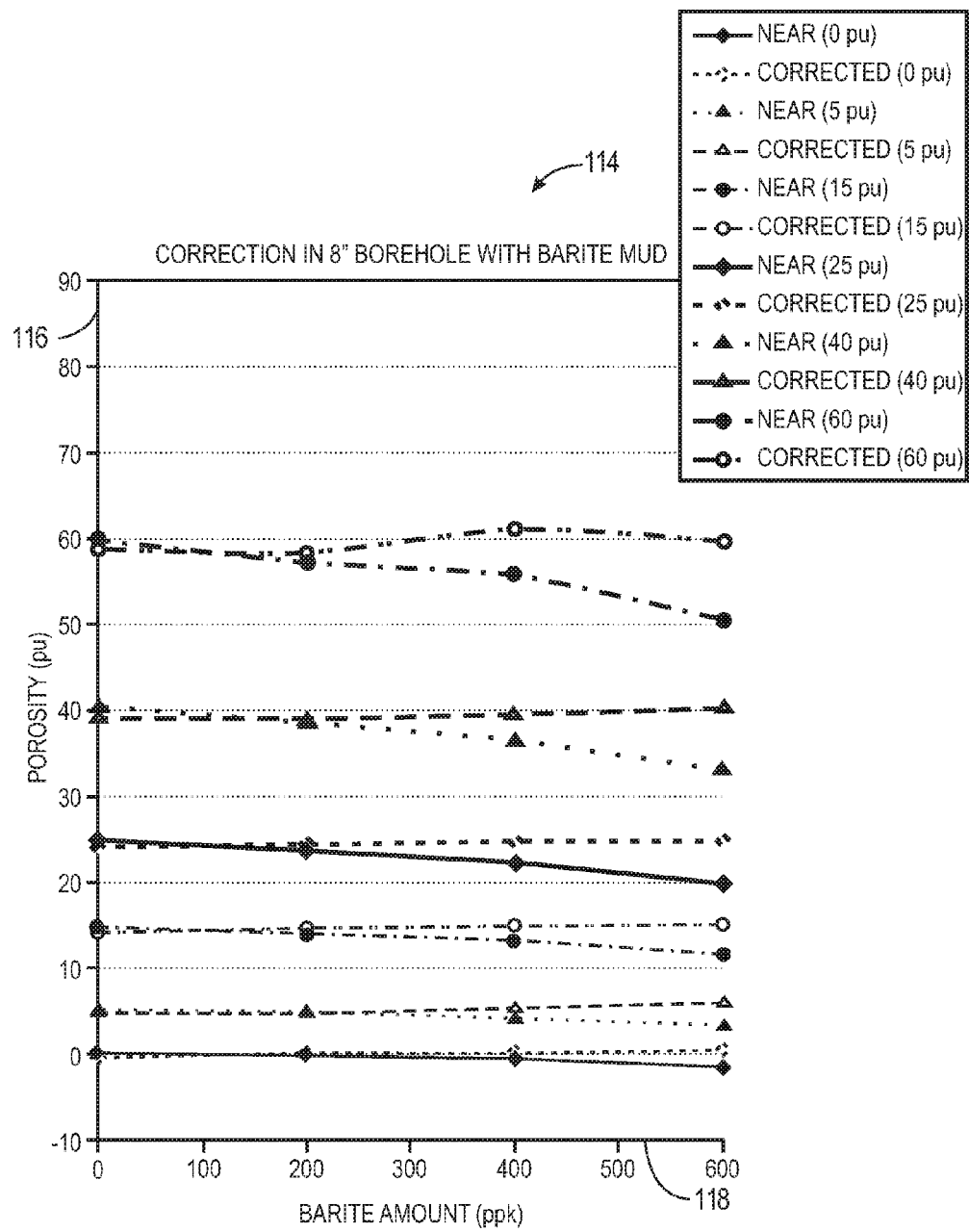
FIG. 9 is a plot modeling apparent porosities obtained from a formation-facing epithermal neutron detector of the system of FIG. 1 and corresponding corrected porosities at various concentrations of barite mud in an 8 in. borehole, in accordance with an embodiment.

FIGS. 8 and 9 are plots modeling porosities determined based on epithermal neutron count rates when the borehole 42 has a diameter D of 8 inches and is filled with borehole fluid 46 of fresh water plus variable concentrations of barite as a weighting material. Turning to FIG. 8, a plot 108 includes an ordinate 110 representing porosity in porosity units (p.u.) and an abscissa 112 representing various concentrations of barite in the borehole fluid 46 in units of parts per thousand (ppk). Solid-symbol curves of the plot 108 represent apparent porosities calculated from epithermal neutron count rates obtained from the front-facing near neutron detector 24 when the formation 40 has certain true porosity values (e.g., 0, 5, 15, 25, 40, and 60 p.u.), while hollow-symbol curves of the plot 108 represent apparent porosities computed from epithermal neutron count rates obtained from the back-facing neutron detector 28 at the same true porosity values. Similarly, a plot 114 of FIG. 9 includes an ordinate 116 representing porosity in porosity units (p.u.) and an abscissa 118 representing various concentrations of barite in the borehole fluid 46 in units of parts per thousand (ppk). Solid-symbol curves of the plot 114 represent apparent porosities calculated from epithermal neutron count rates obtained from the front-facing near neutron detector 24 when the formation 40 has certain true porosity values (e.g., 0, 5, 15, 25, 40, and 60 p.u.), and hollow-symbol curves of the plot 114 represent corrected porosities calculated based on Equation (1) and the data represented in FIG. 8 at the same true porosity values. As evident from the plots 108 and 114, the correction also remains effective for various concentrations of barite mud in the borehole fluid 46.

Figure 10:
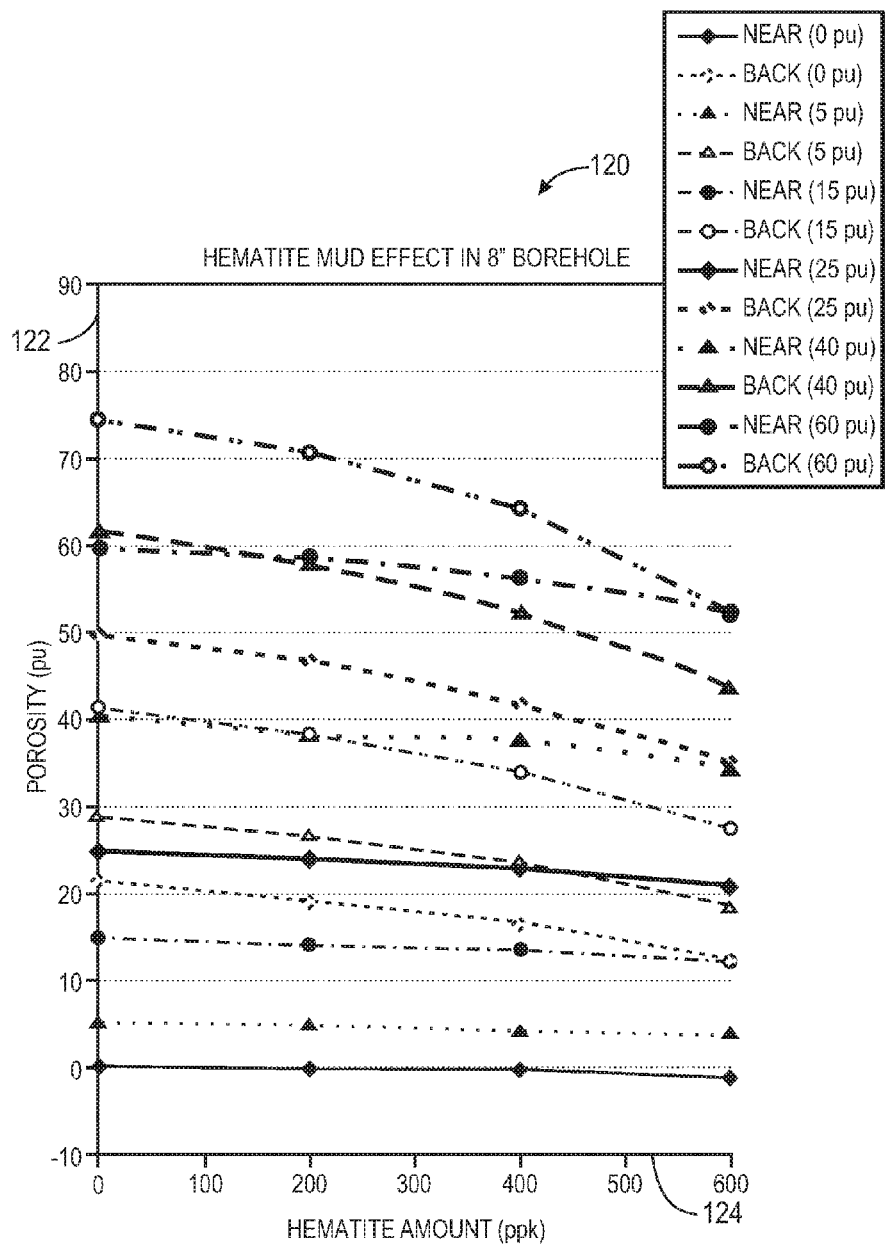
FIG. 10 is a plot modeling apparent porosities obtained from formation-facing and borehole-facing epithermal neutron detectors of the system of FIG. 1 at various concentrations of hematite mud in an 8 in. borehole, in accordance with an embodiment.
Figure 11:
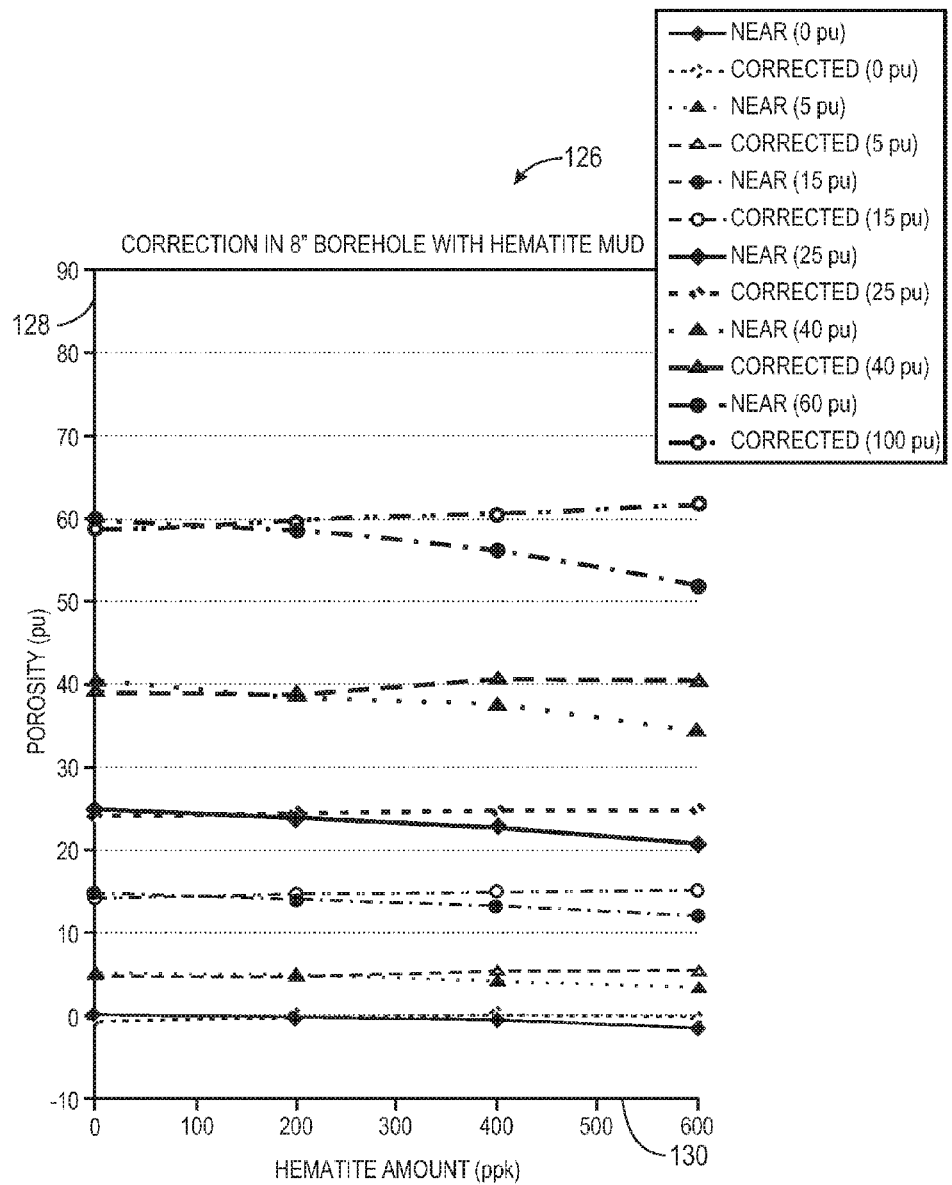
FIG. 11 is a plot modeling apparent porosities obtained from a formation-facing epithermal neutron detector of the system of FIG. 1 and corresponding corrected porosities at various concentrations of hematite mud in an 8 in. borehole, in accordance with an embodiment.

FIGS. 10 and 11 are plots modeling porosities determined based on epithermal neutron count rates when the borehole 42 has a diameter D of 8 inches and is filled with borehole fluid 46 of fresh water plus variable concentrations of hematite as a weighting material. Turning to FIG. 10, a plot 120 includes an ordinate 122 representing porosity in porosity units (p.u.) and an abscissa 124 representing various concentrations of hematite in the borehole fluid 46 in units of parts per thousand (ppk). Solid-symbol curves of the plot 120 represent apparent porosities calculated from epithermal neutron count rates obtained from the front-facing near neutron detector 24 when the formation 40 has certain true porosity values (e.g., 0, 5, 15, 25, 40, and 60 p.u.), while hollow-symbol curves of the plot 120 represent apparent porosities computed from epithermal neutron count rates obtained from the back-facing neutron detector 28 at the same true porosity values.

Similarly, a plot 126 of FIG. 11 includes an ordinate 128 representing porosity in porosity units (p.u.) and an abscissa 130 representing various concentrations of hematite in the borehole fluid 46 in units of parts per thousand (ppk). Solid-symbol curves of the plot 126 represent apparent porosities calculated from epithermal neutron count rates obtained from the front-facing near neutron detector 24 when the formation 40 has certain true porosity values (e.g., 0, 5, 15, 25, 40, and 60 p.u.), and hollow-symbol curves of the plot 126 represent corrected porosities calculated based on Equation (1) and the data represented in FIG. 10 at the same true porosity values. As evident from the plots 120 and 126, the correction also remains effective for various concentrations of hematite mud in the borehole fluid 46.

Figure 12:
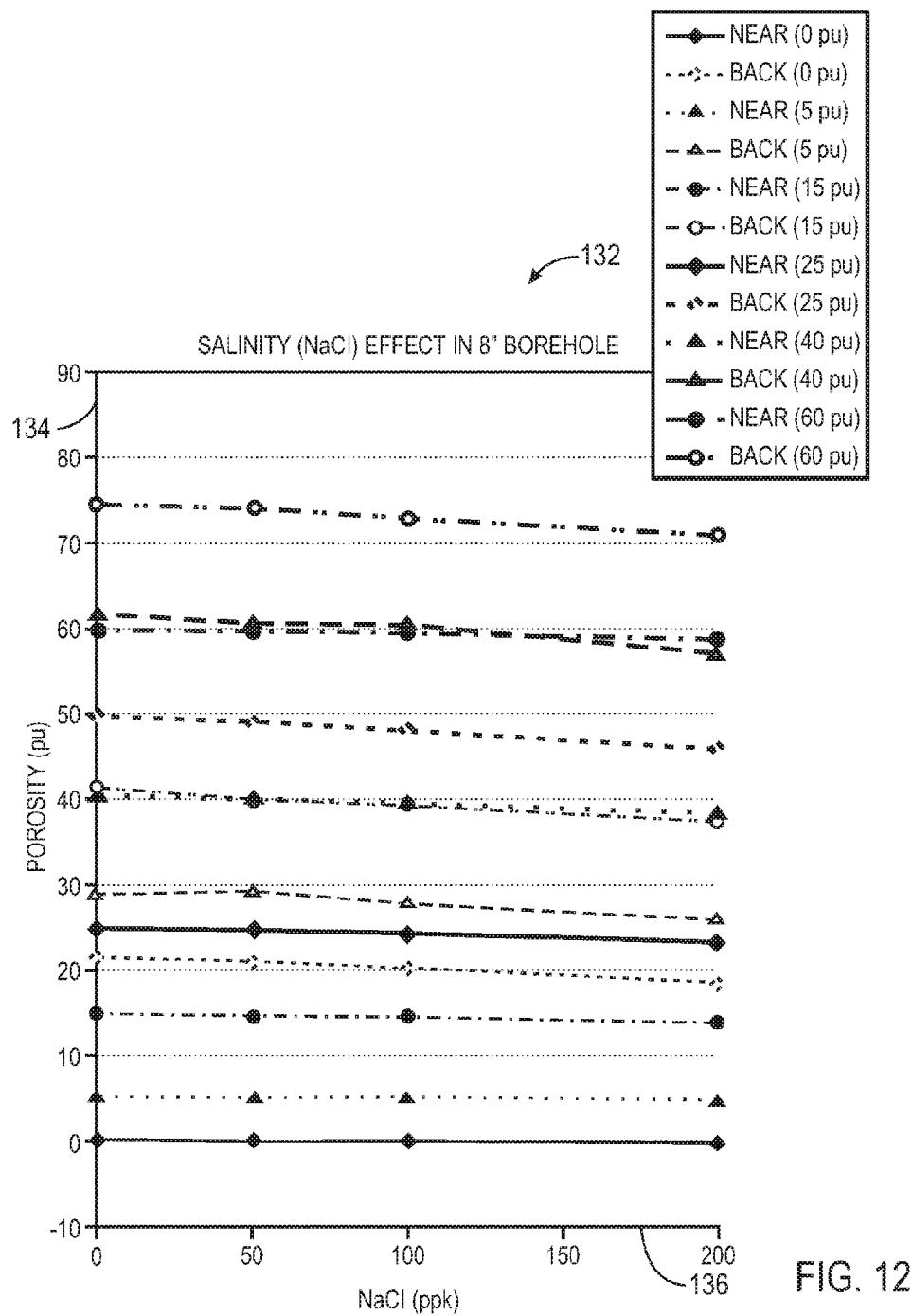
FIG. 12 is a plot modeling apparent porosities obtained from formation-facing and borehole-facing epithermal neutron detectors of the system of FIG. 1 at various salinities in an 8 in. borehole, in accordance with an embodiment.
Figure 13:
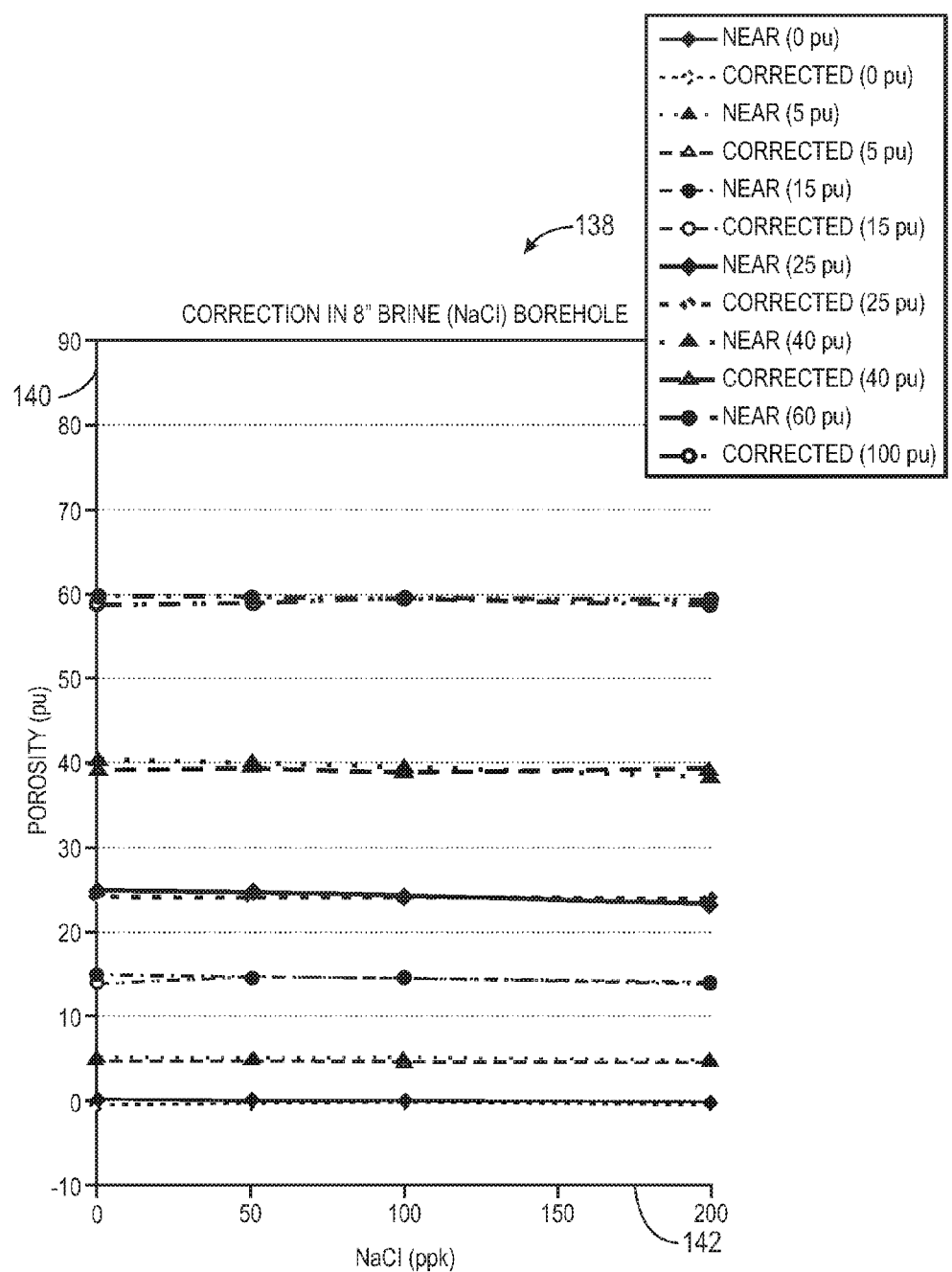
FIG. 13 is a plot modeling apparent porosities obtained from a formation-facing epithermal neutron detector of the system of FIG. 1 and corresponding corrected porosities at various salinities in an 8 in. borehole, in accordance with an embodiment.

FIGS. 12 and 13 are plots modeling porosities determined based on epithermal neutron count rates when the borehole 42 has a diameter D of 8 inches and is filled with borehole fluid 46 of fresh water plus variable concentrations of NaCl salt. Turning to FIG. 12, a plot 132 includes an ordinate 134 representing porosity in porosity units (p.u.) and an abscissa 136 representing various concentrations of NaCl salt in the borehole fluid 46 in units of parts per thousand (ppk). Solid-symbol curves of the plot 132 represent apparent porosities calculated from epithermal neutron count rates obtained from the front-facing near neutron detector 24 when the formation 40 has certain true porosity values (e.g., 0, 5, 15, 25, 40, and 60 p.u.), while hollow-symbol curves of the plot 132 represent apparent porosities computed from epithermal neutron count rates obtained from the back-facing neutron detector 28 at the same true porosity values.

A plot 138 of FIG. 13 also includes an ordinate 140 representing porosity in porosity units (p.u.) and an abscissa 142 representing various concentrations of NaCl salt in the borehole fluid 46 in units of parts per thousand (ppk). Solid-symbol curves of the plot 138 represent apparent porosities calculated from epithermal neutron count rates obtained from the front-facing near neutron detector 24 when the formation 40 has certain true porosity values (e.g., 0, 5, 15, 25, 40, and 60 p.u.), and hollow-symbol curves of the plot 138 represent corrected porosities calculated based on Equation (1) and the data represented in FIG. 12 at the same true porosity values. As evident from the plots 132 and 138, the correction also remains effective for various concentrations of NaCl salt in the borehole fluid 46.

In all of the plots of FIGS. 5, 7, 9, 11, and 13, the correction applied to obtain the corrected porosities is seen to largely compensate for the various differences in the size of the borehole 42 and composition of the borehole fluid 46. In total, considering all of the more than 500 cases modeled, the residual RMS error between the corrected porosity and the true porosity is improved by roughly a factor of four. In other words, this corrected residual RMS error is four times smaller than the original RMS error between the apparent near porosity (obtained from epithermal neutron count rates of the front-facing near neutron detector 24) and the true porosity. While the exact amount of improvement may depend upon the specific design of the downhole tool 12 (e.g., neutron source 18 energy, neutron detector 24, 26, and 28 spacing, placement of the shielding 22, and so forth) and the particular functional form chosen for corrected porosity, the techniques described above primarily rely on the different spatial sensitivities of the neutron detectors 24, 26, and 28, and thus, in general, may produce a corrected porosity despite these borehole 42 variations.

In certain situations, the configuration of the back-facing neutron detector 28 in the embodiment of the downhole tool 12 of FIG. 1 may not provide enough information about the borehole 42 to achieve the corrected porosity results above. When the borehole 42 is not cylindrical due to an elongation, the single back-facing neutron detector 28 may enable a somewhat imperfect correction for borehole effects because the single back-facing neutron detector 28 may be able to distinguish between borehole effects in only one azimuthal direction in the borehole 42. However, since an elongated borehole 42 is not necessarily symmetrical from the point of view of the downhole tool 12, the borehole effects may vary from one azimuthal direction to another within the borehole 42.

Figure 14:
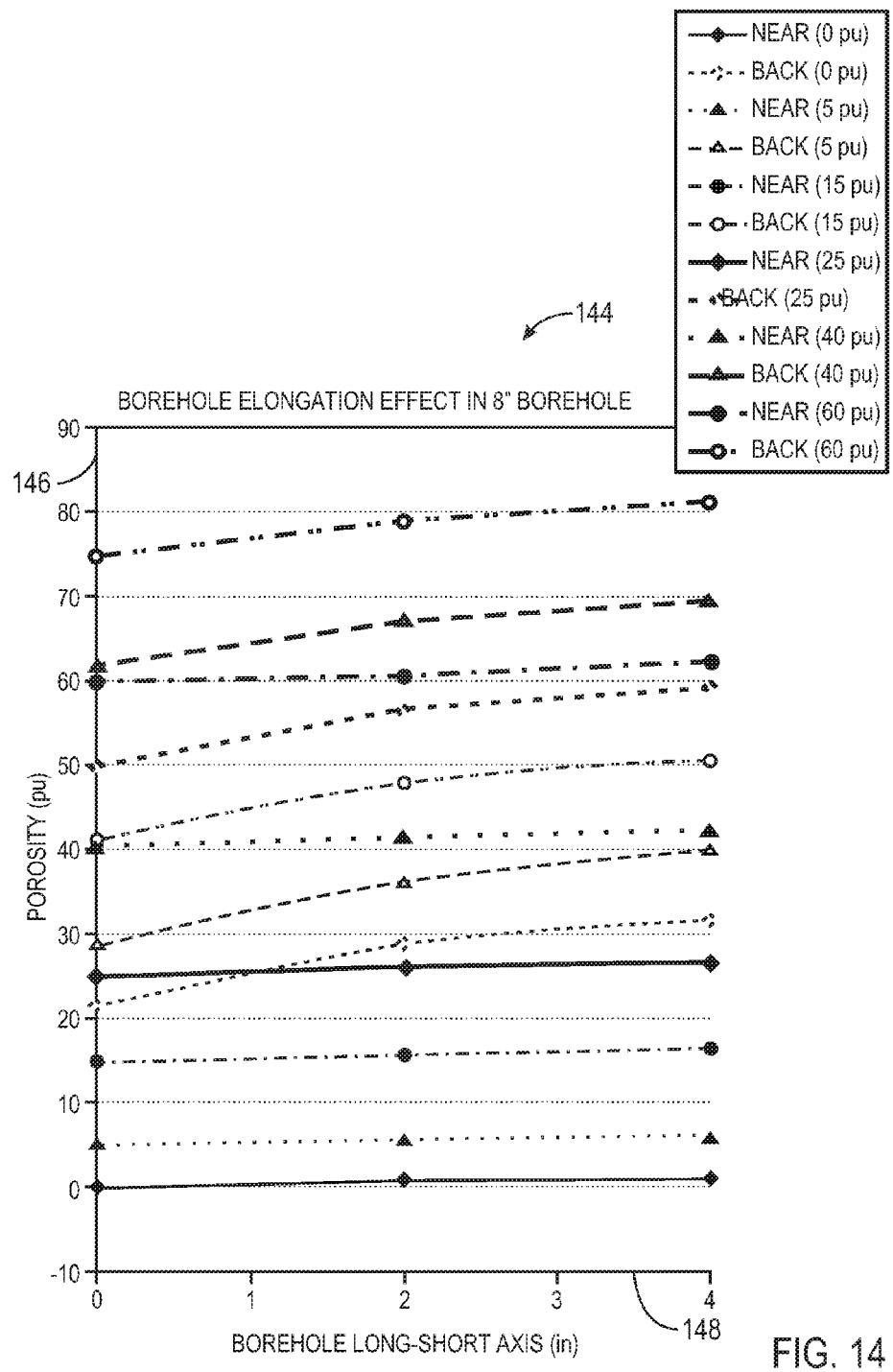
FIG. 14 is a plot modeling apparent porosities obtained from formation-facing and borehole-facing epithermal neutron detectors of the system of FIG. 1 at various borehole elongations, in accordance with an embodiment.
Figure 15:
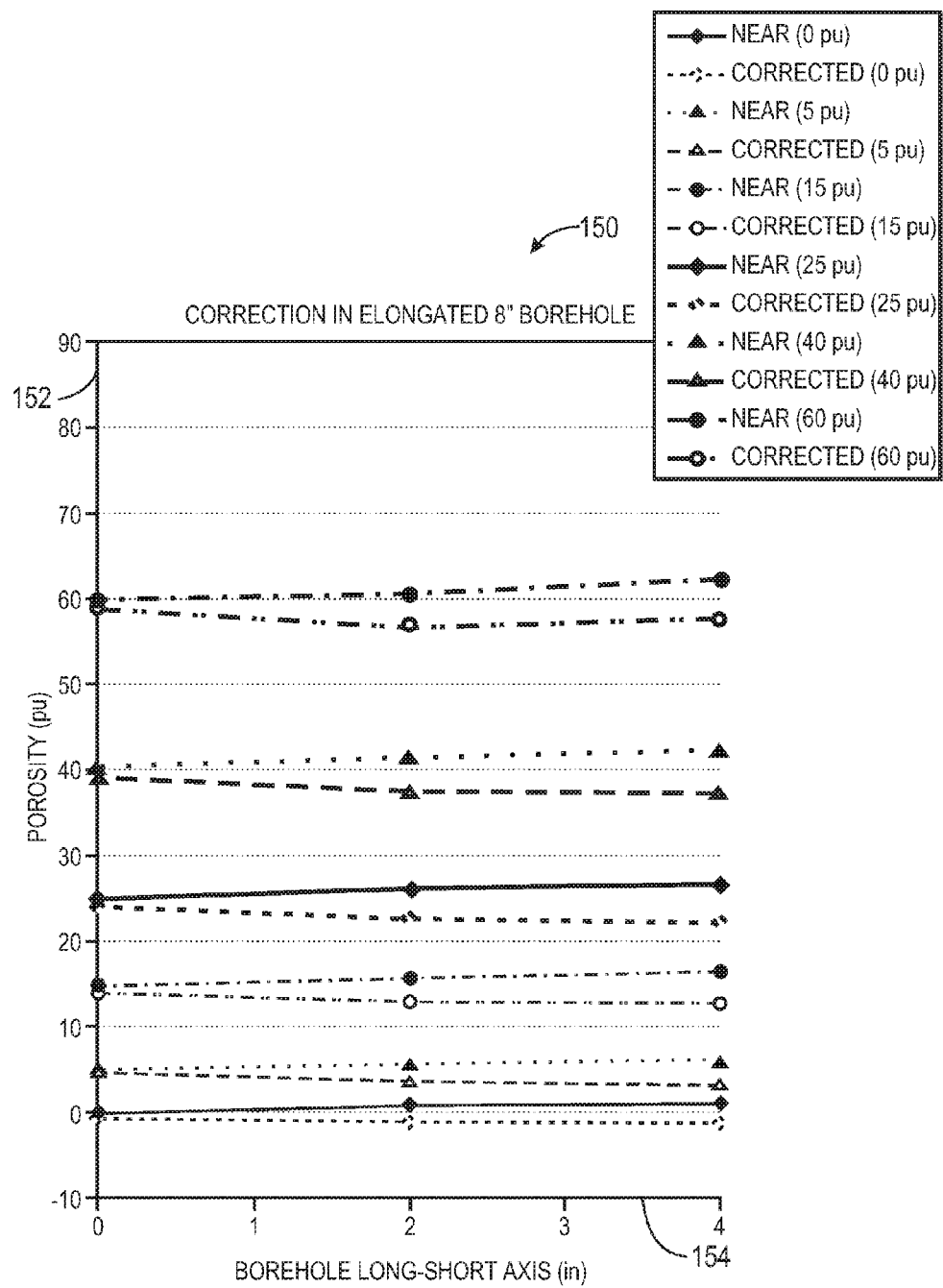
FIG. 15 is a plot modeling apparent porosities obtained from a formation-facing epithermal neutron detector of the system of FIG. 1 and corresponding corrected porosities at various borehole elongations, in accordance with an embodiment.

To illustrate the effect of an elongated borehole 42 on the above-described techniques, FIGS. 14 and 15 represent measurements modeled using MCNP as obtained in a borehole 42. The short axis of the borehole 42 is modeled to always be 8 inches, but the long axis of the borehole 42 is modeled to be elongated by 0 to 4 inches (i.e., the long axis varies from 8 inches to 12 inches). In FIGS. 14 and 15, as is typical for downhole measurement conditions, the downhole tool 12 is taken to be oriented along the long axis (i.e., the back detector is modeled as facing the elongated direction). Turning to FIG. 14, a plot 144 includes an ordinate 146 representing porosity in porosity units (p.u.) and an abscissa 148 representing the elongation of the long axis of the borehole 42 in units of inches. Solid-symbol curves of the plot 144 represent apparent porosities calculated from epithermal neutron count rates obtained from the front-facing near neutron detector 24 when the formation 40 has certain true porosity values (e.g., 0, 5, 15, 25, 40, and 60 p.u.), while hollow-symbol curves of the plot 144 represent apparent porosities computed from epithermal neutron count rates obtained from the back-facing neutron detector 28 at the same true porosity values. FIG. 15 is a plot 150 that includes an ordinate 152 representing porosity in porosity units (p.u.) and an abscissa 154 representing the elongation of the long axis of the borehole 42 in units of inches. Solid-symbol curves of the plot 150 represent apparent porosities calculated from epithermal neutron count rates obtained from the front-facing near neutron detector 24 when the formation 40 has certain true porosity values (e.g., 0, 5, 15, 25, 40, and 60 p.u.), and hollow-symbol curves of the plot 150 represent corrected porosities calculated based on Equation (1) and the data represented in FIG. 14 at the same true porosity values.

As may be seen in the corrected porosity curves (hollow-symbol curves) of the plot 150 of FIG. 15, the correction is somewhat overcorrecting. This condition is understandable, since the back-facing neutron detector 28 is more influenced by the long axis than the front-facing near neutron detector 24. Conversely, the front-facing near neutron detector 24 is relatively more sensitive to the short axis (i.e., the borehole fluid 46 to the sides of the downhole tool 12). With only two neutron detectors detecting neutrons, the current fit represents a compromise. A better correction could be obtained by placing additional neutron detectors on the sides of the downhole tool 12 to obtain apparent porosities with additional directional biases to correct for more complex borehole 42 shapes. One such embodiment is described in greater detail below with reference to FIGS. 33 and 34 below.

In the embodiments described above with reference to FIGS. 3-15, each apparent porosity was computed from a single neutron detector count rate (e.g., an epithermal neutron count rate of the front-facing neutron detector 24 or an epithermal neutron count rate of the back-facing neutron detector 28). However, the downhole tool 12 may instead compute apparent porosity from a ratio of thermal neutron detector count rates at different spacings (e.g., from a ratio of front-facing near neutron detector 24 count rates to far neutron detector 26 count rates). While obtaining such a ratio porosity does reduce the porosity sensitivity of the downhole tool 12, it also reduces the sensitivity of the downhole tool 12 to a number of other unwanted effects, whose residual contribution will need to be corrected for.

Using ratios to determine apparent porosity may be especially important when the downhole tool 12 employs thermal neutron detectors as the neutron detectors 24, 26, and/or 28, since thermal neutron count rates are very sensitive to certain elements containing isotopes with large thermal neutron cross sections (e.g., chlorine). For example, when the borehole fluid 46 includes a high salinity brine and the neutron detectors 24, 26, and 28 are thermal neutron detectors, the sensitivity of the downhole tool 12 to chlorine may be comparable to its hydrogen sensitivity (and, accordingly, its porosity sensitivity). Fortunately, the loss of thermal neutron count rates due to chlorine tends to be localized around each of the neutron detectors 24, 26, and 28. In other words, most of the transport of the neutrons from the neutron source 18 to each neutron detector 24, 26, or 28 may be dominated by scattering off hydrogen nuclei. It is only when neutrons have slowed to thermal or near-thermal energies in the vicinity of the neutron detector 24, 26, or 28 that thermal neutron capture cross sections impact the thermal neutron count rates.

As such, thermal neutron capture effects are not very dependent on the source-detector spacing (i.e., their relative impact is similar on all of the neutron detectors 24, 26, and 28 despite their variable spacing). On the other hand, the elastic scattering effects of the neutrons due to hydrogen, which underlie the neutron porosity measurement, are a strong function of the distance and, therefore, the spacing of the neutron detectors 24, 26, and 28 from the neutron source 18. For this reason, the application of a ratio of neutron count rates may generally cancel out thermal capture effects, such as those due to chlorine, to a much larger degree than it will cancel out porosity effects. Hence, the use of a ratio of neutron count rates from the front-facing near neutron detector 24 to those of the front-facing far neutron detector 28 may provide a net improvement of the accuracy of thermal neutron porosity obtained by the downhole tool 12 in the presence of neutron absorbers, such as chlorine, in the borehole 42 or in the formation 40.

With the foregoing in mind, certain embodiments of the operation 38 of FIG. 2 may take place using an embodiment of the downhole tool 12 in which the front-facing near and far neutron detectors 24 and 26 and the back-facing neutron detector 28 are all thermal neutron detectors. A front-facing apparent porosity may be obtained based on a ratio of thermal neutron count rates from the front-facing near neutron detector 24 and the front-facing far neutron detector 26 (i.e., near/far). A back-facing apparent porosity may be obtained based on a ratio of thermal neutron count rates from the back-facing neutron detector 28 to the front-facing far neutron detector 26 (i.e, back/far) or alternatively to the front-facing near neutron detector 24 (i.e. back/near). The discussion below with reference to FIGS. 16-32 relates to calculating a corrected porosity based at least in part on near/far and back/far ratios of thermal neutron count rates using an embodiment of the downhole tool 12 in which the neutron detectors 24, 26, and 28 are thermal neutron detectors.

Figure 16:
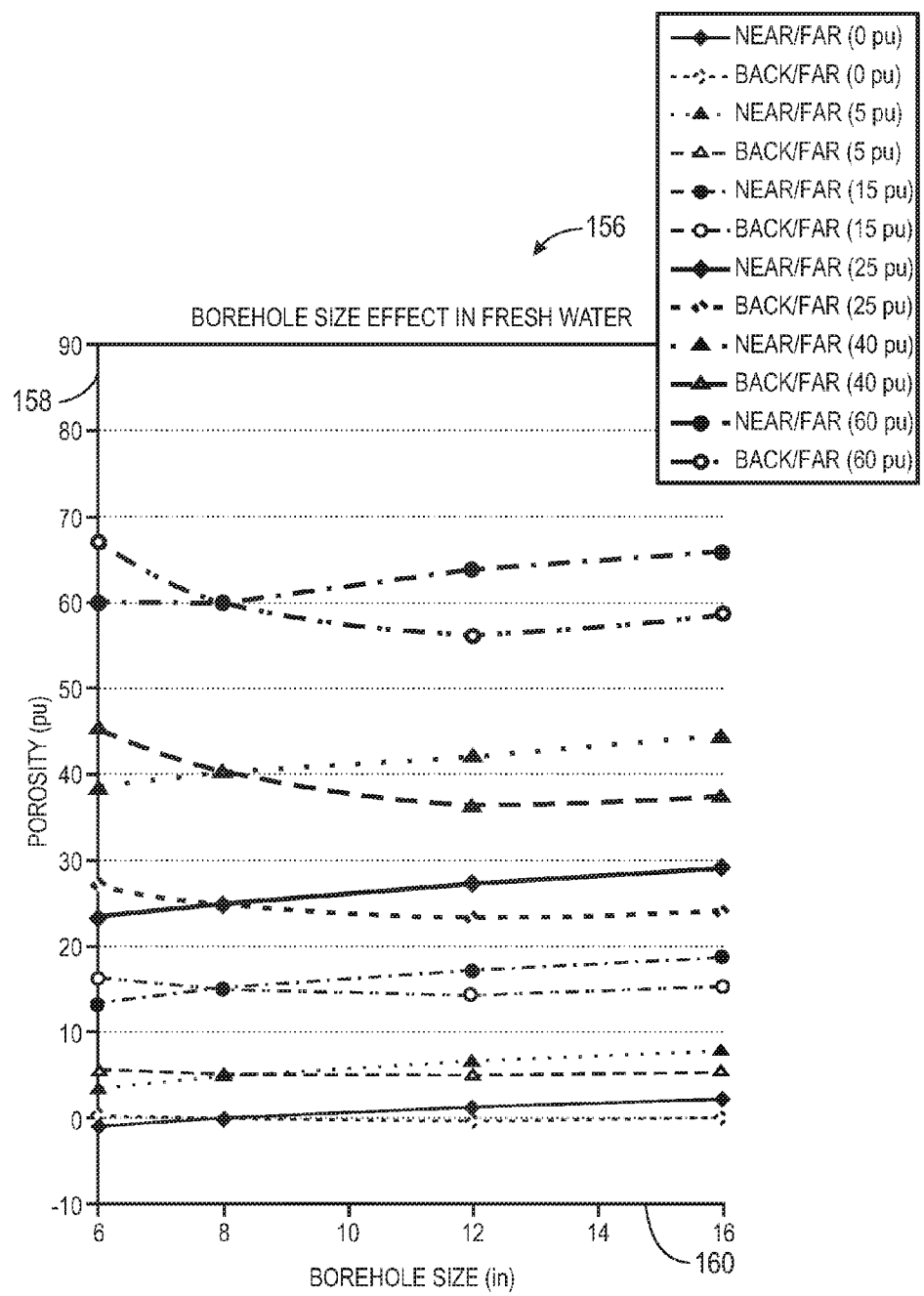
FIG. 16 is a plot modeling apparent porosities obtained from formation-facing near and far and borehole-facing thermal neutron detectors of the system of FIG. 1 at various borehole diameters filled with fresh water, in accordance with an embodiment.

As such an operation 38 takes place, the number of thermal neutrons that reaches the front-facing neutron detectors 24 and 26 and the back-facing neutron detector 28 may vary significantly depending on the borehole diameter D and the composition of the borehole fluid 46. For example, FIG. 16 represents a plot modeling front-facing and back-facing apparent porosities obtained using near/far and back/far ratios of thermal neutron count rates at various diameters D of the borehole 42 when the borehole fluid 46 is fresh water. To obtain the plot of FIG. 16, as well as FIGS. 18-32, the thermal neutron count rates were computed using MCNP, and then converted to apparent porosities via a curve fit to near/far and back/far count rate ratios from modeling data for certain standard conditions (calcite formation, 8 in. borehole, fresh water borehole fluid, 20° C., 1 atm, and so forth).

Plot 156 of FIG. 16 includes an ordinate 158 representing porosity in porosity units (p.u.) and an abscissa 160 representing the diameter D of the borehole 42 in units of inches. Solid-symbol curves of the plot 156 represent apparent porosities calculated from a near/far ratio of thermal neutron count rates obtained from the front-facing near and far neutron detectors 24 and 26 when the formation 40 has certain true porosity values (e.g., 0, 5, 15, 25, 40, and 60 p.u.). Hollow-symbol curves of the plot 156 represent apparent porosities computed from a back/far ratio of thermal neutron count rates obtained from the back-facing neutron detector 28 and the front-facing far neutron detector 26 at the same true porosity values. The borehole size effect shown in FIG. 16 is clearly different for near/far and back/far apparent porosities, but the interpretation is not as simple, because the borehole size effect now depends on the relative sensitivities to borehole size of each of the detectors in the ratio. Here, since the near/far apparent porosities (solid symbols) still increase with borehole size, it may be seen that the front-facing near neutron detector 24 has a larger borehole size effect than the front-facing far neutron detector 26.

While a borehole correction based on a polynomial expansion of near/far and back/far apparent porosities may suffice for epithermal neutron count rate ratios, generally it may work less well for thermal ratio porosities. Indeed, thermal absorbers, such as chlorine, near each of the neutron detectors 24, 26, and/or 28 can substantially alter each detector's borehole sensitivity in ways that may partially survive taking the ratio. While it should be appreciated that the approach outlined above involving epithermal neutron detectors may also be employed using thermal neutron, in certain embodiments, a correction involving thermal neutron ratio porosities may involve additional dependencies.

Accordingly, a downhole well logging operation for determining a corrected porosity may be carried out in a manner that may consider additional information due to the effect of thermal absorbers on the thermal neutron count rates of each of the neutron detectors 24, 26, and 28. A flowchart 170, shown in FIG. 17, describes one embodiment of a method for obtaining the corrected porosity using the downhole tool 12, when the neutron detectors 24, 26, and 28 are thermal neutron detectors. In a first step 172, the downhole tool 12 may be deployed into the subterranean formation 40 on a wireline or slickline, in a borehole assembly (BHA) while the borehole 42 is being drilled or in any other suitable mode of conveyance. In step 174, the neutron source 18 may emit neutrons (illustrated as the neutron emission 48 in FIG. 2) into the surrounding subterranean formation 40. Because, as discussed below, a correction may involve considering the thermal neutron decay time τ associated with one or more of the neutron detectors 24, 26, and/or 28, the neutron emission 48 may take place in pulsed bursts of neutrons rather than a continuous stream of neutrons. Depending on the interactions 50 of the neutron emission 48 with elements surrounding the downhole tool 12, varying numbers of neutrons may reach the neutron detectors 24, 26, and 28. In particular, the number of neutrons detected by the back-facing neutron detector 28 may be significantly more affected by the size of the borehole 42 and the composition of the borehole fluid 46 than the number of neutrons detected by the front-facing near and far neutron detectors 24 and 26.

These neutrons may be detected by the front-facing near and far neutron detectors 24 and 26 and the back-facing neutron detector 28 in step 176. In step 178, the data processing system 14 may determine, based on these neutron count rates, a near/far ratio apparent porosity $\phi_{n/f}$ and a back/far ratio apparent porosity $\phi_{b/f}$ using any suitable techniques for computing porosity. In step 180, the data processing circuitry may determine one or more thermal decay times $\tau_{near}$, $\tau_{far}$, and/or $\tau_{back}$, respectively associated with each of the neutron detectors 24, 26, and/or 28.

The contribution of thermal absorbers, such as chlorine, may be quantified in terms of the thermal decay time $\tau$, which is the mean decay time of the thermal neutron population. Using a pulsed neutron generator as the neutron source 18, such as have existed in the oilfield for many years, it is straight-forward to measure $\tau$ as seen by one or more of the neutron detectors 24, 26, and/or 28. In actual downhole conditions, the observed thermal neutron decay $\tau$ is often more complex than a single exponential (e.g., the thermal neutron decay may be due to different capture cross sections and, hence, different decay times for the borehole 42 versus the formation 40, or due to neutron diffusion effects). However, it may be sufficient to neglect these effects and to compute a single apparent decay time $\tau$ for one or more of the neutron detectors 24, 26, and 28.

In step 182 the data processing system 14 may compute a corrected porosity $\phi_{corr}$ based on a relationship between the near/far apparent porosity $\phi_{n/f}$, the back/far apparent porosity $\phi_{b/f}$, and one or more of a near apparent thermal decay time $\tau_{near}$, a back apparent thermal decay time $\tau_{back}$, and a far apparent thermal decay $\tau_{far}$. Such a relationship may include, for example, the following:

$$\varphi_{corr} = \sum_{ij}^{i+j\leq n} a_{ij}\varphi_{n/f}^i\varphi_{b/f}^j + \sum_{i}^{i\leq p}\sum_{klm}^{0<k+l+m\leq q} \varphi_{n/f}^i b_{iklm}\tau_{near}^k\tau_{back}^l\tau_{far}^m, \quad (2)$$

where n, p, and q represent the degree of the polynomials and the coefficients $a_{ij}$ and $b_{iklm}$ are chosen to minimize the deviation between the corrected porosity and the true porosity where in this minimization the detector count rates and hence apparent porosities and apparent decay times may be obtained experimentally or by way of computer modeling data. Note that, while the decay time dependent terms do have some porosity dependence, it is generally sufficient to use just one of the apparent porosities for this (e.g., $\phi_{n/f}$) and to only use lower order terms (i.e., p≤n). Moreover, although Equation (2) relies on polynomials, it should be understood that any suitable functional form may be employed to compute the corrected porosity $\phi_{corr}$ in the manner described above. Also note that while the preferred embodiment would make use of decay times from each of the detectors, in alternate embodiments one or more of the decay times (e.g., $\tau_{near}$ or $\tau_{far}$) may be omitted. Additionally or alternatively to steps 74, 76, and 78, the data processing system 14 may determine the porosity directly from the thermal neutron count rates using a transform derived from modeled and/or experimental data relating the thermal neutron count rates and their time dependence to various borehole and formation conditions. Additionally or alternatively, the data processing circuitry may determine the corrected porosity by an inversion of a forward model giving the expected count rates (or apparent porosities) and their time dependence (or thermal decay times) as a function of the true porosity and other formation 40 and borehole 42 conditions.

Figure 17:
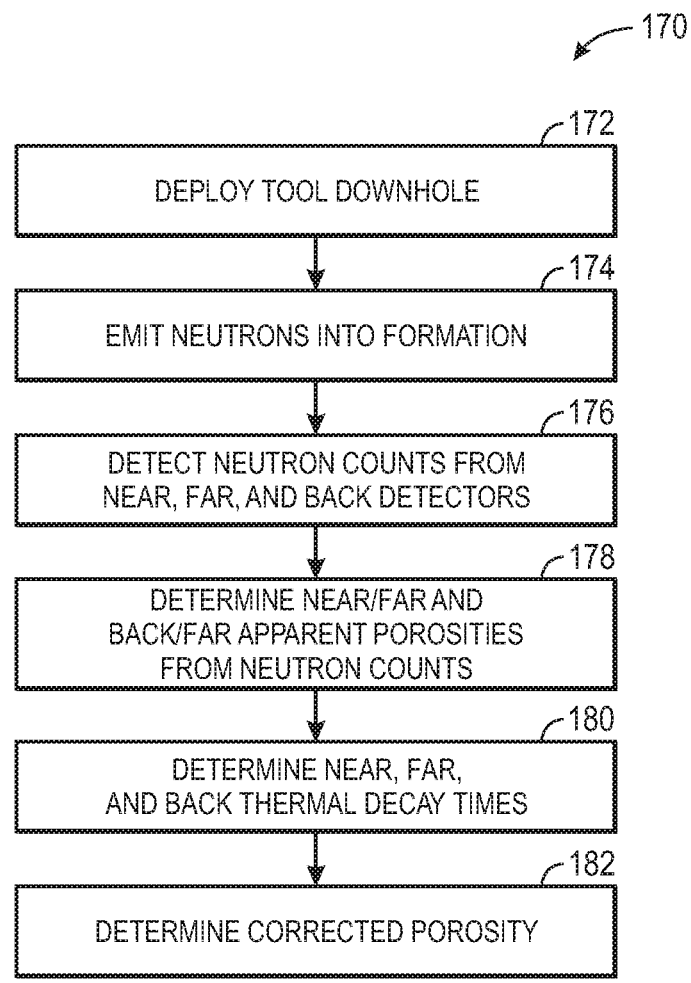
FIG. 17 is a flowchart describing an embodiment of a method for obtaining a corrected porosity based on apparent porosities obtained from formation-facing near and far thermal neutron detectors and a borehole-facing thermal neutron detector of the system of FIG. 1.

To evaluate the technique for obtaining the corrected porosity $\phi_{corr}$ of the flowchart 170 of FIG. 17, over 500 MCNP modeling runs were performed spanning various combinations of porosity, size of the borehole 42, shape of the borehole 42, and borehole fluid 46 composition. Regarding the borehole fluid 46 composition modeling, various weighting material types, weighting material amounts, brine types, and salinities were included. The results of certain modeling runs are illustrated in FIGS. 18-32, and are fit using Equation (2), with n=3, p=1, and q=2. Note that all the corrected porosity results shown in FIGS. 18-32 derive from a single fit (e.g., from one set of fit coefficient $a_{ij}$ and $b_{iklm}$ values).

Figure 18:
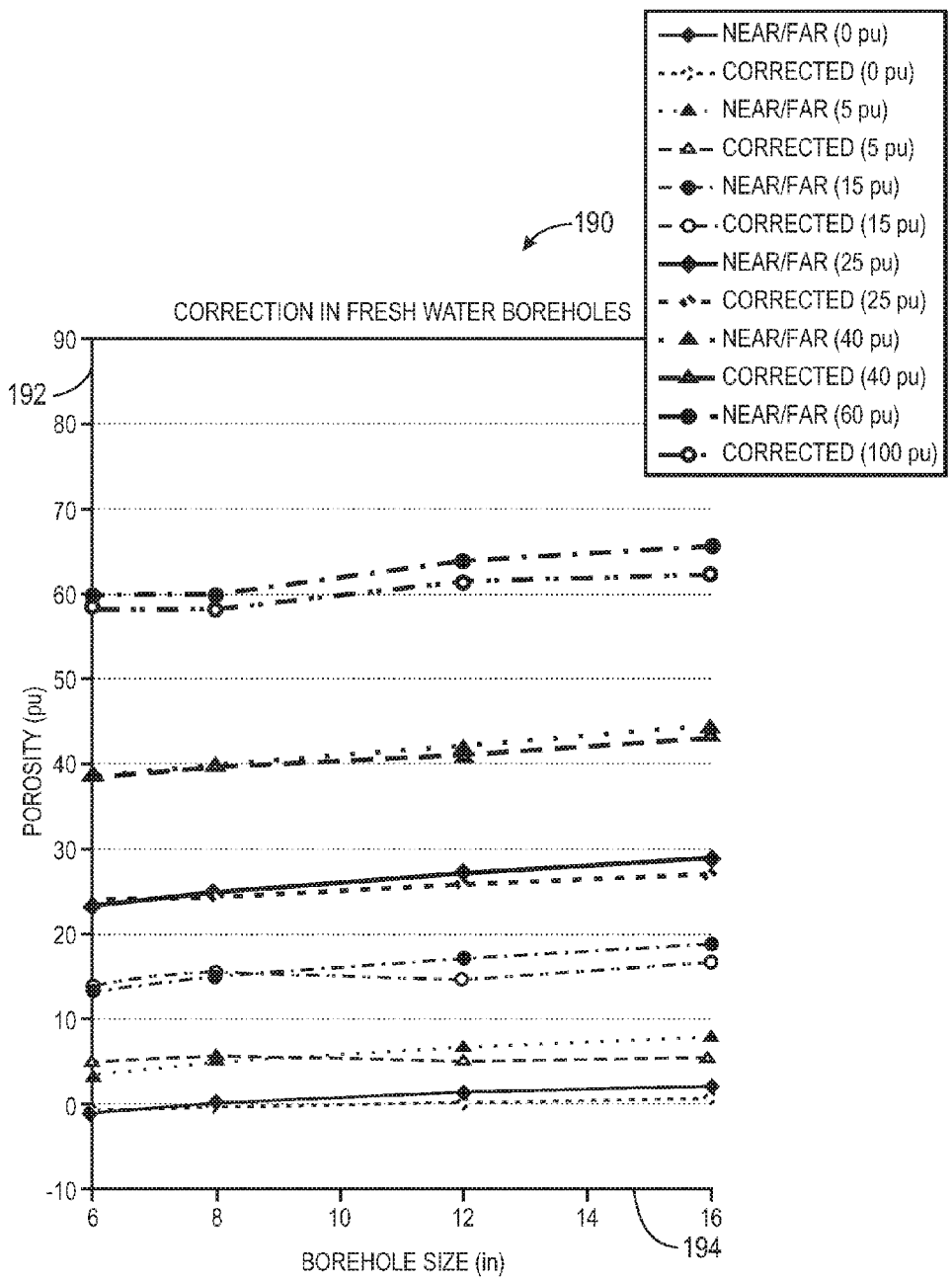
FIG. 18 is a plot modeling apparent porosities obtained from formation-facing near and far thermal neutron detectors of the system of FIG. 1 and corresponding corrected porosities at various borehole diameters filled with fresh water, in accordance with an embodiment.

The corrected values of porosity for various borehole sizes in fresh water borehole fluid 46 appear in a plot 190 of FIG. 18. An ordinate 192 of the plot 190 represents porosity in porosity units (p.u.) and an abscissa 194 represents the diameter D of the borehole 42 in units of inches. Solid-symbol curves of the plot 190 represent apparent porosities calculated from near/far ratios of thermal neutron count rates obtained from the front-facing near and far neutron detectors 24 and 26 when the formation 40 has certain true porosity values (e.g., 0, 5, 15, 25, 40, and 60 p.u.). Hollow-symbol curves of the plot 190 represent corrected porosities calculated based on Equation (2) and the data represented in FIG. 16 at the same true porosity values. As can be seen from curves of the plot 190, the size of the correction for apparent porosities determined from thermal neutron count rate ratios in fresh water is smaller than in the example described above with reference to FIGS. 3-15, in which apparent porosities were determined based on single epithermal neutron count rates. Thus, the improvement from apparent to corrected porosity shown in FIG. 18 may not be as dramatic as that shown in FIG. 5. Nevertheless, in FIG. 18, the corrected porosity readings are seen to be closer to the true values of porosity than the apparent porosities based on a single near/far ratio of thermal neutron count rates.

Figure 19:
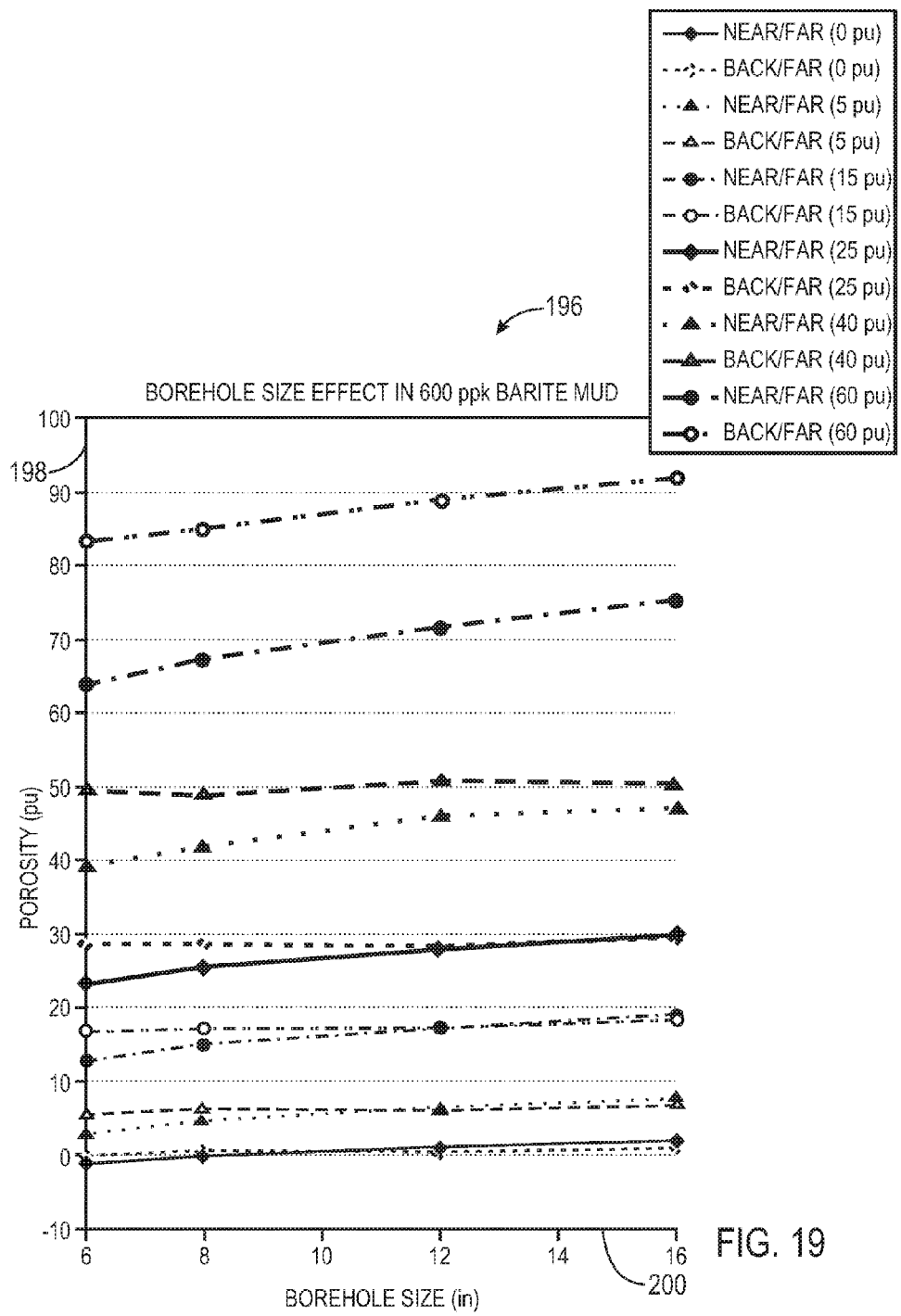
FIG. 19 is a plot modeling apparent porosities obtained from formation-facing near and far and borehole-facing thermal neutron detectors of the system of FIG. 1 at various borehole diameters filled with 600 ppk barite mud, in accordance with an embodiment.
Figure 20:
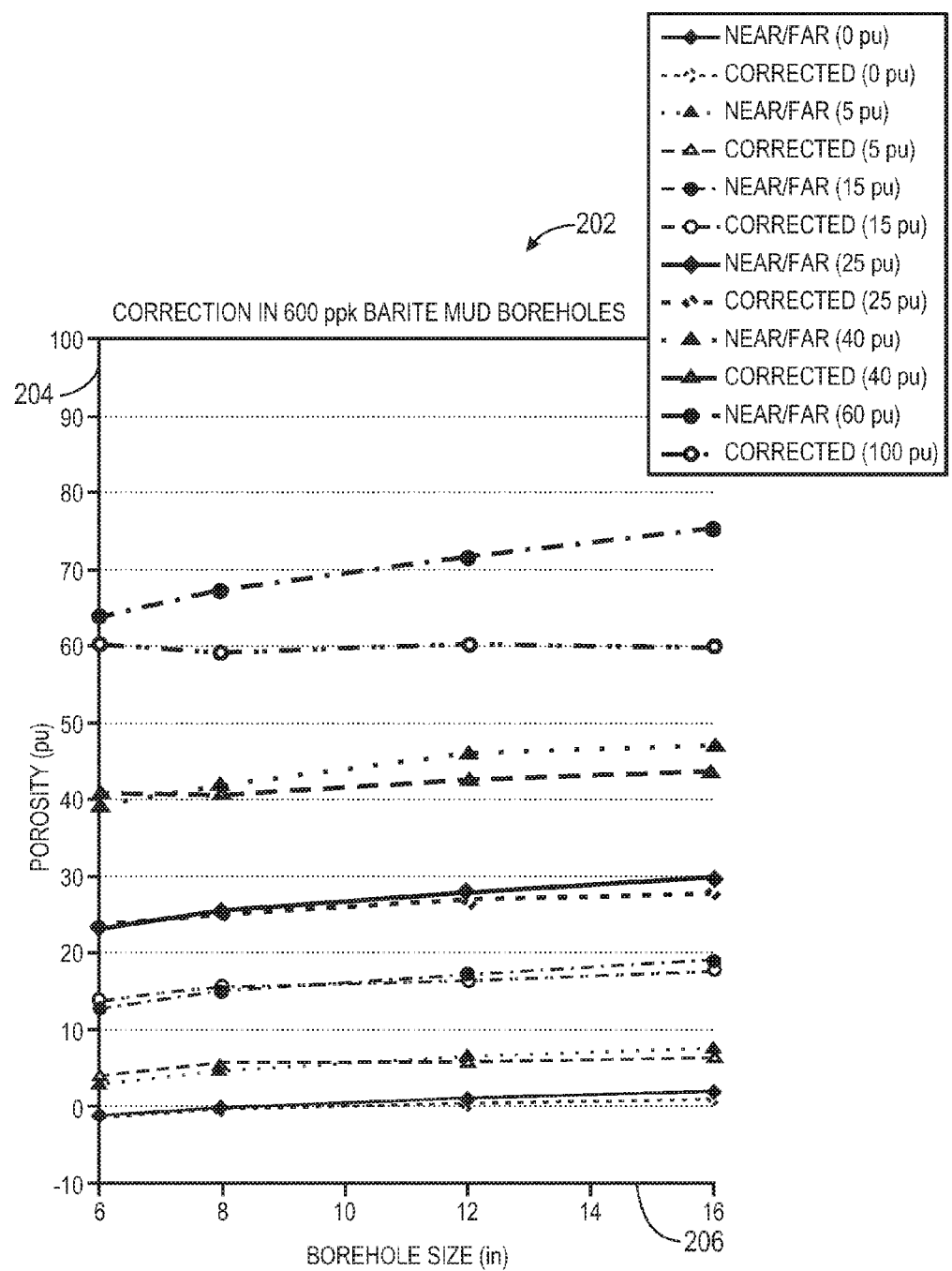
FIG. 20 is a plot modeling apparent porosities obtained from formation-facing near and far thermal neutron detectors of the system of FIG. 1 and corresponding corrected porosities at various borehole diameters filled with 600 ppk barite mud, in accordance with an embodiment.

FIGS. 19 and 20 are plots modeling porosities determined based on ratios of thermal neutron count rates when the borehole 42 is filled with a borehole fluid 46 of fresh water plus 600 parts per thousand (ppk) barite as a weighting material (i.e., 600 kg of barite and 400 kg of fresh water per 1000 kg of borehole fluid 46). Turning to FIG. 19, a plot 196 includes an ordinate 198 representing porosity in porosity units (p.u.) and an abscissa 200 representing the diameter D of the borehole 42 in units of inches. Solid-symbol curves of the plot 196 represent apparent porosities calculated from near/far ratios of thermal neutron count rates obtained from the front-facing near and far neutron detectors 24 and 26 when the formation 40 has certain true porosity values (e.g., 0, 5, 15, 25, 40, and 60 p.u.). Hollow-symbol curves of the plot 196 represent apparent porosities computed from back/far ratios of thermal neutron count rates obtained from the back-facing neutron detector 28 and the front-facing far neutron detector 26 at the same true porosity values.

FIG. 20 presents a plot 202 modeling corrected values of porosity as a function of borehole size when the borehole fluid 46 is 600 ppk barite mud. An ordinate 204 of the plot 202 represents porosity in porosity units (p.u.) and an abscissa 206 represents the diameter D of the borehole 42 in units of inches. Solid-symbol curves of the plot 202 represent apparent porosities calculated from near/far ratios of thermal neutron count rates obtained from the front-facing near and far neutron detectors 24 and 26 when the formation 40 has certain true porosity values (e.g., 0, 5, 15, 25, 40, and 60 p.u.). Hollow-symbol curves of the plot 202 represent corrected porosities calculated based on Equation (2) and the data represented in FIG. 19 at the same true porosity values. As shown by the plots 196 of FIG. 19 and 202 of FIG. 20, a much larger error between apparent porosity and true porosity arises when the borehole fluid 46 is barite mud. However, as is also apparent from these plots, the applied correction is also effective, and the corrected porosities of the plot 202 of FIG. 20 (hollow-symbol curves) are much closer to the true porosities than the apparent porosities (solid-symbol curves).

Figure 21:
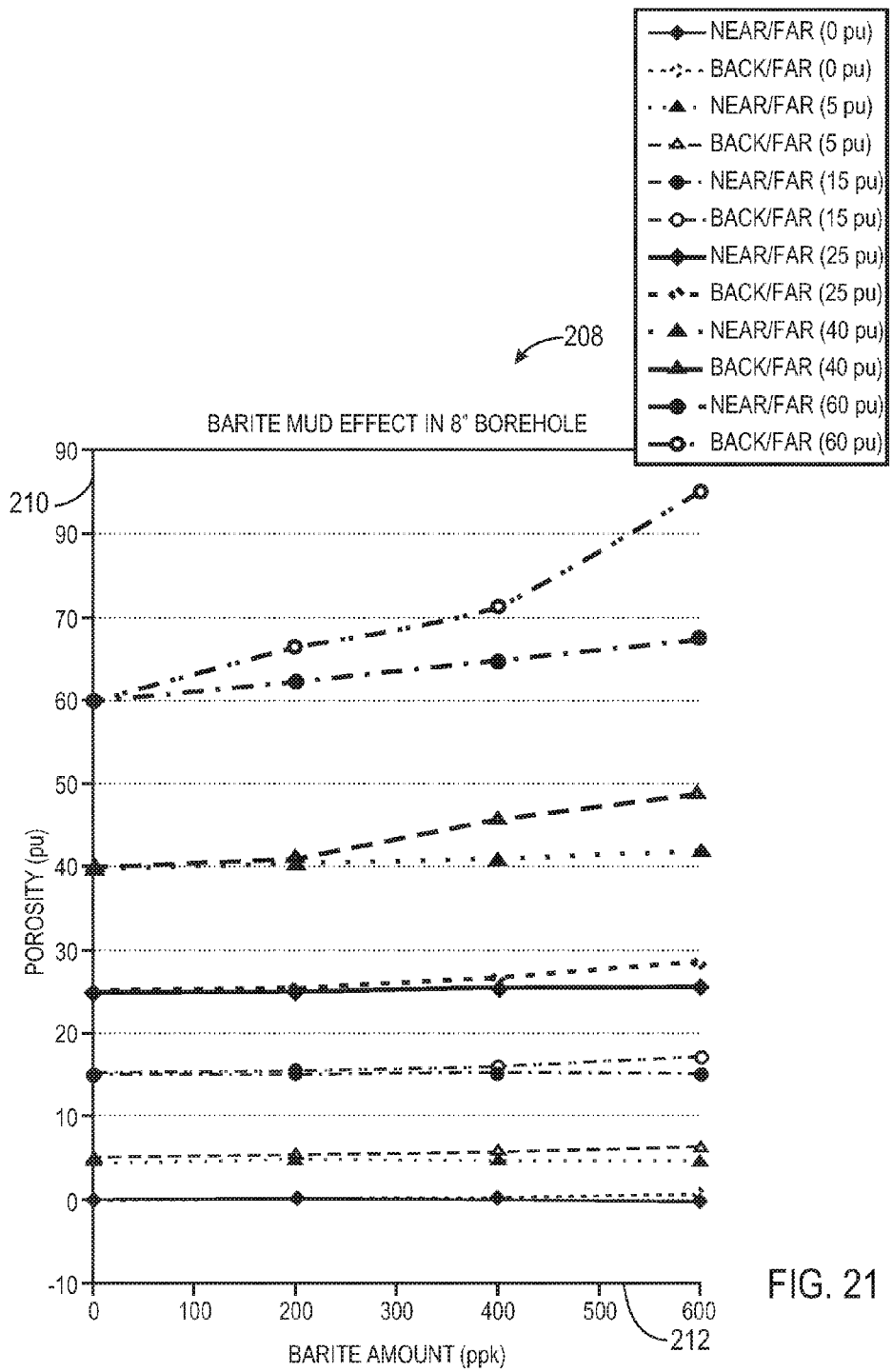
FIG. 21 is a plot modeling apparent porosities obtained from formation-facing near and far and borehole-facing thermal neutron detectors of the system of FIG. 1 at various concentrations of barite mud in an 8 in. borehole, in accordance with an embodiment.
Figure 22:
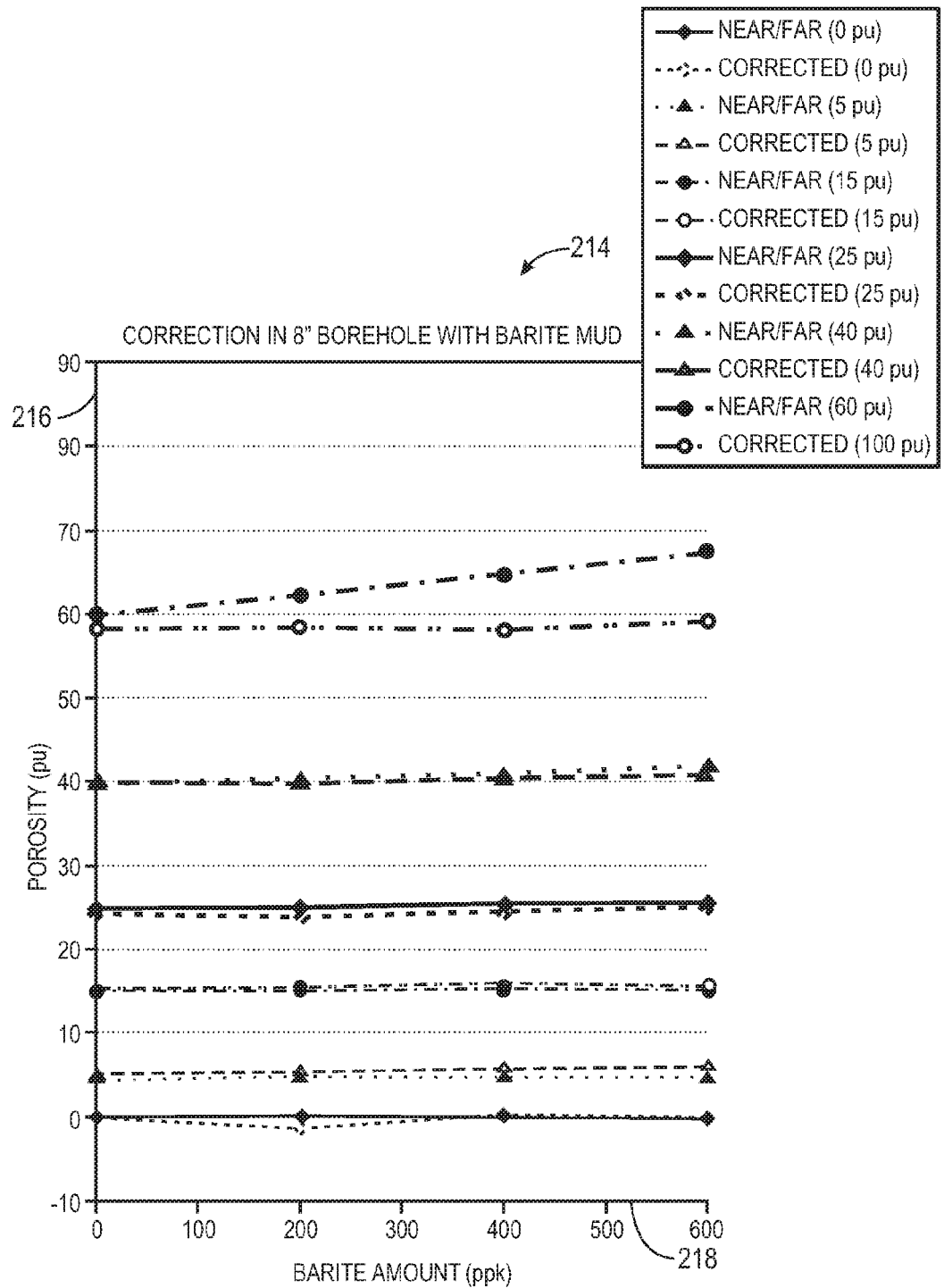
FIG. 22 is a plot modeling apparent porosities obtained from formation-facing near and far thermal neutron detectors of the system of FIG. 1 and corresponding corrected porosities at various concentrations of barite mud in an 8 in. borehole, in accordance with an embodiment.

FIGS. 21 and 22 are plots modeling porosities determined based on ratios of thermal neutron count rates when the borehole 42 is filled with a borehole fluid 46 of fresh water plus a variable concentration of barite as a weighting material. Turning to FIG. 21, a plot 208 includes an ordinate 210 representing porosity in porosity units (p.u.) and an abscissa 212 representing a concentration of barite in units of parts per thousand (ppk). Solid-symbol curves of the plot 208 represent apparent porosities calculated from near/far ratios of thermal neutron count rates obtained from the front-facing near and far neutron detectors 24 and 26 when the formation 40 has certain true porosity values (e.g., 0, 5, 15, 25, 40, and 60 p.u.). Hollow-symbol curves of the plot 208 represent apparent porosities computed from back/far ratios of thermal neutron count rates obtained from the back-facing neutron detector 28 and the front-facing far neutron detector 26 at the same true porosity values.

Similarly, FIG. 22 presents a plot 214 modeling corrected values of porosity as a function of barite concentration in the borehole fluid 46 when the borehole 42 has a diameter D of 8 in. An ordinate 216 of the plot 214 represents porosity in porosity units (p.u.) and an abscissa 218 represents barite concentration in units of parts per thousand (ppk). Solid-symbol curves of the plot 214 represent apparent porosities calculated from near/far ratios of thermal neutron count rates obtained from the front-facing near and far neutron detectors 24 and 26 when the formation 40 has certain true porosity values (e.g., 0, 5, 15, 25, 40, and 60 p.u.). Hollow-symbol curves of the plot 214 represent corrected porosities calculated based on Equation (2) and the data represented in FIG. 21 at the same true porosity values.

Figure 23:
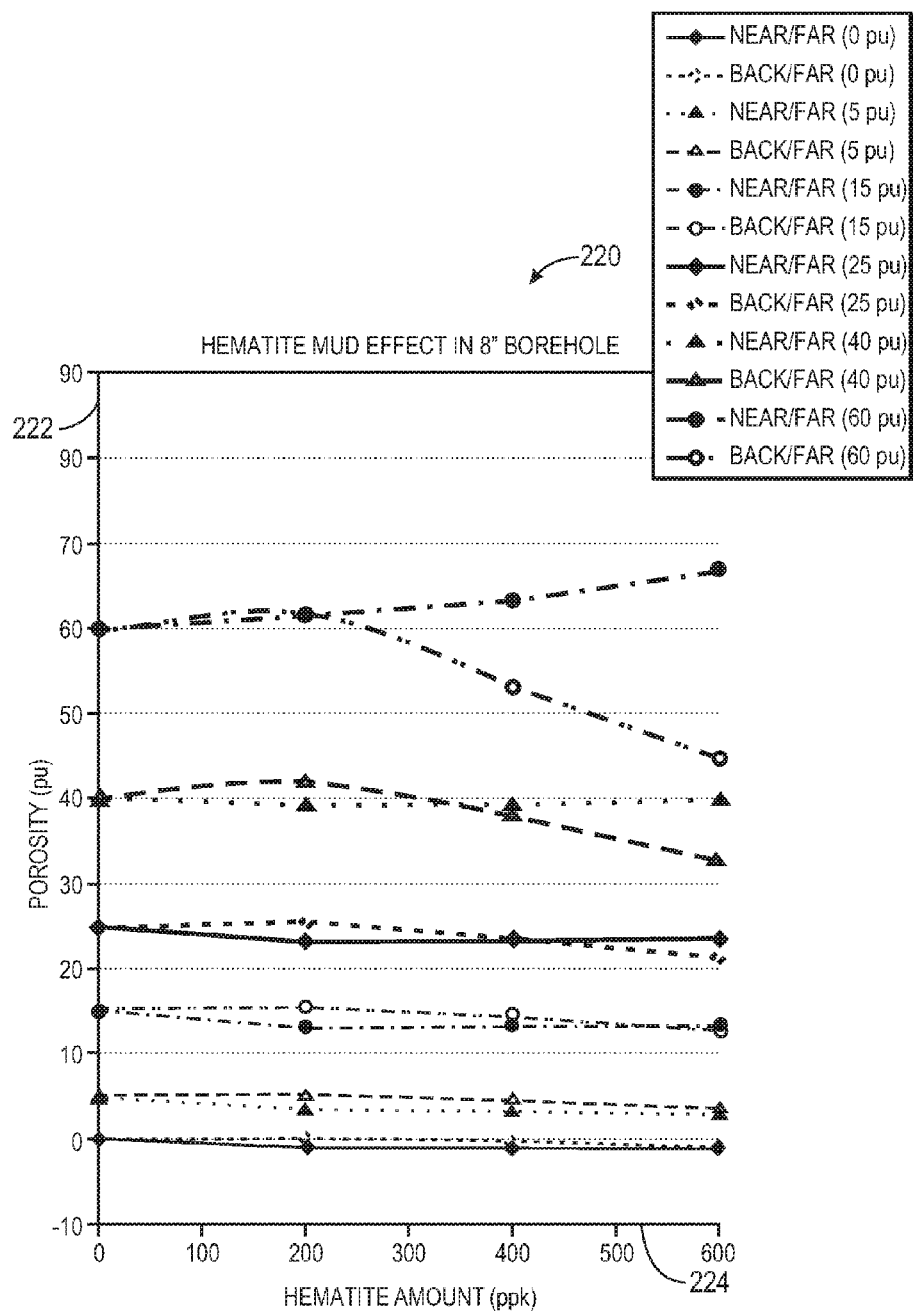
FIG. 23 is a plot modeling apparent porosities obtained from formation-facing near and far and borehole-facing thermal neutron detectors of the system of FIG. 1 at various concentrations of hematite mud in an 8 in. borehole, in accordance with an embodiment.
Figure 24:
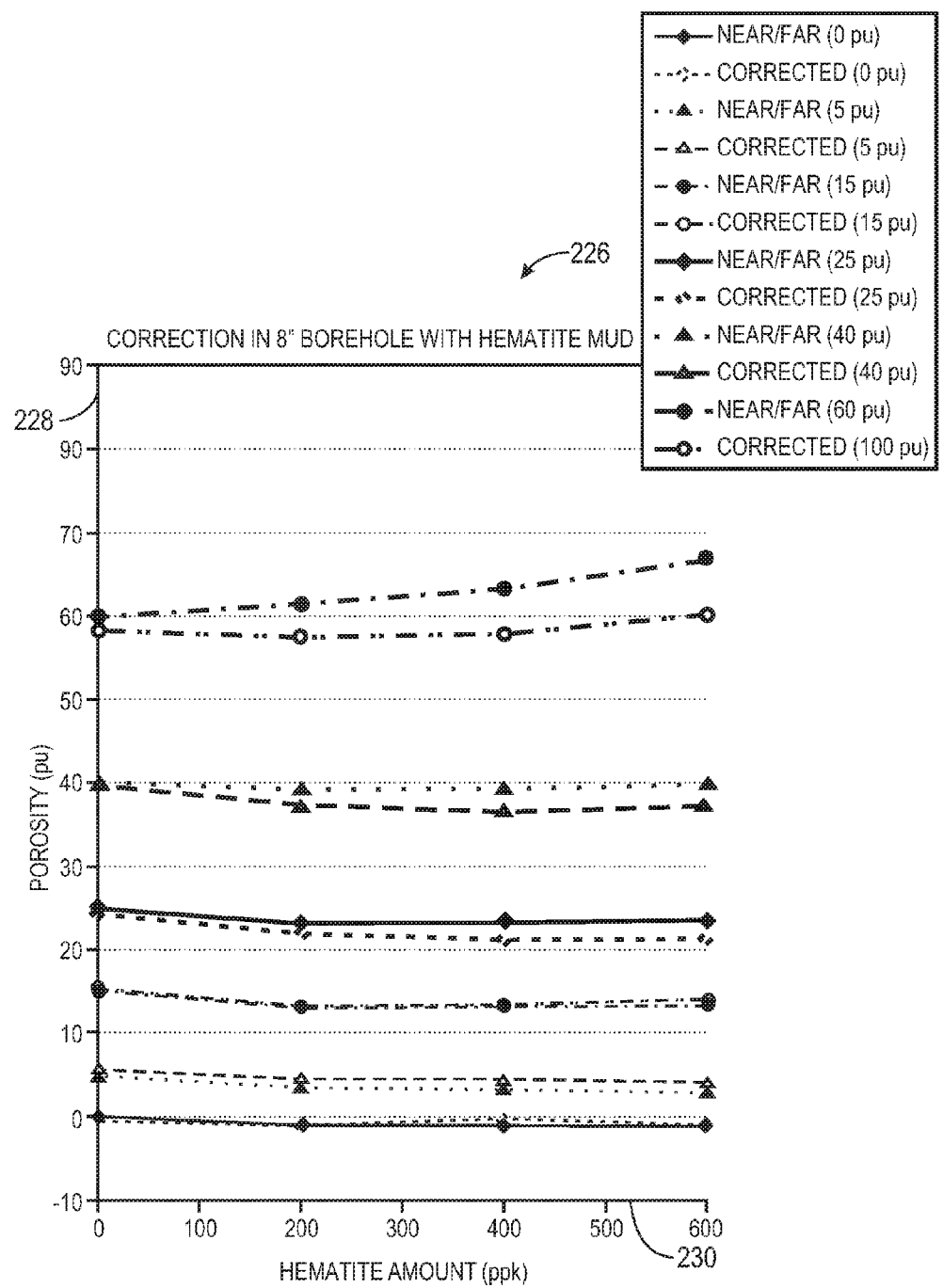
FIG. 24 is a plot modeling apparent porosities obtained from formation-facing near and far thermal neutron detectors of the system of FIG. 1 and corresponding corrected porosities at various concentrations of hematite mud in an 8 in. borehole, in accordance with an embodiment.

Likewise, FIGS. 23 and 24 are plots modeling porosities determined based on ratios of thermal neutron count rates when the borehole 42 is filled with a borehole fluid 46 of fresh water plus a variable concentration of hematite as a weighting material. Turning to FIG. 23, a plot 220 includes an ordinate 222 representing porosity in porosity units (p.u.) and an abscissa 224 representing a concentration of hematite in units of parts per thousand (ppk). Solid-symbol curves of the plot 220 represent apparent porosities calculated from near/far ratios of thermal neutron count rates obtained from the front-facing near and far neutron detectors 24 and 26 when the formation 40 has certain true porosity values (e.g., 0, 5, 15, 25, 40, and 60 p.u.). Hollow-symbol curves of the plot 220 represent apparent porosities computed from back/far ratios of thermal neutron count rates obtained from the back-facing neutron detector 28 and the front-facing far neutron detector 26 at the same true porosity values.

Similarly, FIG. 24 presents a plot 226 modeling corrected values of porosity as a function of hematite concentration in the borehole fluid 46 when the borehole 42 has a diameter D of 8 in. An ordinate 228 of the plot 226 represents porosity in porosity units (p.u.) and an abscissa 230 represents hematite concentration in units of parts per thousand (ppk). Solid-symbol curves of the plot 226 represent apparent porosities calculated from near/far ratios of thermal neutron count rates obtained from the front-facing near and far neutron detectors 24 and 26 when the formation 40 has certain true porosity values (e.g., 0, 5, 15, 25, 40, and 60 p.u.). Hollow-symbol curves of the plot 226 represent corrected porosities calculated based on Equation (2) and the data represented in FIG. 23 at the same true porosity values.

With regard to FIGS. 21-24, it should be noted that while the back/far apparent porosities (hollow-symbol curves) of FIG. 21 increase with increasing barite concentration, the back/far apparent porosities (hollow-symbol curves) of FIG. 23 decrease with increasing hematite concentration. Nevertheless, as seen in FIGS. 22 and 24, the corrected porosities (hollow-symbol curves) of both FIGS. 22 and 24 improve upon their respective near/far apparent porosities (solid-symbol curves). For example, note the effectiveness of the correction of FIG. 17, despite the opposite effects of barite versus hematite on near/far apparent porosities.

Figure 25:
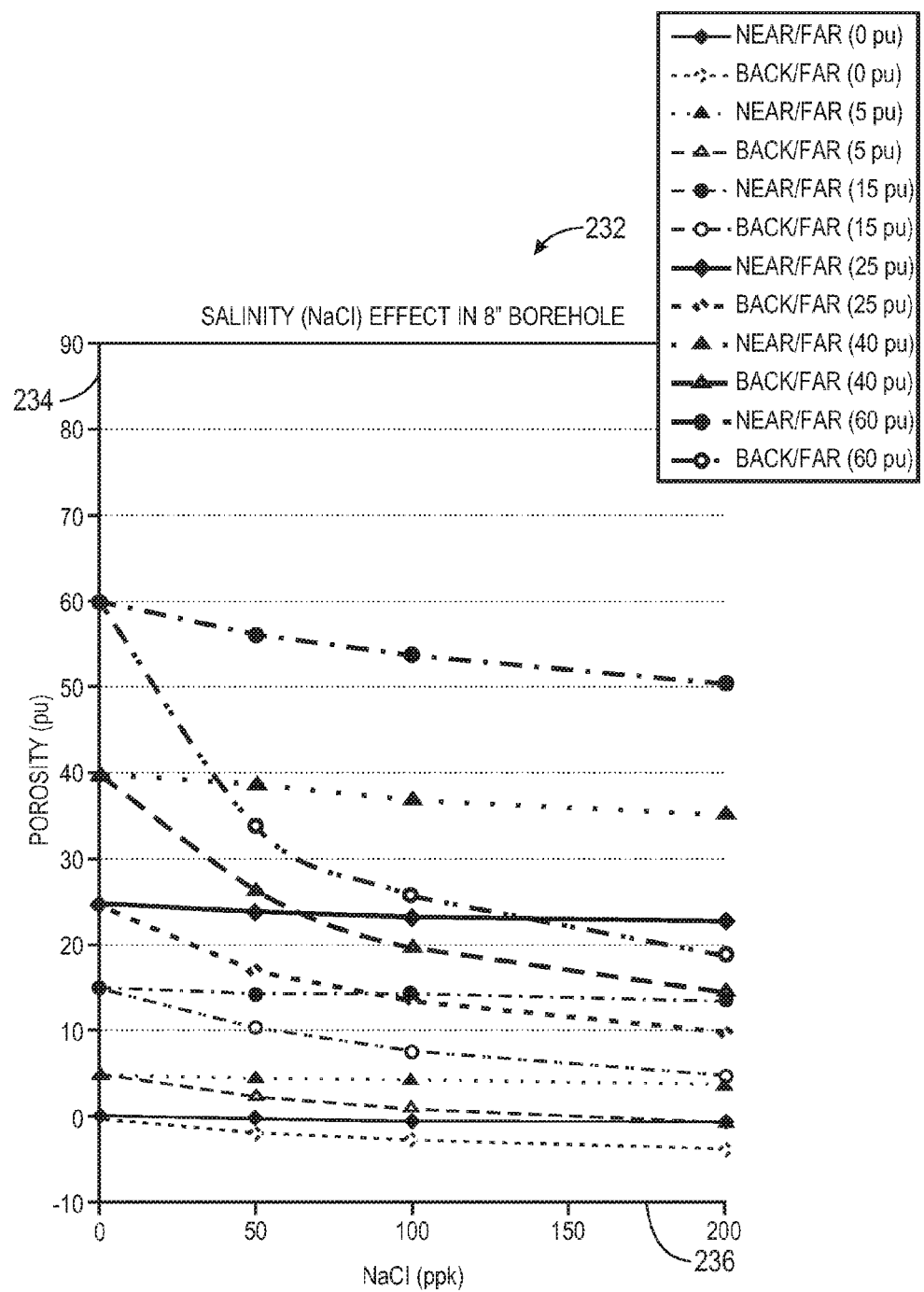
FIG. 25 is a plot modeling apparent porosities obtained from formation-facing near and far and borehole-facing thermal neutron detectors of the system of FIG. 1 at various NaCl salinities in an 8 in. borehole, in accordance with an embodiment.

FIGS. 25-30 illustrate the effect on apparent porosity and corrected porosity results as a function of borehole fluid 46 salinity for NaCl, KCl, and NaBr brines in a borehole 42 with a diameter D of 8 in. In particular, FIGS. 25 and 26 relate to NaCl, FIGS. 27 and 28 relate to KCl, and FIGS. 29 and 30 relate to NaBr. Turning first to FIG. 25, a plot 232 includes an ordinate 234 representing porosity in porosity units (p.u.) and an abscissa 236 representing a concentration of NaCl in units of parts per thousand (ppk). Solid-symbol curves of the plot 232 represent apparent porosities calculated from near/far ratios of thermal neutron count rates obtained from the front-facing near and far neutron detectors 24 and 26 when the formation 40 has certain true porosity values (e.g., 0, 5, 15, 25, 40, and 60 p.u.). Hollow-symbol curves of the plot 232 represent apparent porosities computed from back/far ratios of thermal neutron count rates obtained from the back-facing neutron detector 28 and the front-facing far neutron detector 26 at the same true porosity values.

Figure 26:
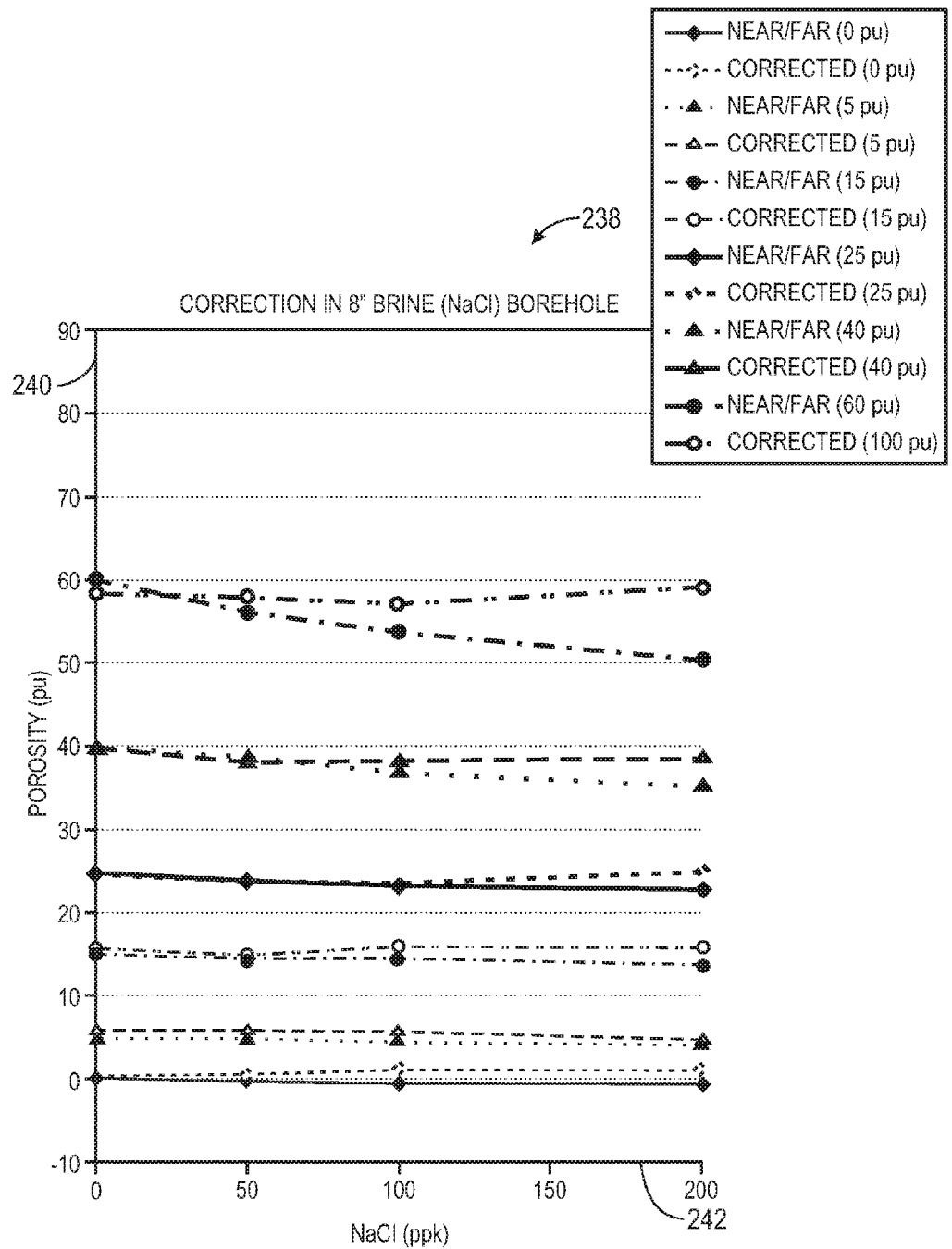
FIG. 26 is a plot modeling apparent porosities obtained from formation-facing near and far thermal neutron detectors of the system of FIG. 1 and corresponding corrected porosities at various NaCl salinities in an 8 in. borehole, in accordance with an embodiment.

Similarly, FIG. 26 presents a plot 238 modeling corrected values of porosity as a function of NaCl concentration in the borehole fluid 46 when the borehole 42 has a diameter D of 8 in. An ordinate 240 of the plot 238 represents porosity in porosity units (p.u.) and an abscissa 242 represents NaCl concentration in units of parts per thousand (ppk). Solid-symbol curves of the plot 238 represent apparent porosities calculated from near/far ratios of thermal neutron count rates obtained from the front-facing near and far neutron detectors 24 and 26 when the formation 40 has certain true porosity values (e.g., 0, 5, 15, 25, 40, and 60 p.u.). Hollow-symbol curves of the plot 238 represent corrected porosities calculated based on Equation (2) and the data represented in FIG. 25 at the same true porosity values.

Figure 27:
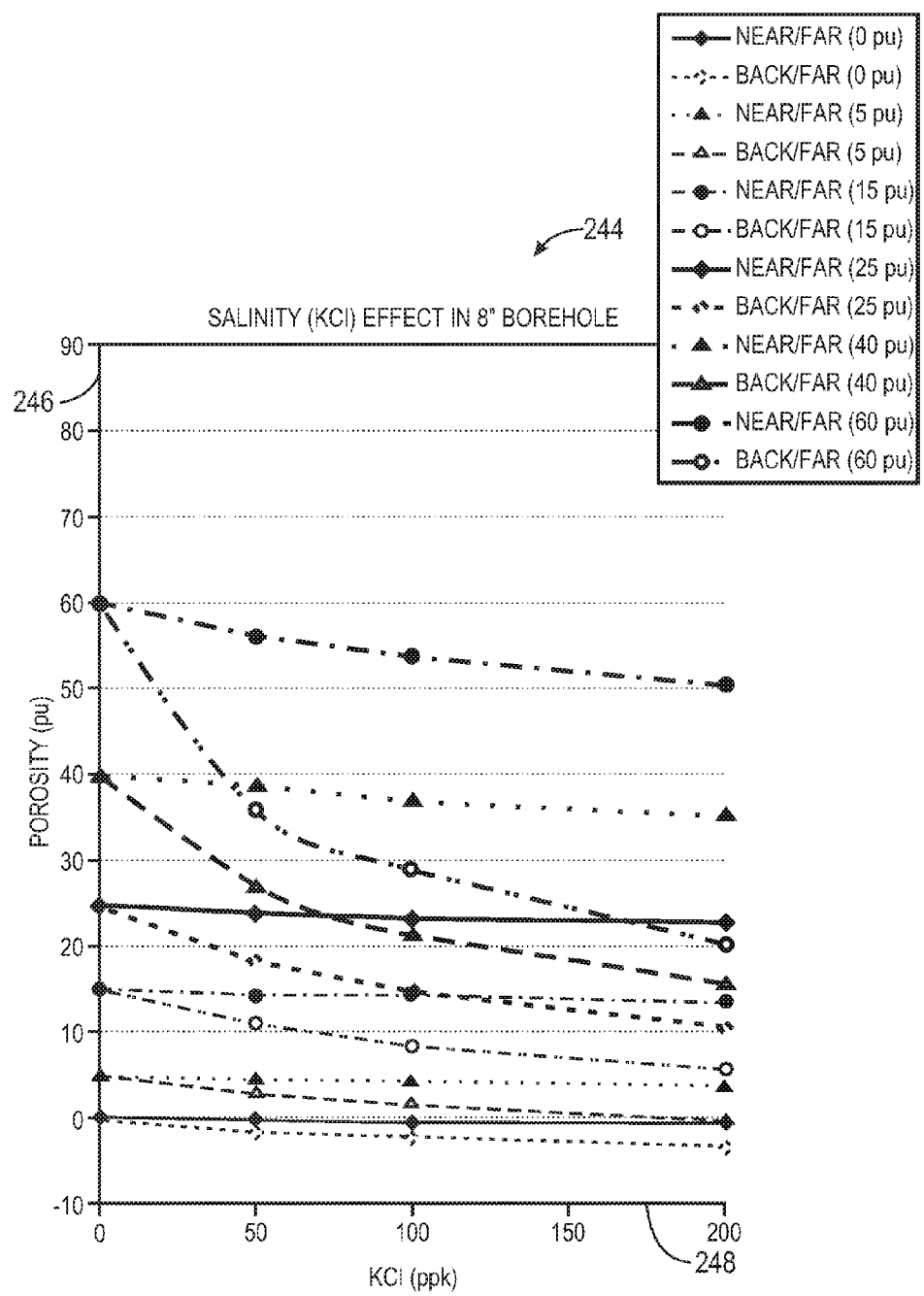
FIG. 27 is a plot modeling apparent porosities obtained from formation-facing near and far and borehole-facing thermal neutron detectors of the system of FIG. 1 at various KCl salinities in an 8 in. borehole, in accordance with an embodiment.

Turning next to FIG. 27, a plot 244 models apparent porosities obtained from ratios of thermal neutrons as a function of KCl concentration when the borehole 42 has a diameter D of 8 in. The plot 244 includes an ordinate 246 representing porosity in porosity units (p.u.) and an abscissa 248 representing a concentration of KCl in units of parts per thousand (ppk). Solid-symbol curves of the plot 244 represent apparent porosities calculated from near/far ratios of thermal neutron count rates obtained from the front-facing near and far neutron detectors 24 and 26 when the formation 40 has certain true porosity values (e.g., 0, 5, 15, 25, 40, and 60 p.u.). Hollow-symbol curves of the plot 244 represent apparent porosities computed from back/far ratios of thermal neutron count rates obtained from the back-facing neutron detector 28 and the front-facing far neutron detector 26 at the same true porosity values.

Figure 28:
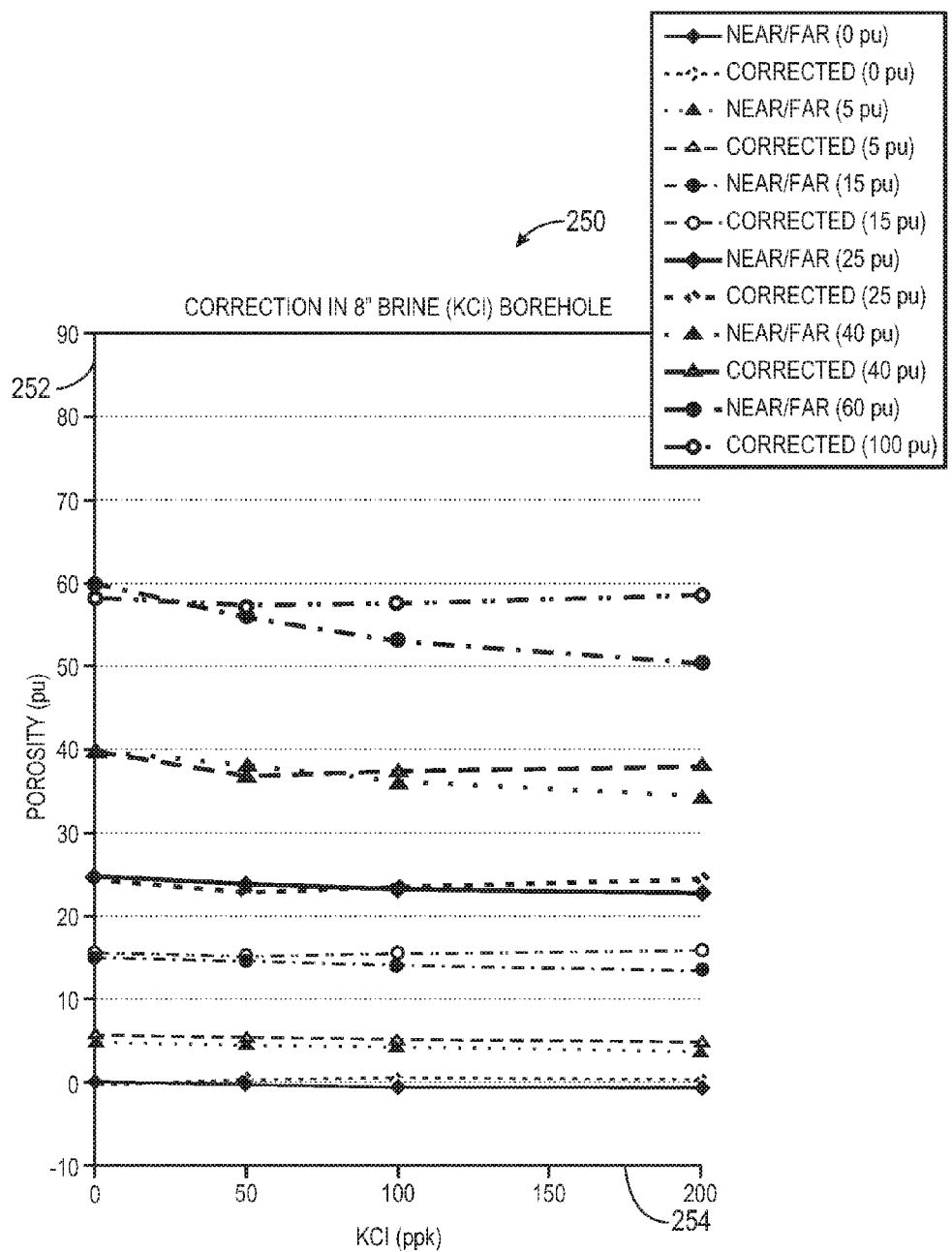
FIG. 28 is a plot modeling apparent porosities obtained from formation-facing near and far thermal neutron detectors of the system of FIG. 1 and corresponding corrected porosities at various KCl salinities in an 8 in. borehole, in accordance with an embodiment.

Similarly, FIG. 28 presents a plot 250 modeling corrected values of porosity as a function of KCl concentration in the borehole fluid 46 when the borehole 42 has a diameter D of 8 in. An ordinate 252 of the plot 250 represents porosity in porosity units (p.u.) and an abscissa 254 represents KCl concentration in units of parts per thousand (ppk). Solid-symbol curves of the plot 250 represent apparent porosities calculated from near/far ratios of thermal neutron count rates obtained from the front-facing near and far neutron detectors 24 and 26 when the formation 40 has certain true porosity values (e.g., 0, 5, 15, 25, 40, and 60 p.u.). Hollow-symbol curves of the plot 250 represent corrected porosities calculated based on Equation (2) and the data represented in FIG. 27 at the same true porosity values.

Figure 29:
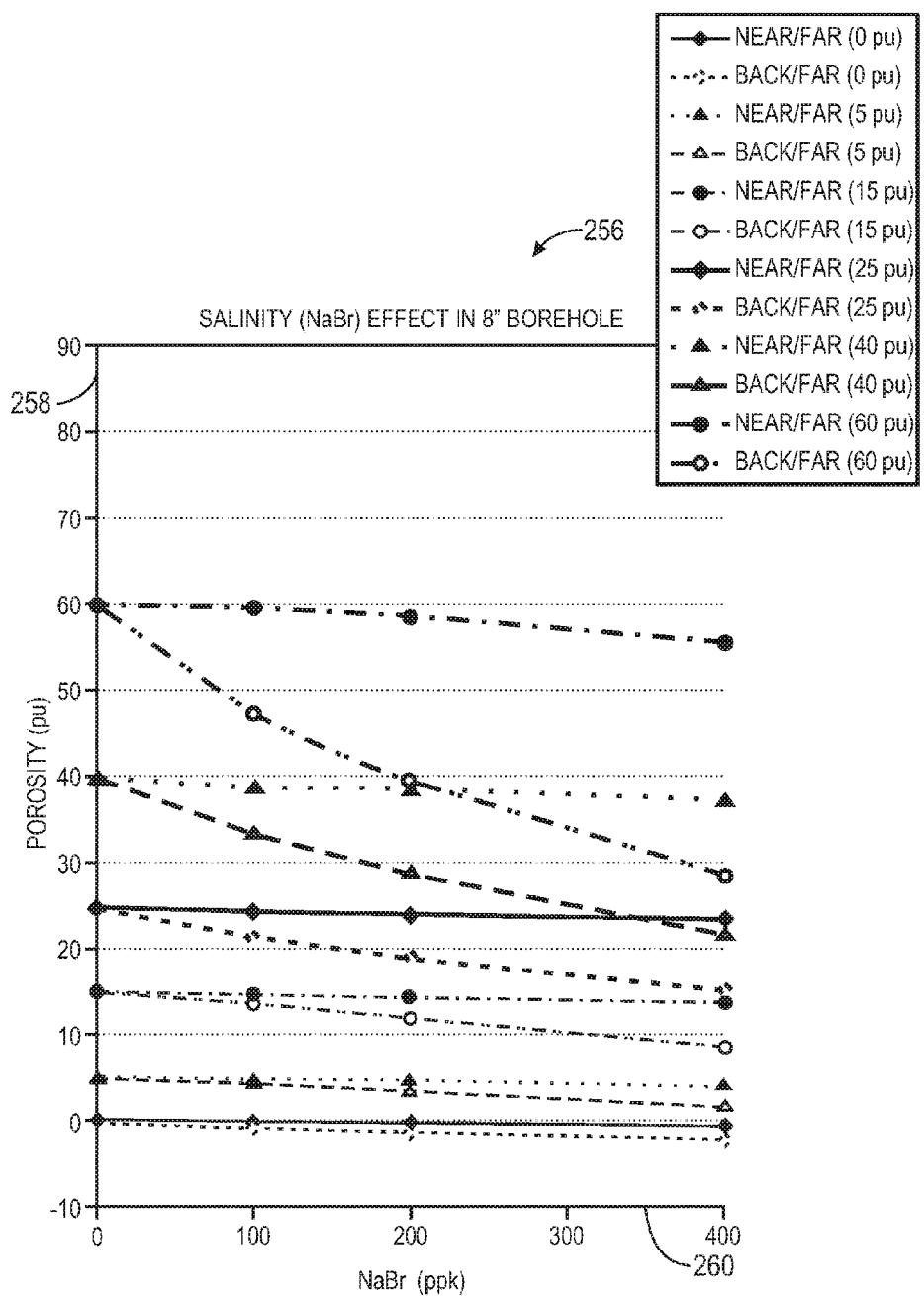
FIG. 29 is a plot modeling apparent porosities obtained from formation-facing near and far and borehole-facing thermal neutron detectors of the system of FIG. 1 at various NaBr salinities in an 8 in. borehole, in accordance with an embodiment.

FIG. 29 represents a plot 256, which models apparent porosities obtained from ratios of thermal neutrons as a function of NaBr concentration when the borehole 42 has a diameter D of 8 in. The plot 256 includes an ordinate 258 representing porosity in porosity units (p.u.) and an abscissa 260 representing a concentration of NaBr in units of parts per thousand (ppk). Solid-symbol curves of the plot 256 represent apparent porosities calculated from near/far ratios of thermal neutron count rates obtained from the front-facing near and far neutron detectors 24 and 26 when the formation 40 has certain true porosity values (e.g., 0, 5, 15, 25, 40, and 60 p.u.). Hollow-symbol curves of the plot 256 represent apparent porosities computed from back/far ratios of thermal neutron count rates obtained from the back-facing neutron detector 28 and the front-facing far neutron detector 26 at the same true porosity values.

Figure 30:
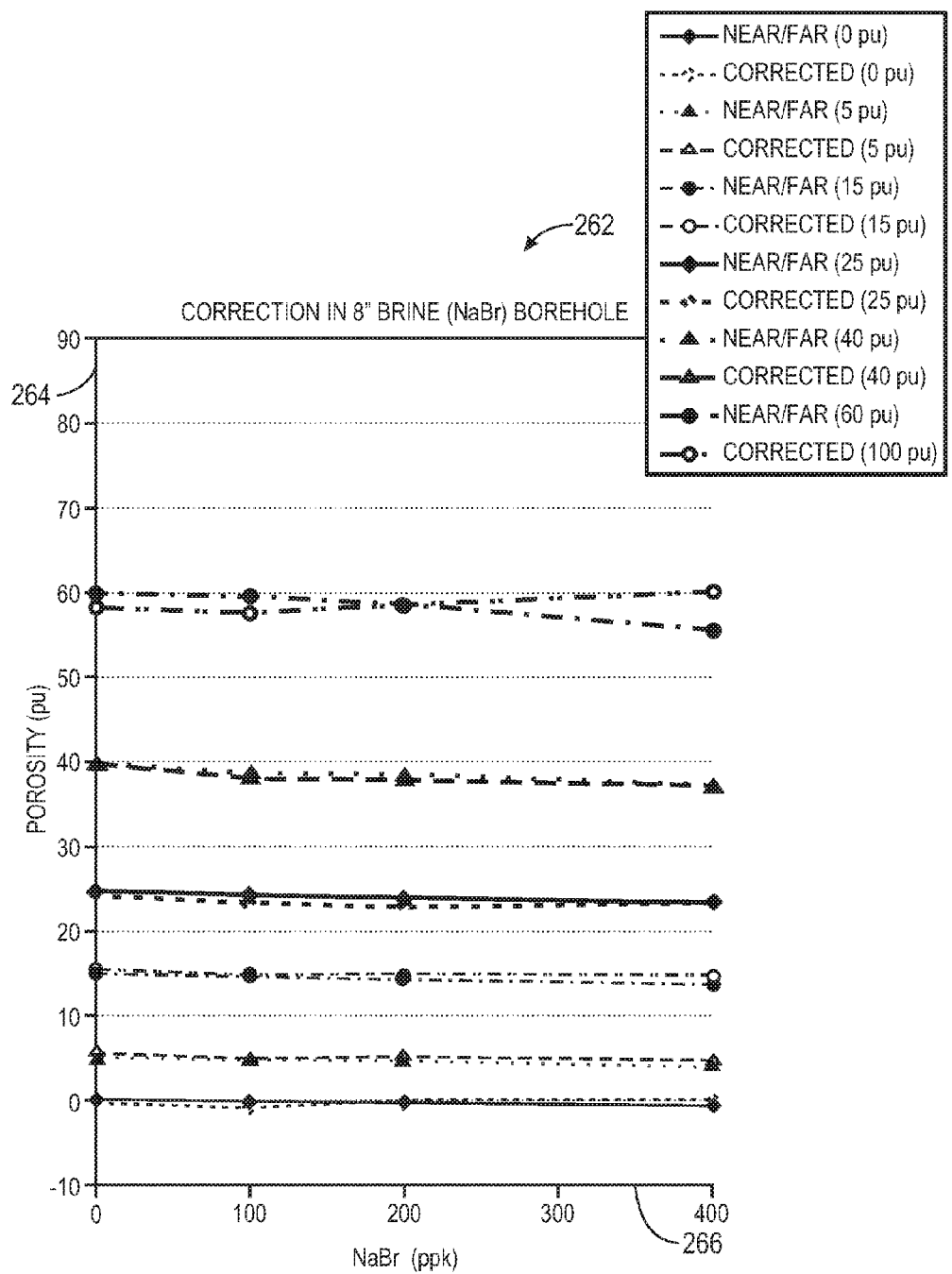
FIG. 30 is a plot modeling apparent porosities obtained from formation-facing near and far thermal neutron detectors of the system of FIG. 1 and corresponding corrected porosities at various NaBr salinities in an 8 in. borehole, in accordance with an embodiment.

Similarly, FIG. 30 presents a plot 262 modeling corrected values of porosity as a function of NaBr concentration in the borehole fluid 46 when the borehole 42 has a diameter D of 8 in. An ordinate 264 of the plot 262 represents porosity in porosity units (p.u.) and an abscissa 266 represents NaBr concentration in units of parts per thousand (ppk). Solid-symbol curves of the plot 262 represent apparent porosities calculated from near/far ratios of thermal neutron count rates obtained from the front-facing near and far neutron detectors 24 and 26 when the formation 40 has certain true porosity values (e.g., 0, 5, 15, 25, 40, and 60 p.u.). Hollow-symbol curves of the plot 262 represent corrected porosities calculated based on Equation (2) and the data represented in FIG. 29 at the same true porosity values.

With regard to FIGS. 25-30, it should be noted that even after taking near/far ratios of thermal neutron count rates from the front-facing near and far neutron detectors 24 and 26 to determine apparent porosities (solid-symbol curves), a large residual thermal neutron capture effect remains due to the high neutron capture cross-section of elements in the borehole fluid 46. Despite this effect, which was largely absent for the epithermal neutron case, the correction (hollow-symbol curves) illustrated in FIGS. 26, 28, and 30 improves upon the respective near/far apparent porosities (solid-symbol curves). The correction of FIG. 17 is clearly effective, despite the three distinct brine types (NaCl, KCl, and NaBr) respectively present in the borehole fluid 46.

Figure 4:
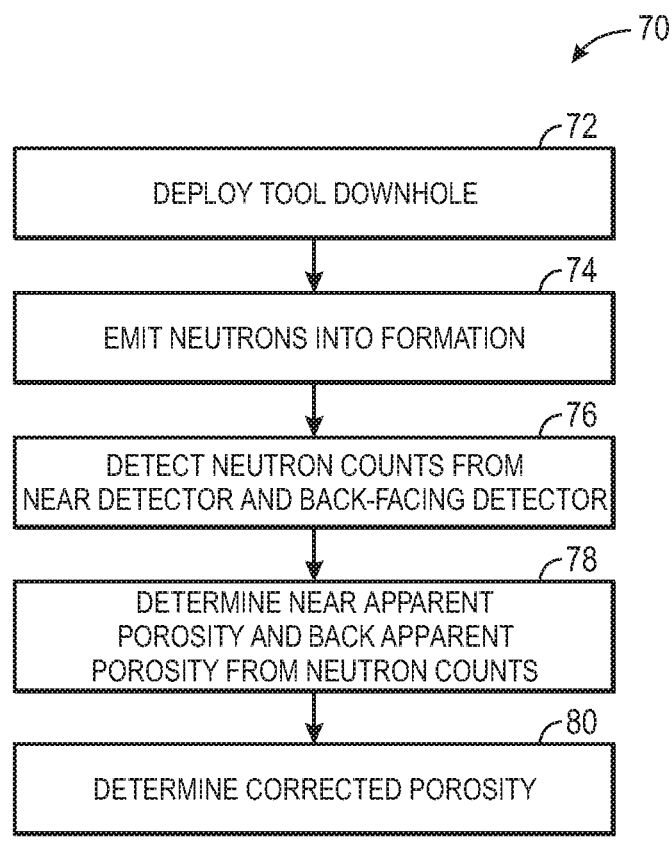
FIG. 4 is a flowchart describing an embodiment of a method for obtaining a corrected porosity based on apparent porosities obtained from formation-facing and borehole-facing epithermal neutron detectors of the system of FIG. 1.

In all of the plots of FIGS. 18, 20, 22, 24, 26, 28 and 30, the correction of FIG. 17, like the correction of FIG. 4, is seen to largely compensate for the various differences in the size of the borehole 42 and composition of the borehole fluid 46. In total, considering all of the more than 500 cases modeled, the residual RMS error between the corrected porosity and the true porosity is again improved by roughly a factor of four.

Figure 31:
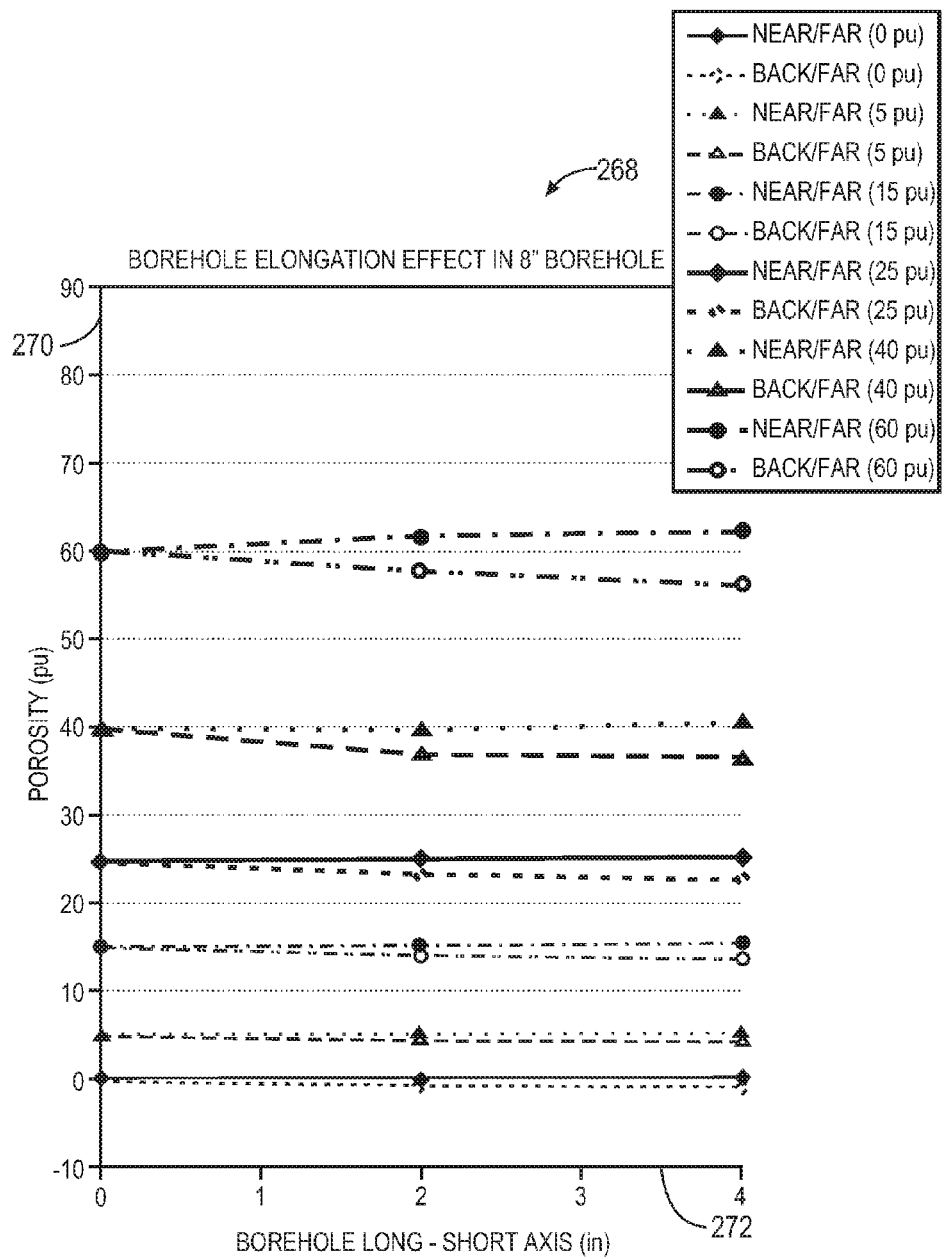
FIG. 31 is a plot modeling apparent porosities obtained from formation-facing near and far and borehole-facing thermal neutron detectors of the system of FIG. 1 at various borehole elongations, in accordance with an embodiment.
Figure 32:
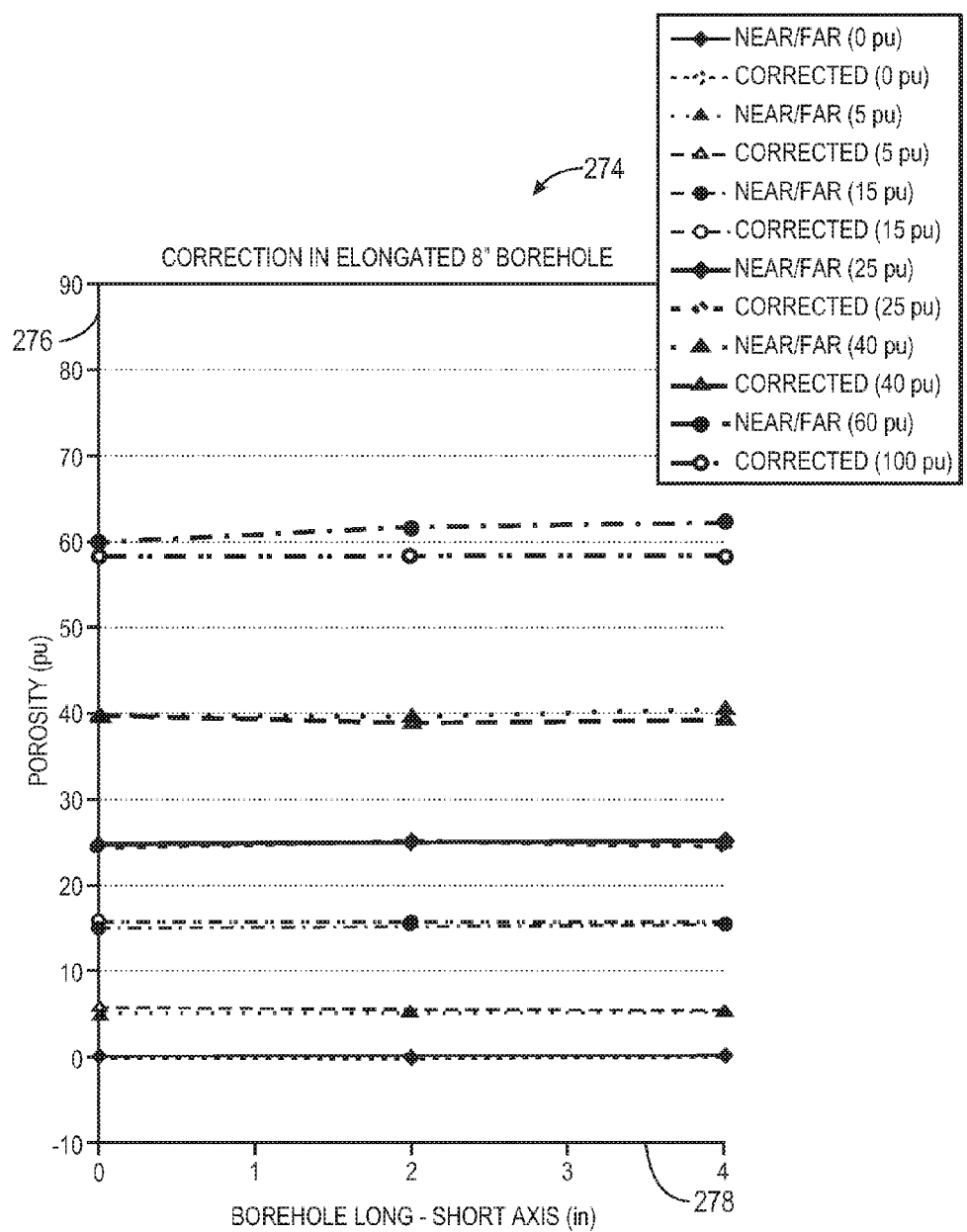
FIG. 32 is a plot modeling apparent porosities obtained from formation-facing near and far thermal neutron detectors of the system of FIG. 1 and corresponding corrected porosities at various borehole elongations, in accordance with an embodiment.

To illustrate the effect of an elongated borehole 42 on the technique of FIG. 17, FIGS. 31 and 32 represent measurements modeled using MCNP as obtained in a borehole 42 for which the short axis of the borehole 42 is always 8 inches, but for which the long axis is elongated by 0 to 4 inches (i.e., the long axis varies from 8 inches to 12 inches). In FIGS. 31 and 32, as is typical for downhole measurement conditions, the downhole tool 12 is taken to be oriented along the long axis (i.e., the back detector is modeled as facing the elongated direction).

Turning to FIG. 31, a plot 268 includes an ordinate 270 representing porosity in porosity units (p.u.) and an abscissa 272 representing the elongation of the long axis of the borehole 42 in units of inches. Solid-symbol curves of the plot 268 represent apparent porosities calculated from near/far ratios of thermal neutron count rates obtained from the front-facing near and far neutron detectors 24 and 26 when the formation 40 has certain true porosity values (e.g., 0, 5, 15, 25, 40, and 60 p.u.). Hollow-symbol curves of the plot 268 represent apparent porosities computed from back/far ratios of thermal neutron count rates obtained from the back-facing neutron detector 28 and the front-facing far neutron detector 26 at the same true porosity values.

FIG. 32 is a plot 274 that includes an ordinate 276 representing porosity in porosity units (p.u.) and an abscissa 278 representing the elongation of the long axis of the borehole 42 in units of inches. Solid-symbol curves of the plot 274 represent apparent porosities calculated from near/far ratios of thermal neutron count rates obtained from the front-facing near and far neutron detectors 24 and 26 when the formation 40 has certain true porosity values (e.g., 0, 5, 15, 25, 40, and 60 p.u.). Hollow-symbol curves of the plot 274 represent corrected porosities calculated based on Equation (2) and the data represented in FIG. 31 at the same true porosity values.

Like the similar results for epithermal neutron apparent porosities of FIGS. 14 and 15, as may be seen in the corrected thermal neutron ratio porosity curves (hollow symbols) of the plot 274 of FIG. 32, the correction is somewhat overcorrecting. This condition is understandable, since the back-facing neutron detector 28 is more influenced by the long axis than the front-facing near and far neutron detectors 24 and 26. Conversely, the front-facing near and far neutron detectors 24 and 26 are relatively more sensitive to the short axis (i.e., the borehole fluid 46 to the sides of the downhole tool 12).

Figure 33:
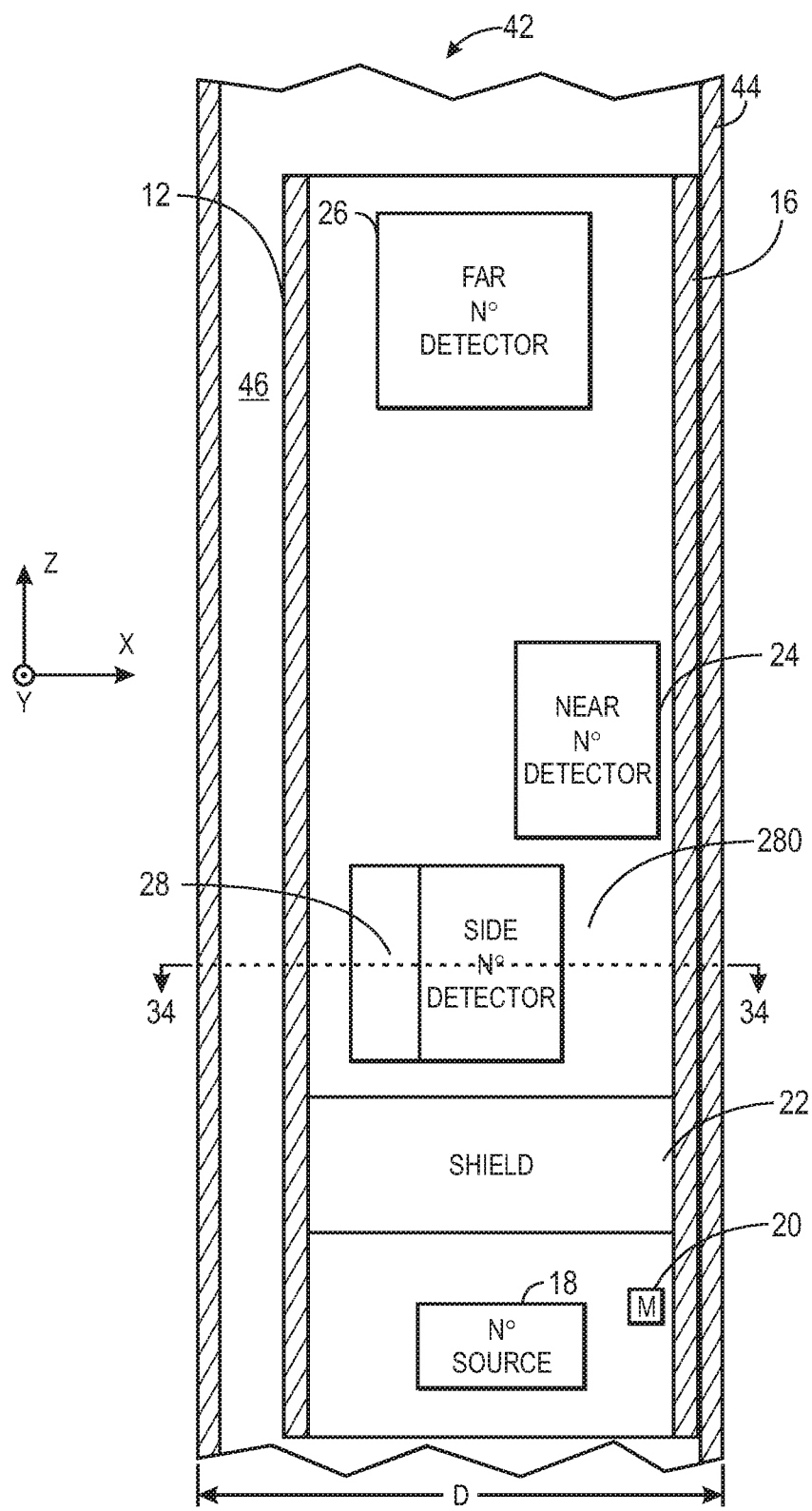
FIGS. 33-34 are schematic block diagrams of a downhole neutron porosity tool having back-facing neutron detectors in various azimuthal positions, in accordance with an embodiment.
Figure 34:
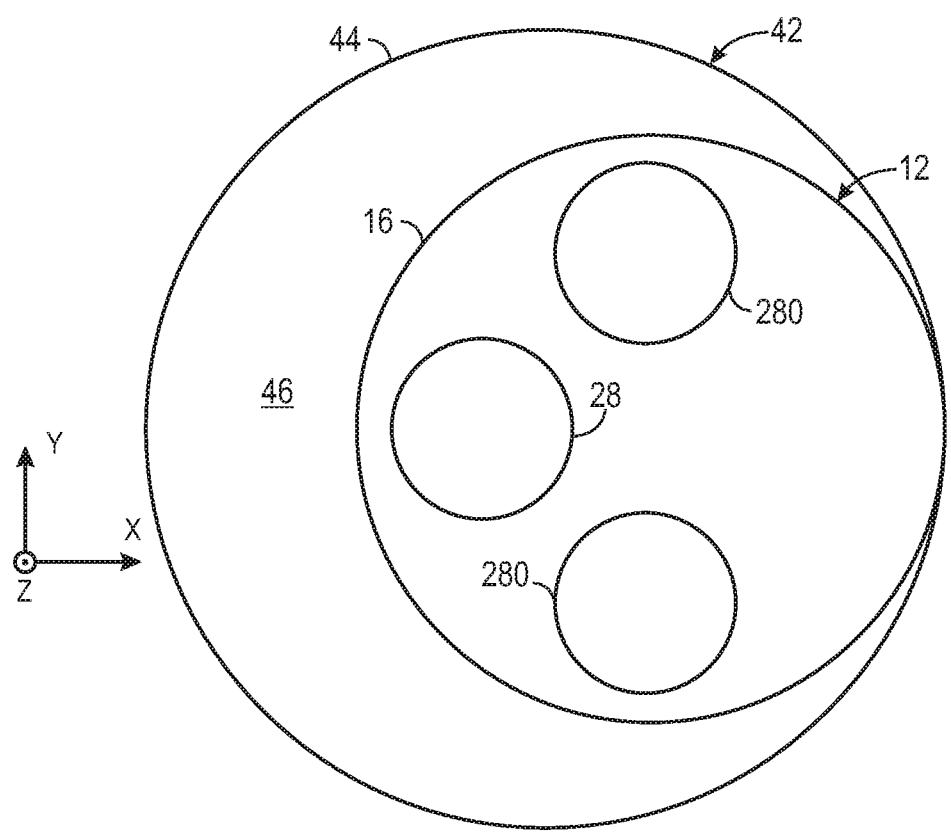

As noted previously, with only two neutron detectors detecting neutrons, the correction technique of FIG. 17 represents a compromise. A better correction could be obtained by placing additional neutron detectors on the sides of the downhole tool 12 to obtain apparent porosities with additional directional biases to correct for more complex borehole 42 shapes. One such embodiment of the downhole tool 12 is illustrated by FIGS. 33 and 34. In FIG. 33, which illustrates the downhole tool 12 aligned as indicated according to the depicted coordinate system, two side-facing neutron detectors 280 may also be placed axially (in the z direction) alongside the back-facing neutron detector 28 to face the sides of the downhole tool 12. The side-facing neutron detectors 280 may be any suitable thermal or epithermal neutron detectors, depending on whether the other neutron detectors 24, 26 and/or 28 are thermal or epithermal neutron detectors.

FIG. 34 illustrates a cross-sectional view of the downhole tool 12 from cut lines 34-34 of FIG. 33. As shown in FIG. 34, the two side-facing neutron detectors 280 may be placed within the downhole tool 12 at varying azimuthal angles. In some embodiments, the side-facing neutron detectors 280 may be placed within the downhole tool at an azimuthal angle approximately 90° from that of the back-facing neutron detector 28. Alternative embodiments of the downhole tool 12 may include more or fewer side-facing neutron detectors 280 placed within the downhole tool 12 to face in various azimuthal directions. Additionally, in some embodiments, additional shielding 22 may be placed between the side-facing neutron detectors 280 and the back-facing neutron detector 28 to enhance the sensitivity of each to certain azimuthal angles from the downhole tool 12.

By measuring neutrons from other azimuthal angles of the downhole tool 12, the side-facing neutron detectors 280 may provide additional information regarding the geometry of the borehole 42. This additional information provided by the side-facing neutron detectors 280 may enable an even more precise correction with regard to any embodiment of the downhole tool 12. That is, whether the downhole tool 12 is configured to determine porosity based on count rates of neutrons or based on ratios of count rates of neutrons, or any other suitable technique, the additional information enabled by the side-facing neutron detectors 280 may provide an even more refined correction.

Figure 35:
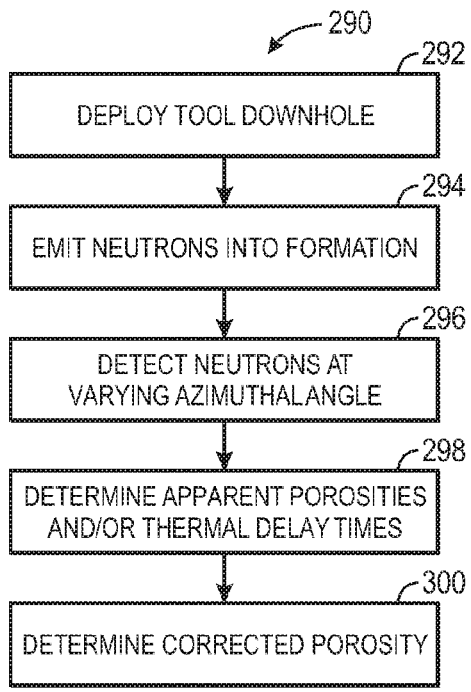
FIG. 35 is a flowchart describing embodiment of an alternative method for obtaining a corrected porosity via the operation of FIG. 2.

One additional technique for obtaining a porosity corrected for borehole effects using the embodiment of the downhole tool 12 illustrated in FIGS. 33 and 34 appears in a flowchart 290 of FIG. 35. In the embodiment of the method of the flowchart 290, a first step 292 may involve deploying the downhole tool 12 into the subterranean formation 40 using any suitable mode of conveyance. In step 294, the neutron source 18 may emit neutrons (illustrated as the neutron emission 48 in FIG. 2) into the surrounding subterranean formation 40. The neutron emission 48 may take place as a continuous stream of neutrons or in bursts of neutrons if time decay data such as thermal decay times are desired. Depending on the interactions 50 of the neutron emission 48 with elements surrounding the downhole tool 12, varying numbers of neutrons of various energies may reach the neutron detectors 24, 26, 28 and 280. In particular, for a given composition of borehole fluid 42, the relationship between the number of neutrons detected by the back-facing neutron detector 28, the side-facing neutron detectors 280 and the front-facing near 24 and/or far 26 neutron detectors may vary depending on the borehole shape (e.g., the back neutron detector 28 and/or side detector(s) 280 may have different sensitivities to borehole elongation).

In step 296, the neutron detectors 24, 26, 28, and/or 280 may detect count rates of neutrons scattered by the surrounding formation 40 and/or borehole 42. Since the neutrons are detected at more than two azimuthal angles within the downhole tool 12, the neutron count rates detected in step 296 may provide additional information regarding the geometry of the borehole 42. In step 298, based on the neutrons detected in step 296, the data processing system 14 may determine apparent porosities and in some embodiments thermal decay times associated with the neutron detectors 24, 26, 28, and/or 280. These apparent porosities and in some embodiments thermal decay times may be applied to an expression, such as discussed above with reference to Equations (1) and/or (2), to obtain a corrected porosity in step 300. Additionally or alternatively, the data processing system 14 may determine the porosity directly from the neutron count rates including in some embodiments their time dependence using a transform derived from modeled and/or experimental data relating the neutron count rates to various borehole and formation conditions. Additionally or alternatively, the data processing circuitry may determine the corrected porosity by an inversion of a forward model giving the expected count rates (or apparent porosities) and in some embodiments their time dependence (or decay times) as a function of the true porosity and other formation 40 and borehole 42 conditions.

Figure 36:
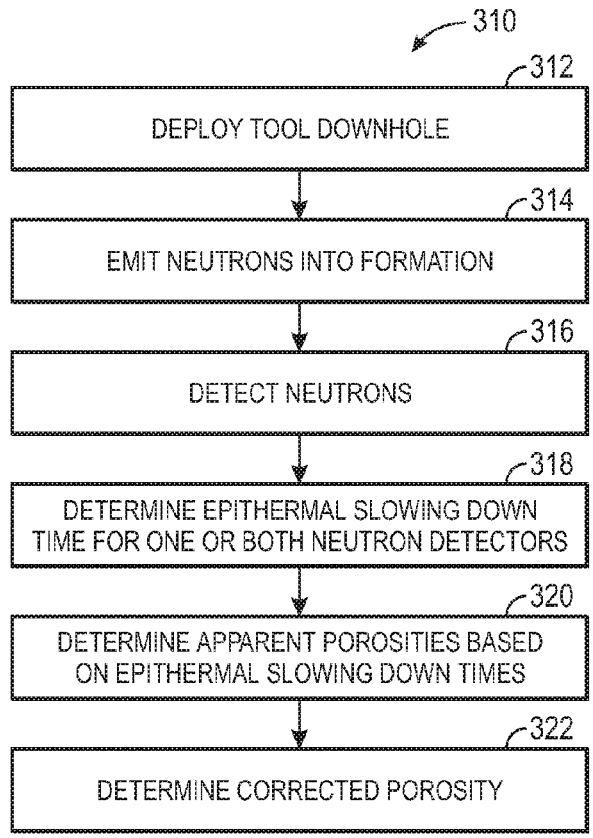
FIG. 36 is a flowchart describing an embodiment of another alternative method for obtaining a corrected porosity via the operation of FIG. 2.
Figure 37:
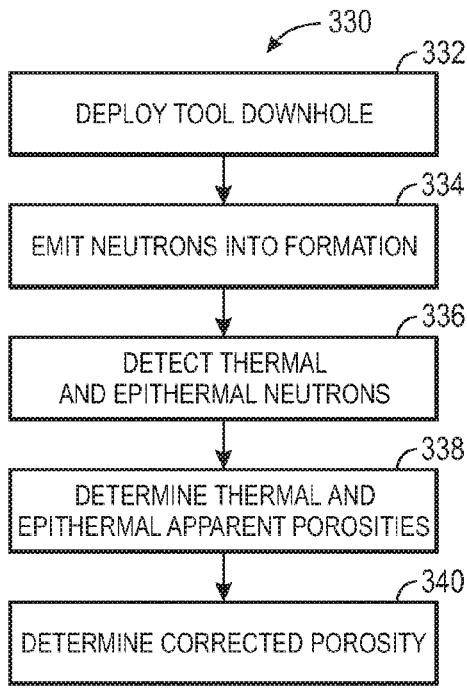
FIG. 37 is a flowchart describing an embodiment of a further alternative method for obtaining a corrected porosity via the operation of FIG. 2.

Certain alternative embodiments of methods for obtaining a porosity of the formation 40 that is corrected for borehole effects are described in FIGS. 36 and 37. Turning first to FIG. 36, a flowchart 310 describes an embodiment of a method for determining the corrected porosity of the formation 40 based on one or more measurements of epithermal neutron slowing down times. As such, the embodiment of the method illustrated by the flowchart 310 generally involves an embodiment of the downhole tool 12 in which at least one of the neutron detectors 24, 26, 28 and/or 280 are epithermal neutron detectors. In step 312, the downhole tool 12 may be deployed into the subterranean formation 40 using any suitable mode of conveyance. In step 314, the neutron source 18 may emit neutrons (illustrated as the neutron emission 48 in FIG. 2) into the surrounding subterranean formation 40. In particular, the neutron source 18 may emit pulses of neutrons in step 314, such that the slowing down time of the neutrons may be subsequently determined.

The neutron detectors 24, 26, 28 and/or 280 may thereafter detect neutrons that scatter through the formation 40 and/or borehole 42 in step 316. Considering the count rate of neutrons detected in step 316 as a function of time in relation to the pulses of neutrons emitted in step 314, the data processing system 14 may determine epithermal slowing down times associated with one or more of the neutron detectors 24, 26, 28 and/or 280, in step 318. In step 320, alternatively or in addition to determining apparent porosities based on the neutron count rates or count rate ratios, the data processing system 14 may determine one or more apparent porosities based on the epithermal slowing down times determined in step 318. The epithermal slowing down apparent porosities may be used in a correction for borehole effects similar to that of Equation (1), in which the epithermal slowing down apparent porosities may replace or augment the apparent porosities based on neutron count rates or count rate ratios. Since the porosity sensitivities associated with the epithermal slowing down times may be more localized respectively to regions near each neutron detector 24 and/or 28, the epithermal slowing down apparent porosities may provide additional information regarding the geometry of the borehole 42 that may further refine the correction. Additionally or alternatively, the data processing system 14 may determine the porosity directly from the neutron count rates and/or including their time dependence using a transform derived from modeled and/or experimental data relating the neutron count rates to various borehole and formation conditions. Additionally or alternatively, the data processing system 14 may determine the corrected porosity by an inversion of a forward model giving the expected count rates (or apparent porosities) and/or their time dependence (or decay times) as a function of the true porosity and other formation 40 and borehole 42 conditions.

FIG. 37 presents a flowchart 330 describing another embodiment of a method for determining the corrected porosity of the formation 40. In particular, embodiment of the flowchart 330 involves correcting for the effect of thermal absorbers by using the difference in responses between thermal and epithermal count rates. As such, the embodiment of the flowchart 330 generally involves an embodiment of the downhole tool 12 that includes both thermal and epithermal neutron detectors. In step 332, the downhole tool 12 may be deployed into the subterranean formation 40 using any suitable mode of conveyance. In step 334, the neutron source 18 may emit neutrons (illustrated as the neutron emission 48 in FIG. 2) into the surrounding subterranean formation 40. The neutron source 18 may emit pulses of neutrons or a continuous stream of neutrons in step 334, as may be suitable.

In step 336, the downhole tool 12 may detect thermal and epithermal neutrons scattered around the downhole tool 12 via the neutron detectors 24, 26, 28, and/or 280, at least one of which may be an epithermal neutron detector and at least one of which may be a thermal neutron detector. In certain embodiments, the downhole tool 12 may include additional neutron detectors not shown in FIG. 1, 2, 33, or 34, which may be thermal or epithermal neutron detectors. The neutron detectors 24, 26, 28, 280, and/or others may or may not detect the scattered neutrons as a function of time in step 336, as may be suitable for determining, in step 338, apparent porosities based on the detected neutrons. That is, in step 338, the data processing system 14 may determine apparent porosities based on ratios of thermal neutron count rates (e.g., near/far and/or back/far) as well as apparent porosities based on epithermal neutron count rates and/or epithermal slowing down time.

In step 340, the data processing system 14 may determine a porosity of the formation 40 that is corrected for borehole effects. In particular, the difference between the thermal-neutron-based apparent porosities and epithermal-neutron-based apparent porosities may be used in place of, or in addition to, the thermal decay time terms of Equation (2). It should be noted that if apparent porosities based on epithermal slowing down times are not used in the correction of step 340, the apparent porosities determined in step 338 may not necessarily be functions of time, and thus the neutron source 18 may not emit pulses of neutrons to determine these apparent porosities. Accordingly, under such conditions, the neutron source 18 may be an electronic neutron generator configured to emit a continuous stream of neutrons or a radioisotopic source, such as AmBe or $^{225}$Cf. However, if apparent porosities based on epithermal slowing down times are used in the correction of step 340, these apparent porosities may further refine the correction in more complex borehole 42 geometries, as noted above with reference to FIG. 36. Additionally or alternatively, the data processing system 14 may determine the porosity directly from the thermal and epithermal neutron count rates and/or epithermal slowing down times using a transform derived from modeled and/or experimental data relating such data to various borehole and formation conditions. Additionally or alternatively, the data processing system 14 may determine the corrected porosity by an inversion of a forward model giving the expected count rates (or apparent porosities) and/or their time dependence (or decay times) as a function of the true porosity and other formation 40 and borehole 42 conditions.

The specific embodiments described above have been shown by way of example, and it should be understood that these embodiments may be susceptible to various modifications and alternative forms. For example, further improvements may be achieved by combining the corrected porosities as determined using the techniques described above with operator-provided external parameters. By way of example, such external information may include the composition of the borehole fluid 46 and/or the size of the borehole 42. In the presence of such additional information, the correction techniques discussed above may be tailored more accurately and a better correction may be achieved. It should be further understood that the claims are not intended to be limited to the particular forms disclosed, but rather to cover all modifications, equivalents, and alternatives falling within the spirit and scope of this disclosure.

What is claimed is:

1. A downhole tool capable of being lowered into a borehole of a subterranean formation comprising:
   a neutron source configured to emit neutrons into the subterranean formation;
   a near formation-facing thermal neutron detector disposed nearer to a formation-facing side of the downhole tool than a borehole-facing side of the downhole tool and configured to detect a first count of neutrons that have been scattered by the subterranean formation or borehole fluid in the borehole, or a combination thereof, wherein the near formation-facing thermal neutron detector is disposed a first axial spacing in the downhole tool from the neutron source, and wherein the near formation-facing thermal neutron detector is configured to detect a first thermal decay time associated with the first count of neutrons;
   a far formation-facing thermal neutron detector disposed nearer to a formation-facing side of the downhole tool than a borehole-facing side of the downhole tool and configured to detect a second count of neutrons that have been scattered by the subterranean formation or borehole fluid in the borehole, or a combination thereof, wherein the far formation-facing thermal neutron detector is disposed a second axial spacing in the downhole tool from the neutron source that is farther from the neutron source than the first axial spacing, and wherein the far formation-facing thermal neutron detector is configured to detect a second thermal decay time associated with the second count of neutrons;
   at least one borehole-facing thermal neutron detector disposed nearer to the borehole-facing side of the downhole tool than the formation-facing side of the downhole tool and configured to detect a third count of neutrons that have been scattered by the subterranean formation or borehole fluid in the borehole, or a combination thereof, wherein the borehole-facing thermal neutron detector is disposed a third axial spacing in the downhole tool from the neutron source, and wherein the borehole-facing thermal neutron detector is configured to detect a third thermal decay time associated with the third count of neutrons; and
   data processing circuitry configured to determine a porosity of the subterranean formation corrected for borehole effects based on a calculation of a relationship between the first count of neutrons, the second count of neutrons, the third count of neutrons, and the first thermal decay time, the second thermal decay time, and the third thermal decay time, wherein the relationship comprises a product of a near/far apparent porosity associated with the front-facing near thermal neutron detector and the front-facing far thermal neutron detector, the first thermal decay time, the third thermal decay time, the second thermal decay time, and a coefficient that substantially minimizes a difference between the determined porosity and the true porosity of the subterranean formation.

2. The downhole tool of claim 1, comprising shielding configured to enhance a sensitivity of one of the formation-facing neutron detector and the borehole-facing neutron detector to scattered neutrons arriving via a side of the downhole tool toward which that neutron detector is oriented.

3. The downhole tool of claim 1, wherein the borehole fluid comprises fresh water, barite mud, hematite mud, an NaCl brine, a KCl brine, or an NaBr brine, or any combination thereof.

4. The downhole tool of claim 1, comprising:
   a first side-facing neutron detector azimuthally offset from both the borehole-facing neutron detector and the formation-facing neutron detector by 90 degrees, wherein the first side-facing neutron detector is configured to detect a fourth count of neutrons that have been scattered by the subterranean formation or borehole fluid in the borehole, or a combination thereof; and
   a second side-facing neutron detector opposite the first side-facing neutron detector in the downhole tool and azimuthally offset from both the borehole-facing neutron detector and the formation-facing neutron detector by 90 degrees, wherein the second side-facing neutron detector is configured to detect a fifth count of neutrons that have been scattered by the subterranean formation or borehole fluid in the borehole, or a combination thereof;
   wherein the data processing circuitry is configured to determine the porosity of the subterranean formation corrected for borehole effects based on the first count of neutrons, the second count of neutrons, the third count of neutrons, the fourth count of neutrons, and the fifth count of neutrons.

5. A method comprising:

placing a downhole tool into a borehole of a subterranean formation;

using the downhole tool to obtain:
- a near count of thermal neutrons detected by a front-facing near thermal neutron detector of the downhole tool;
- a far count of thermal neutrons detected by a front-facing far thermal neutron detector of the downhole tool in the borehole of the subterranean formation, wherein the front-facing far thermal neutron detector is disposed farther from a neutron source of the downhole tool than the front-facing near thermal neutron detector;
- a back count of thermal neutrons detected by a back-facing thermal neutron detector of the downhole tool in the borehole of the subterranean formation, wherein the back-facing thermal neutron detector is disposed more closely to a borehole-facing side of the downhole tool than the front-facing near thermal neutron detector and the front-facing far thermal neutron detector; and
- time dependent data associated with neutrons detected by the front-facing near thermal neutron detector, the front-facing far neutron thermal neutron detector, and the back-facing thermal neutron detector, wherein the time dependent data comprises a near thermal decay time associated with the front-facing near thermal neutron detector, a back thermal decay time associated with the back-facing thermal neutron detector, and a far thermal decay time associated with the front-facing far thermal neutron detector;

receiving, into data processing circuitry, the near count of thermal neutrons;

receiving, into the data processing circuitry, the far count of thermal neutrons;

receiving, into the data processing circuitry, the back count of thermal neutrons;

receiving, into the data processing circuitry, the time dependent data; and determining, using the data processing circuitry, a true porosity of the subterranean formation corrected for effects introduced by the borehole of the subterranean formation based on a calculation of a relationship between the near count of thermal neutrons, the far count of thermal neutrons, the back count of thermal neutrons, and the time dependent data, wherein the relationship comprises a product of a near/far apparent porosity associated with the front-facing near neutron detector and the front-facing far neutron detector, the near thermal decay time, the back thermal decay time, the far thermal decay time, and a coefficient that substantially minimizes a difference between the determined porosity and the true porosity of the subterranean formation.

6. The method of claim 5, wherein the porosity is determined directly from the near count of thermal neutrons, the far count of thermal neutrons, and the back count of thermal neutrons using a transform derived from modeled or experimental data, or a combination thereof, that relates the near count of thermal neutrons, the far count of thermal neutrons, and the back count of thermal neutrons to a true porosity associated with the subterranean formation for various borehole geometries and borehole fluids.

7. The method of claim 5, wherein determining the porosity comprises determining, using the data processing circuitry, a near/far ratio apparent porosity based at least in part on a ratio of the near count of thermal neutrons to the far count of thermal neutrons and determining, using the data processing circuitry, a back/far ratio apparent porosity based at least in part on a ratio of the back count of thermal neutrons to the far count of thermal neutrons, a back/near ratio apparent porosity based at least in part on a ratio of the back count of thermal neutrons to the near count of thermal neutrons, or an apparent porosity based primarily on the back count of thermal neutrons, or a combination thereof.

8. The method of claim 7, wherein the porosity is determined based at least in part on a correction function relating the near/far ratio apparent porosity, the back/far ratio apparent porosity, and the time dependent data.

9. The method of claim 7, wherein the porosity is determined based at least in part on the following relationship:

$$\varphi_{corr} = \sum_{ij}^{i+j \leq n} a_{ij} \varphi_{n/f}^i \varphi_{b/f}^j + \sum_{i}^{i \leq p} \sum_{klm}^{0 < k+l+m \leq q} \varphi_{n/f}^i b_{iklm} \tau_{near}^k \tau_{back}^l \tau_{far}^m,$$

wherein $\varphi_{corr}$ represents the determined porosity, $\varphi_{n/f}$ represents the near/far ratio apparent porosity, $\varphi_{b/f}$ represents the back/far ratio apparent porosity, n, p, and q represent the degrees of the polynomials, $\tau_{near}$ represents the near thermal decay time, $\tau_{back}$ represents the back thermal decay time, $\tau_{far}$ represents the far thermal decay time, and $a_{ij}$ and $b_{iklm}$ represent coefficients chosen to minimize a difference between the determined porosity and a true porosity of the subterranean formation.

* * * * *